(12) United States Patent
Oehrlein et al.

(10) Patent No.: US 9,228,063 B2
(45) Date of Patent: Jan. 5, 2016

(54) COLORED CHARGED SILSESQUIOXANES

(71) Applicant: BASF SE, Ludwigshafen (DE)

(72) Inventors: Reinhold Oehrlein, Rheinfelden-Herten (DE); Gabriele Baisch, Binzen (DE)

(73) Assignee: BASF SE, Ludwigshafen (DE)

( * ) Notice: Subject to any disclaimer, the term of this patent is extended or adjusted under 35 U.S.C. 154(b) by 179 days.

(21) Appl. No.: 13/855,415

(22) Filed: Apr. 2, 2013

(65) Prior Publication Data

US 2014/0296518 A1 Oct. 2, 2014

Related U.S. Application Data

(60) Provisional application No. 61/619,429, filed on Apr. 3, 2012.

(51) Int. Cl.

| G02F 1/00 | (2006.01) |
|---|---|
| C08G 77/392 | (2006.01) |
| C08G 77/04 | (2006.01) |
| C08G 77/388 | (2006.01) |
| C09B 69/00 | (2006.01) |
| C09B 69/10 | (2006.01) |
| C09B 1/503 | (2006.01) |
| C09B 1/54 | (2006.01) |
| C09B 5/24 | (2006.01) |
| G02F 1/167 | (2006.01) |

(52) U.S. Cl.
CPC ............ *C08G 77/392* (2013.01); *C08G 77/045* (2013.01); *C08G 77/388* (2013.01); *C09B 1/503* (2013.01); *C09B 1/54* (2013.01); *C09B 5/2481* (2013.01); *C09B 69/008* (2013.01); *C09B 69/101* (2013.01); *G02F 2001/1678* (2013.01); *G02F 2203/34* (2013.01)

(58) Field of Classification Search
CPC .. C08G 77/045; C08G 77/388; C08G 77/392; C09B 1/54; C09B 1/503; C09B 5/2481; C09B 69/008; C09B 69/101
USPC ..................... 556/418, 422; 544/69
See application file for complete search history.

(56) References Cited

U.S. PATENT DOCUMENTS

| 2004/0163570 A1 | 8/2004 | Vanmaele et al. |
| 2009/0203931 A1 | 8/2009 | Ohrlein et al. |
| 2009/0296195 A1 | 12/2009 | Fontana et al. |
| 2012/0229884 A1 | 9/2012 | Hayoz et al. |

FOREIGN PATENT DOCUMENTS

| CN | 101297004 | 10/2008 |
| CN | 101472999 | 7/2009 |
| WO | 2007048721 | 5/2007 |
| WO | 2007147742 | 12/2007 |
| WO | 2010149505 | 12/2010 |

OTHER PUBLICATIONS

Comiskey, et al. Nature 1998, 394, 253 to 255.
J. Heikenfeld, et al. Journal of the SID, 2011, 19/2, 129 to 156.
International Search Report dated Sep. 12, 2013.

*Primary Examiner* — Porfirio Nazario Gonzalez

(74) *Attorney, Agent, or Firm* — Oblon, McClelland, Maier & Neustadt, L.L.P.

(57) ABSTRACT

The present invention provides compounds of formula

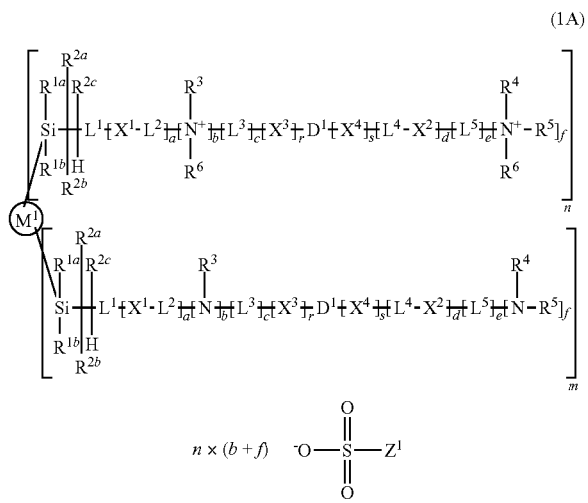

wherein

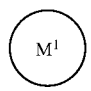

is

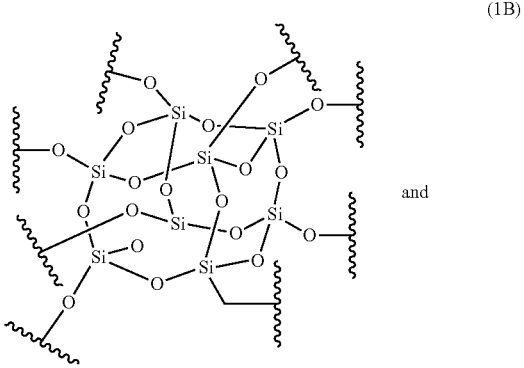

and

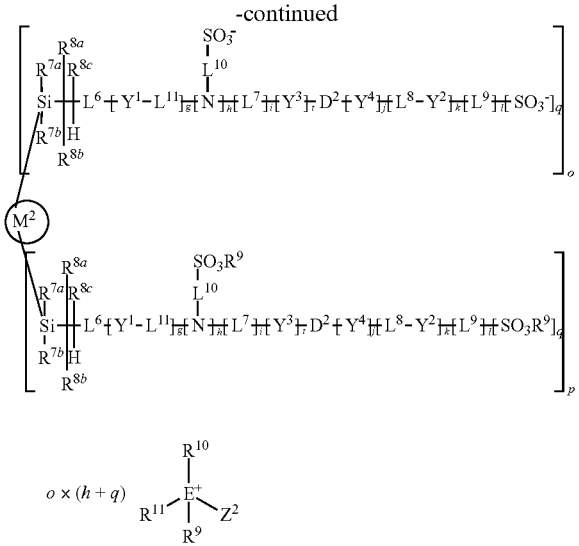
wherein
is
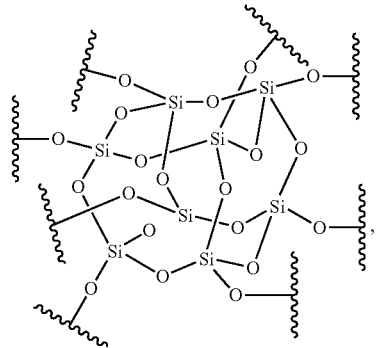
and electrophoretic devices comprising the compounds of formula (1A) or (1B).
20 Claims, No Drawings

COLORED CHARGED SILSESQUIOXANES

CROSS-REFERENCE TO RELATED APPLICATIONS

This application claims the benefit of priority to U.S. Provisional Application No. 61/619,429 filed on Apr. 3, 2012.

The present invention refers to compounds suitable for use as charged coloured particles in electrophoretic devices, and also to electrophoretic devices comprising the new compounds.

Electronic paper, also called e-paper or electronic ink, are a range of display technology, which are designed to mimic the appearance of ordinary ink on paper, but that can be written to and erased electronically. In order to mimic the appearance of ordinary ink on paper, electronic paper should have the following attributes: a) a resolution of 150 ppi or better, b) a contrast of about 10:1 or better, c) a stable display (i.e. does not need to be refreshed constantly), d) readable in ambient light, e) readable at wide viewing angle, f) a weight comparable to that of an equally sized sheet of card, g) a size comparable to that of a sheet of paper commonly used for books, preferably A4 (298×212 mm), h) robust (i.e. will withstand being dropped or hit) and optionally i) flexible, or at least bendable (which can be achieved by using plastic substrates). In addition, electronic paper should show low power consumption.

Applications of electronic paper include electronic pricing labels, time tables at bus station, mobile phone displays and e-readers able to display digital versions of books and electronic paper magazines.

Electronic paper forms visible images by rearranging charged colored particles using an applied electric field.

For example, Comiskey et al. *Nature* 1998, 394, 253 to 255 describes a display technology called vertical electrophoretic display (EPD). In one embodiment, this technology uses microcapsules having a transparent shell and filled with numerous slightly negatively charged white titanium dioxide microparticles dispersed in a dyed (Oil Blue N) dielectric fluid. The microcapsules are dispersed in a carrier (UV curable urethane) and subsequently coated onto a transparent conductive film (indium tin oxide on polyester). Rear electrodes printed from a silver doped polymeric ink are then applied to the display layer. Applying a positive charge to one or more rear electrodes results in the migration of the slightly negatively charged white titanium dioxide microparticles to the bottom of the local microcapsule, forcing the dyed dielectric fluid to the surface and giving the pixel a black appearance. Reversing the voltage has the opposite effect.

Whereas there are currently black and white electronic papers which mimic the appearance of ordinary ink on paper sufficiently, the development of full-colour electronic papers resembling coloured ink on ordinary paper is still an area of intense research.

Full-colour electronic paper can be generated a) by modulating light in an additive system with the primaries of red, green and blue (RGB-technology), b) by using s substractive system with cyan, magenta and yellow (CMY-technology) or c) by using a substractive/additive hybrid system using both RGB and CMY primaries in a cooperative "biprimary system" (J. Heikenfeld et al. *Journal of the SID*, 2011, 19/2, 129 to 156).

Both technologies (RGB-technology or CMY technology) require a dispersion of charged coloured particles in a dielectric fluid, wherein the charged particles show a narrow size distribution and thus form homogeneous dispersions. When using the CMY technology, for example, the charged coloured particles should have a size in the range of about 1 nm to 100 nm. The Zeta potential of the charged coloured particles in the dielectric fluid should be above −30 mV and below +30 mV. The dispersion should have a viscosity (at 25° C.) of below 5 mNs/m². The dispersion should have a resistivity of about $10^{10}$ Ωcm. The relative permittivity of the dispersion should be about 2. In addition, the charged coloured particles should show a high colour strength.

When using CMY technology in video applications, it is desirable to use charged coloured particles of the smallest particle size possible, as a decrease in particle size yields an increase in the switching frequency of the images.

WO 2007/147742 describes a coloured compound of general formula

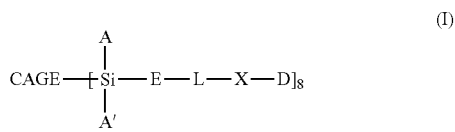

(I)

wherein
each of A and A' is, independently of the other, $C_1$-$C_4$ alkyl;
CAGE is a moiety of the formula IA

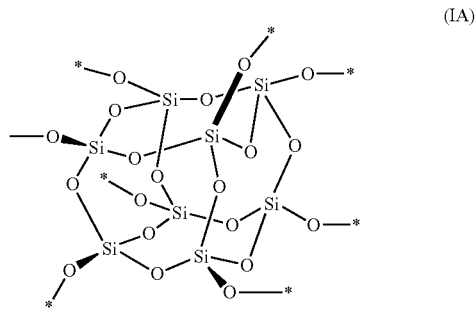 [SMILES: *O[Si]12O[Si]3(O*)O[Si]4(O*)O[Si](O*)(O1)O[Si@]1(O*)O[Si@](O*)(O2)O[Si@@](O*)(O3)O[Si@](OC)(O4)O1]

(IA)

wherein the asterisks (*) mark the bonds binding the moieties of the formula,

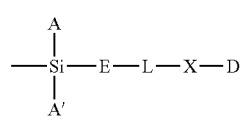

shown above, respectively,
D is a chromophoric moiety, with the proviso that all 8 moieties D in a molecule of the formula I are identical;
E is —C($R_{3a}$)($R_3$)—C(H)($R_{3b}$)— and/or

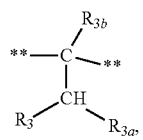

wherein the double asterisks (**) mark the binding bonds, respectively, and wherein each of $R_3$, $R_{3a}$ and $R_{3b}$, independently of the others, is hydrogen or unsubstituted or substituted $C_1$-$C_{12}$alkyl; L is unsubstituted or substituted $C_1$-$C_{25}$alkylene which is linear or branched, which alkylene may be bound* and/or be interrupted by at least one of the radicals selected from the group consisting of —O—, —S—, —N($R_4$)—, —CO—, —O—CO—, —CO—O—, —N($R_4$)—CO—, —CO—N($R_4$)— and phenylene, wherein
$R_4$ is hydrogen or unsubstituted or substituted $C_1$-$C_{12}$alkyl;
X is —$NR_5$— or —O—; and
$R_5$ is hydrogen or unsubstituted or substituted $C_1$-$C_{12}$alkyl;
or a salt thereof.

The coloured silsesquisiloxanes are used as colorants, pigments and dyes.

WO2007/048721 describes the use of functional particles as electrophoretic displaying particles, wherein the functionalized particles are $SiO_2$, $Al_2O_3$ or mixed $SiO_2$ and $Al_2O_3$ particles comprising covalently bound to an oxygen atom on the surface, a radical of formula (1),

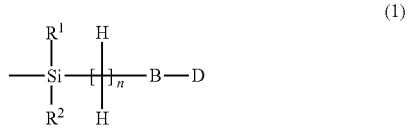

(1)

wherein $R^1$ and $R^2$ are independently of each other hydrogen, particle surface —O—, or a substituent, n is 1, 2, 3, 4, 5, 6, 7 or 8, B is the direct bond or a bridge member, and D is the residue of an organic chromophore.

WO 2010/149505 describes a composition comprising charged particles, preferably having an inorganic core of $SiO_2$, $Al_2O_3$ and/or $TiO_2$, and a counter ion comprising a silicon atom which is directly bound to a carbon atom. Said composition may be used in electrophoretic displays. Preferably, said charged particles comprise a dye attached to said inorganic core and said counter ion comprise a (poly)siloxane moiety linked via suitable bridge members to a quaternary, positively charged nitrogen or phosphorus atom, or to a moiety carrying an anionic functional group. Exemplified are charged particles having a $SiO_2$ core.

The charged particles of WO 2010/149505 have several disadvantages when used in electrophoretic display applications. First, the last step of the process for the preparation of the charged particles of WO 2010/149505 has to be performed in a two phase system comprising an aqueous layer and an organic layer, for example petrol ether, and in addition produces sodium iodide as by-product. As water and sodium iodide decrease the performance of the charged particles in electrophoretic display application, water and sodium iodide have to be removed before use of the charged particles in electrophoretic display applications. In addition, the solvent of the organic layer comprising the charged particles has to be exchanged by a solvent suitable for application in electrophoretic displays such as dodecane. The removal of water and sodium iodide is tedious and usually not completely successful (traces of water and sodium iodide remain in the organic layer). The solvent exchange of the organic layer is also tedious.

Thus, it was the object of the present invention to provide charged coloured particles suitable for use in full-colour electronic paper.

Ideally, the charged coloured particles should show a narrow size distribution, and thus form homogeneous dispersions in a dielectric fluid such as dodecane. For example, the Zeta potential of the charged coloured particles in the dielectric fluid should be above −30 mV and below +30 mV. Ideally, the dispersion should have a viscosity (at 25° C.) of below 5 mNs/m². Ideally, the dispersion should have a resistivity of about $10^{10}$ Ωcm. Ideally, the relative permittivity of the dispersion should be about 2. In addition, the charged coloured particles should show a high colour strength.

Ideally, the charged coloured particles should have a particle size suitable for use in video applications based on CMY technology, in particular a particle size in the range of 0.5 nm to 1.5 nm, preferably 0.8 to 1.2 nm.

It was also the object of the present invention to provide a process for the preparation of the charged coloured particles suitable for use in full-colour electronic paper, which process allows a convenient purification, respectively, isolation of the charged coloured particles. In particular, the process does not produce the charged coloured particles along with considerable high amounts of unwanted by-products such as water or sodium iodide, which are tedious to remove. In addition, the process allows the targeted preparation of charged particles of a well defined structure including a well-defined number of charges.

This object is solved by the compounds of claim 1, the processes of claims 17 and 18, and by the electrophoretic device of claim 20.

The compounds of the present invention are of formula

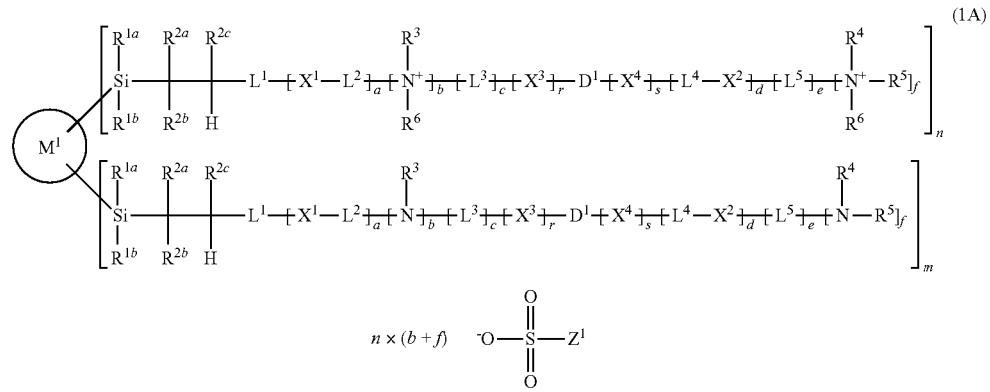

(1A)

wherein

M¹ is

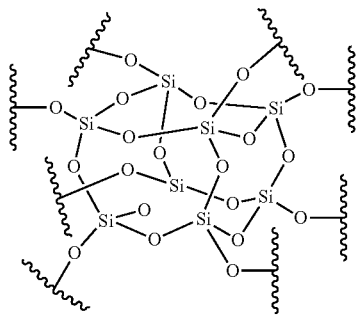

n is 1, 2, 3, 4, 5, 6, 7 or 8,
m is 8-n,
a is 0 or 1,
b is 0 or 1,
c is 0 or 1,
r is 0 or 1,
s is 0 or 1,
d is 0 or 1,
e is 0 or 1,
f is 0 or 1,
with the proviso that at least b or f is 1, and with the proviso f is 0, then s, d and e are also 0,
$R^{1a}$ and $R^{1b}$ are independently from each other $C_{1-4}$-alkyl,
$R^{2a}$, $R^{2b}$ and $R^{2c}$ are independently from each other hydrogen or $C_{1-4}$-alkyl,
$L^1$ is $C_{1-20}$-alkylene, $C_{1-20}$-alkylene-phenylene, $C_{1-20}$-alkylene-$C_{5-8}$-cycloalkylene, phenylene or $C_{5-8}$-cycloalkylene, wherein $L^1$ may be substituted with one or more substituents selected from the group consisting of halogen, $OC_{1-6}$-alkyl, $NO_2$ and OH,
$X^1$, $X^2$, $X^3$ and $X^4$ are independently of each other O, S, C(O) or C(O)O, $L^2$, $L^3$, $L^4$ and $L^5$ are independently of each other $C_{1-20}$-alkylene, $C_{1-20}$-alkylene-phenylene, $C_{1-20}$-alkylene-$C_{5-8}$-cycloalkylene, phenylene or $C_{5-8}$-cycloalkylene, wherein $L^2$, $L^3$, $L^4$ and $L^5$ may be substituted with one or more substituents selected from the group consisting of halogen, $OC_{1-6}$-alkyl, $NO_2$ and OH,
$R^3$, $R^4$ and $R^5$ are independently of each other $C_{1-20}$-alkyl, which may be substituted with a substituent selected from the group consisting of $C_{6-14}$-aryl, $OC_{1-6}$-alkyl, and $NO_2$,
or
$L^2$ and $R^3$ or $L^3$ and $R^3$ together with the N linked to both of them form a 5, 6 or 7 membered ring,
or
$R^4$ and $R^5$ together with the N linked to both of them form a 5, 6 or 7 membered ring, which may also include O or S,
or
$L^5$ and $R^4$ together with the N linked to both of them form a 5, 6 or 7 membered ring,
$R^6$ is $C_{1-20}$-alkyl, which may be substituted with a substituent selected from the group consisting of $C_{6-14}$-aryl, $OC_{1-6}$-alkyl, $NO_2$,
$D^1$ is a chromophoric moiety, which may be substituted with one or more $R^{50}$,
wherein $R^{50}$ are independently from each other selected from the group consisting of $C_{1-20}$-alkyl, $C_{6-14}$-aryl, halogen, $OC_{1-6}$-alkyl, OH, $NH_2$ and $NO_2$,
$Z^1$ is $C_{1-100}$-alkyl, wherein one or more methylene groups are replaced by —$SiR^{100}R^{101}$—, —$SiR^{100}R^{101}O$—, —O— or —S—, with the proviso that —$SiR^{100}R^{101}$—, —$SiR^{100}R^{101}O$—, —O— or —S— are not directly linked to the S of

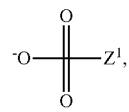

wherein $R^{100}$ and $R^{101}$ are independently from each other $C_{1-6}$-alkyl,
or of formula

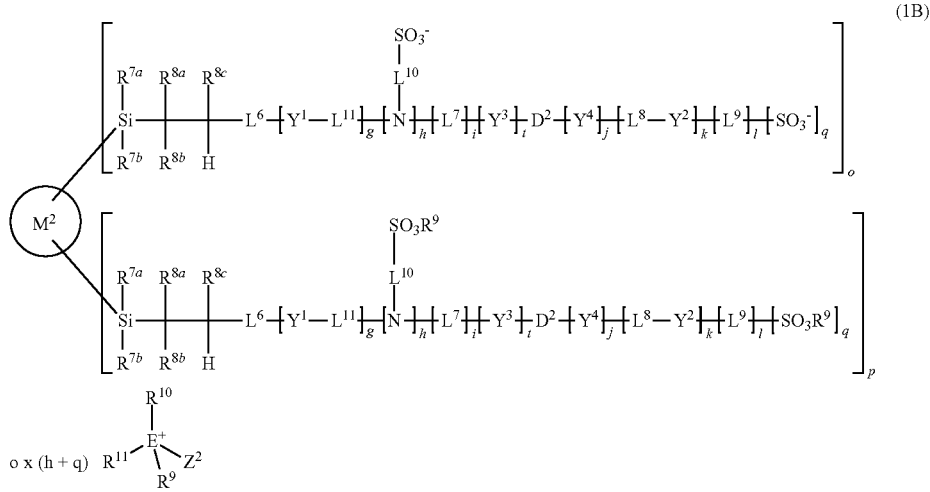

(1B)

wherein

is

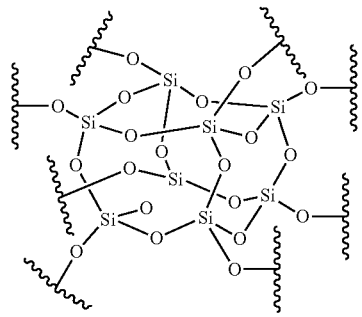

o is 1, 2, 3, 4, 5, 6, 7 or 8
p is 8-o,
g is 0 or 1,
h is 0 or 1,
i is 0 or 1,
t is 0 or 1,
j is 0 or 1,
k is 0 or 1,
l is 0 or 1,
q is 0 or 1
with the proviso that at least h or q is 1, and with the proviso that if q is 0, then j, k and l are also 0,
$R^{7a}$ and $R^{7b}$ are independently of each other $C_{1-4}$-alkyl,
$R^{8a}$, $R^{8b}$ and $R^{8c}$ are independently from each other hydrogen or $C_{1-4}$-alkyl,
$L^6$ is $C_{1-20}$-alkylene, $C_{1-20}$-alkylene-phenylene, $C_{1-20}$-alkylene-$C_{5-8}$-cycloalkylene, phenylene or $C_{5-8}$-cycloalkylene, wherein $L^6$ may be substituted with one or more substitutents selected from the group consisting of halogen, $OC_{1-6}$-alkyl, $NO_2$ and OH,
$Y^1$, $Y^2$, $Y^3$ and $Y^4$ are independently of each other $NR^{51}$, O, S, C(O) or C(O)O, wherein $R^{51}$ is $C_{1-20}$-alkyl,
$L^7$, $L^8$, $L^9$, $L^{10}$ and $L^{11}$ are independently of each other $C_{1-20}$-alkylene, $C_{1-20}$-alkylene-phenylene or $C_{1-20}$-alkylene-$C_{5-8}$-cycloalkylene, phenylene or $C_{5-8}$-cycloalkylene, wherein $L^7$, $L^8$, $L^9$, $L^{10}$ and $L^{11}$ may be substituted with one or more substituents selected from the group consisting of halogen, $OC_{1-6}$-alkyl, $NO_2$ and OH, and
$R^9$ is $C_{1-10}$-alkyl,
$D^2$ is a chromophoric moiety, which may be substituted with one or more $R^{52}$, wherein $R^{52}$ are independently from each other selected from the group consisting of $C_{1-20}$-alkyl, $C_{1-14}$-aryl, halogen, $OC_{1-6}$-alkyl, OH, $NH_2$ and $NO_2$,
$R^{10}$ and $R^{11}$ are independently from each other $C_{1-20}$-alkyl, which may be substituted with one or more substituents selected from the group consisting of $C_{1-14}$-aryl, $OC_{1-6}$-alkyl, and $NO_2$,
E is N or P,
$Z^2$ is $C_{1-100}$-alkyl, wherein one or more methylene groups are replaced by —$SiR^{102}R^{103}$—, —$SiR^{102}R^{103}O$—, —O— or —S—, with the proviso that —$SiR^{102}R^{103}$—, —$SiR^{102}R^{103}O$—, —O— or —S— are not directly linked to E, wherein $R^{102}$ and $R^{103}$ are independently from each other $C_{1-6}$-alkyl.

Examples of $C_{1-4}$-alkyl are methyl, ethyl, butyl, iso-butyl, sec-butyl and tert-butyl. Examples of $C_{1-6}$-alkyl are $C_{1-4}$-alkyl, pentyl, isopentyl and hexyl. Examples of $C_{1-10}$-alkyl are $C_{1-6}$-alkyl, heptyl, octyl, nonyl and decyl. Examples of $C_{1-20}$-alkyl are $C_{1-10}$-alkyl, undecyl, dodecyl, tridecyl, tetradecyl, pentadecyl, hexadecyl, heptadecyl, octadecyl, nonadecyl and eicosyl, Examples of $C_{1-2}$-alkylene are methylene and ethylene. Examples of $C_{1-4}$-alkylene are $C_{1-2}$-alkylene, propylene and butylene. Examples of $C_{1-10}$-alkylene are $C_{1-4}$-alkylene, pentylene, hexylene, heptylene, octylene, nonylene and decylene. Examples of $C_{1-20}$-alkylene are $C_{1-10}$-alkylene, undecylene, dodecylene, tridecylene, tetradecylene, pentadecylene, hexadecylene, heptadecylene, octadecylene, nonadecylene and eicosylene, Examples of $C_{5-8}$-cycloalkylene are cyclopentylen, cyclohexylene, cycloheptylene and cyclooctylene.

Examples of $C_{6-14}$-aryl are phenyl and naphthyl.

Examples of halogen are F, Cl, Br and I.

The chromophoric moiety can be a chromophoric moiety derived from a natural organic dye or a synthetic organic dye.

Examples of synthetic organic dyes are anthraquinone-type dyes, nitro-type dyes, acridine-type dyes, arylmethane-type dyes, azo-type dye, diazonium-type dyes, phthalocyanine-type dyes, quinine-imine dyes, thiazole-type dyes and xanthene-type dyes.

Preferably, the chromophric moiety is a chromophoric moiety deriving from a synthetic organic dye, in particular from an anthraquinone-type dye or a nitro-type dye.

Examples of chromophoric moieties deriving from an anthraquinone-type dye are of formula

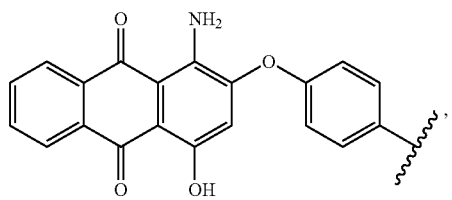

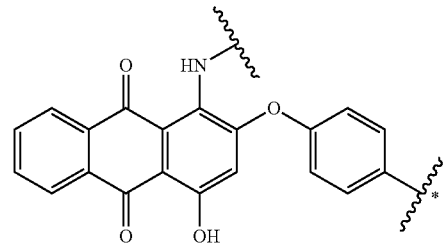

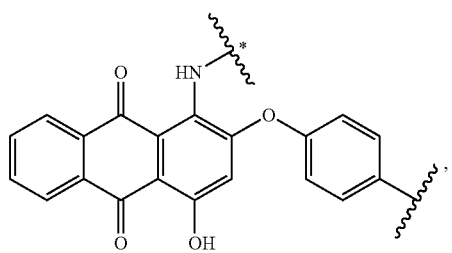

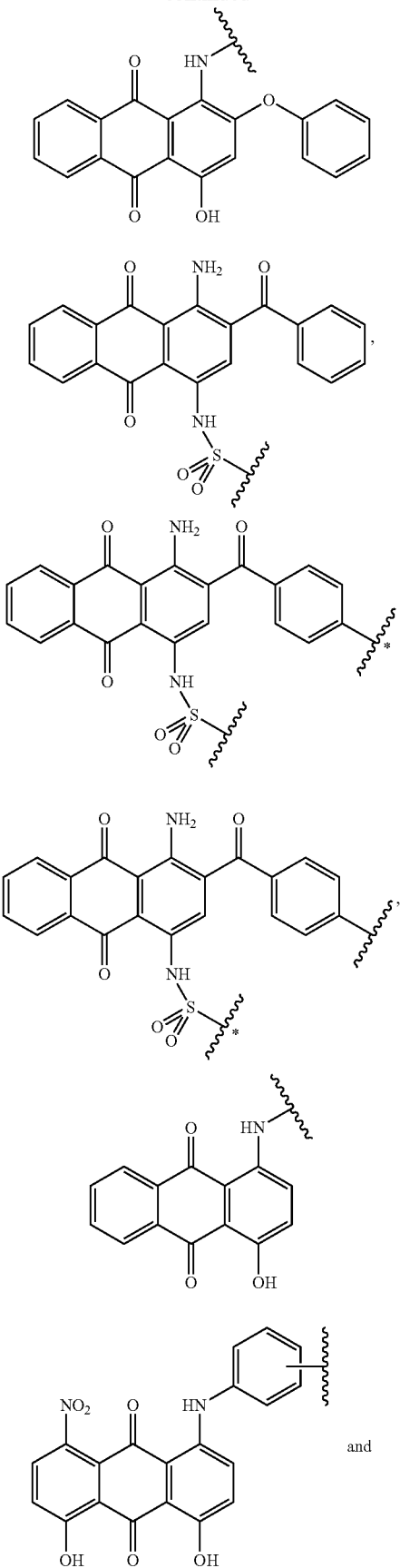
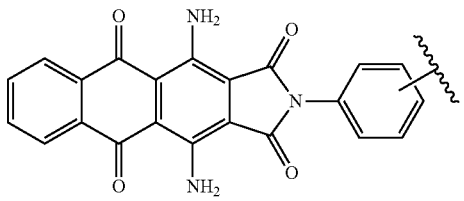
wherein
the bond marked with * is linked to
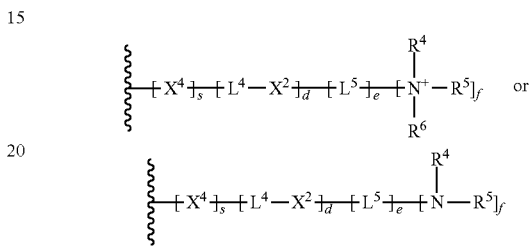
respectively, the bond marked with * is linked to
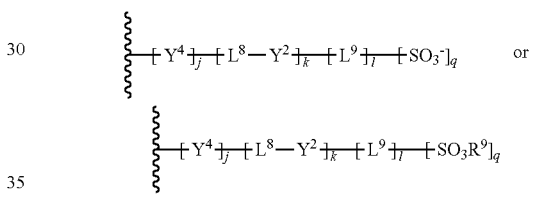
Examples of chromophoric moieties deriving from a nitro-type dye are of formula
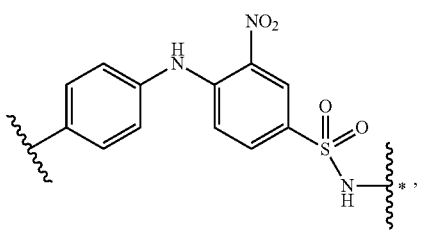
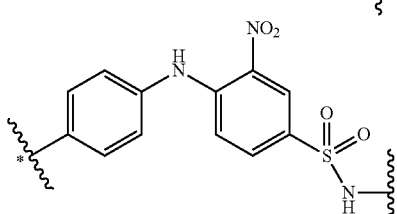
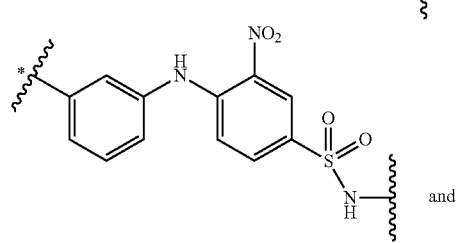

[Structure showing a diphenylamine with NO₂ and sulfonamide group]

wherein
the bond marked with * is linked to $$\{-[X^4\}_s-[L^4-X^2\}_d-[L^5\}_e-[\overset{R^4}{\underset{R^6}{N^+}}-R^5]_f \quad \text{or}$$

$$\{-[X^4\}_s-[L^4-X^2\}_d-[L^5\}_e-[\overset{R^4}{N}-R^5]_f,$$

respectively, the bond marked with * is linked to $$\{-[Y^4\}_j-[L^8-Y^2\}_k-[L^9\}_l-SO_3^-]_q \quad \text{or}$$

$$\{-[Y^4\}_j-[L^8-Y^2\}_k-[L^9\}_l-SO_3R^9]_q$$

Examples of $Z^1$ are $(Z^{1a})$

[Siloxane structure with R⁵³, R¹⁰⁰ᵃ, R¹⁰¹ᵃ groups, subscripts w and v]

wherein
$R^{53}$ is $C_{1-10}$-alkyl, preferably $C_{1-6}$-alkyl, more preferably butyl
$R^{100a}$ and $R^{101a}$ are independently from each other $C_{1-6}$-alkyl, more preferably methyl,
v is an integer from 1 to 12, preferably from 2 to 6, most preferably 3,
w is an integer from 2 to 25, preferably 5 to 20, more preferably 8 to 15, most preferably 11, and $(Z^{1b})$ $$R^{54}-O-[\phantom{x}-O]_x-[\phantom{y}]_y\text{\textasciitilde}$$

wherein
$R^{54}$ is $C_{1-10}$-alkyl, preferably $C_{1-6}$-alkyl, more preferably ethyl,
x is preferably an integer from 5 to 25, more preferably from 5 to 20, most preferably from 8 to 15, most preferably 12,
y is an integer from 1 to 5, preferably from 1 to 2, more preferably 1.

Examples of $Z^2$ are $(Z^{2a})$

[Siloxane structure with R⁵⁵, R¹⁰²ᵃ, R¹⁰³ᵃ groups, subscripts z and aa]

wherein
$R^{55}$ is $C_{1-10}$-alkyl, preferably $C_{1-6}$-alkyl, more preferably butyl,
$R^{102a}$ and $R^{103a}$ are independently from each other $C_{1-6}$-alkyl, more preferably methyl,
aa is an integer from 1 to 12, preferably from 2 to 10, most preferably 2 or 10,
z is an integer from 2 to 25, preferably 5 to 20, more preferably 8 to 15, most preferably 11,
and $(Z^{2b})$ $$R^{56}-O-[\phantom{x}-O]_{bb}-[\phantom{y}]_{cc}\text{\textasciitilde}$$

wherein
$R^{56}$ is $C_{1-10}$-alkyl, preferably $C_{1-6}$-alkyl, more preferably ethyl,
bb is preferably an integer from 5 to 25, more preferably from 5 to 20, most preferably from 8 to 15, most preferably 12,
cc is an integer from 1 to 5, preferably from 1 to 2, more preferably 1.

Preferably, the compounds of the present invention are of formula

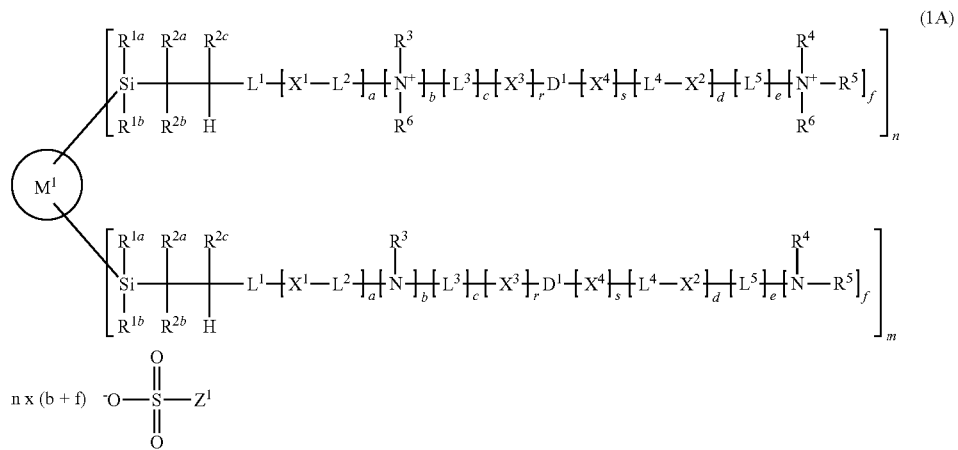

wherein

 is

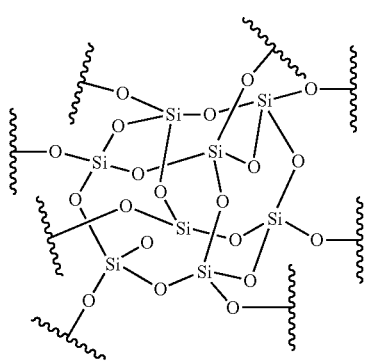

n is 1, 2, 3, 4, 5, 6, 7 or 8,
m is 8-n,
a is 0 or 1,
b is 0 or 1,
c is 0 or 1,
r is 0 or 1,
s is 0 or 1,
d is 0 or 1,
e is 0 or 1,
f is 0 or 1,
with the proviso that at least b or f is 1, and with the proviso f is 0, then s, d and e are also 0, $R^{1a}$ and $R^{1b}$ are independently from each other $C_{1-4}$-alkyl, $R^{2a}$, $R^{2b}$ and $R^{2c}$ are independently from each other hydrogen or $C_{1-4}$-alkyl, $L^1$ is $C_{1-20}$-alkylene, $C_{1-20}$-alkylene-phenylene, $C_{1-20}$-alkylene-$C_{5-8}$-cycloalkylene, phenylene or $C_{5-8}$-cycloalkylene, wherein $L^1$ may be substituted with one or more substituents selected from the group consisting of halogen, $OC_{1-6}$-alkyl, $NO_2$ and OH, $X^1$, $X^2$, $X^3$ and $X^4$ are independently of each other O, S, C(O) or C(O)O, $L^2$, $L^3$, $L^4$ and $L^5$ are independently of each other $C_{1-20}$-alkylene, $C_{1-20}$-alkylene-phenylene, $C_{1-20}$-alkylene-$C_{5-8}$-cycloalkylene, phenylene or $C_{5-8}$-cycloalkylene, wherein $L^2$, $L^3$, $L^4$ and $L^5$ may be substituted with one or more substituents selected from the group consisting of halogen, $OC_{1-6}$-alkyl, $NO_2$ and OH, $R^3$, $R^4$ and $R^5$ are independently of each other $C_{1-20}$-alkyl, which may be substituted with a substituent selected from the group consisting of $C_{6-14}$-aryl, $OC_{1-6}$-alkyl, and $NO_2$, or $L^2$ and $R^3$ or $L^3$ and $R^3$ together with the N linked to both of them form a 5, 6 or 7 membered ring or $R^4$ and $R^5$ together with the N linked to both of them form a 5, 6 or 7 membered ring, which may also include O or S, or $L^5$ and $R^4$ together with the N linked to both of them form a 5, 6 or 7 membered ring, $R^6$ is $C_{1-20}$-alkyl, which may be substituted with a substituent selected from the group consisting of $C_{6-14}$-aryl, $OC_{1-6}$-alkyl, $NO_2$, $D^1$ is of formula

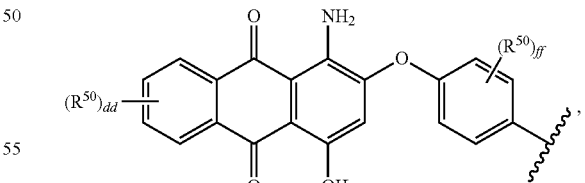

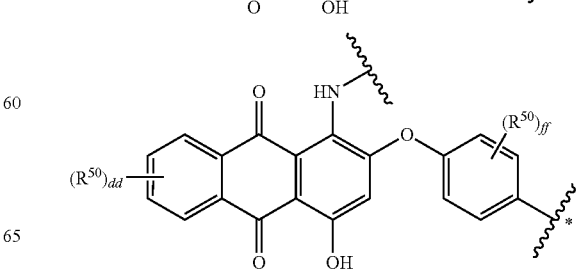

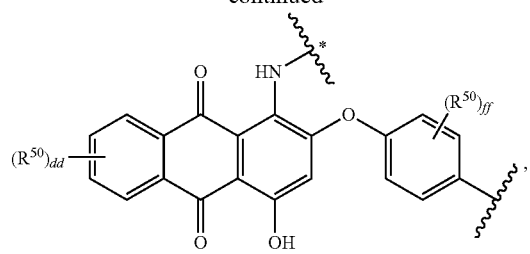
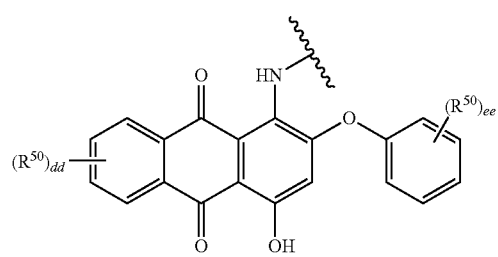
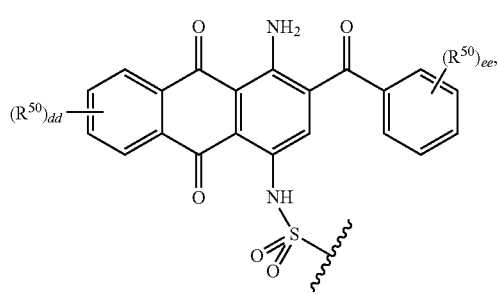
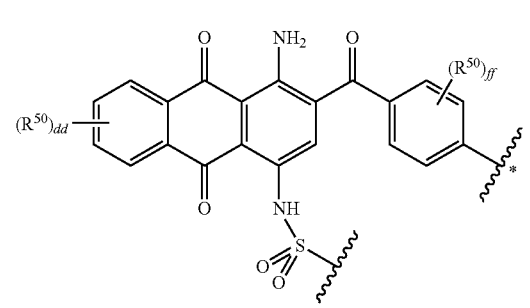
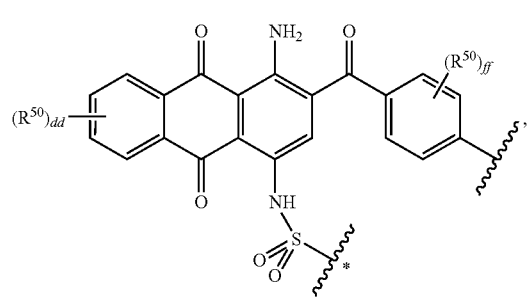
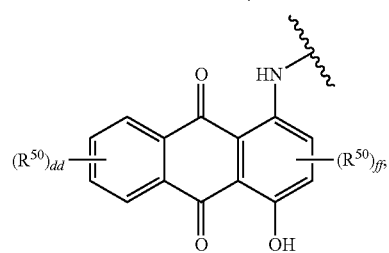
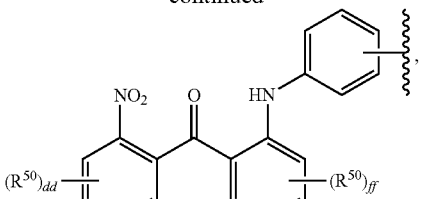
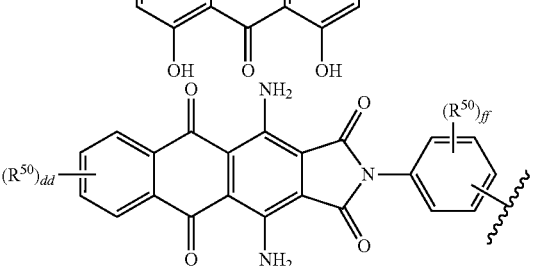
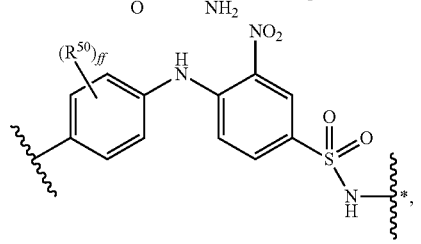
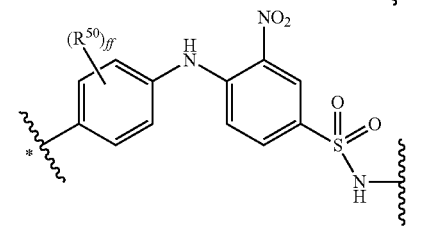
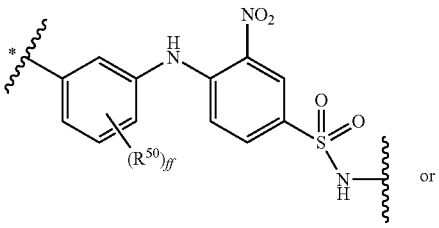
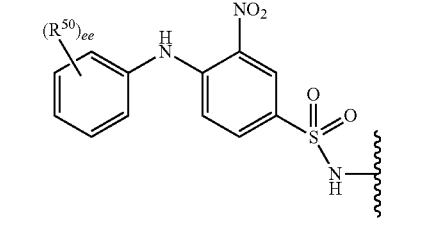
wherein
the bond marked with * is linked to
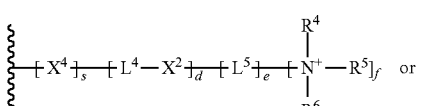 or
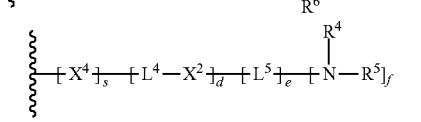

dd is an integer from 0 to 3,
ee is an integer from 0 to 2,
ff is an integer from 0 to 1, and
$R^{50}$ are independently from each other selected from the group consisting of $C_{1-20}$-alkyl, $C_{6-14}$-aryl, halogen, $OC_{1-6}$-alkyl, OH, $NH_2$ and $NO_2$,
$Z^1$ is $C_{1-100}$-alkyl, wherein one or more methylene groups are replaced by $—SiR^{100}R^{101}—$, $—SiR^{100}R^{101}O—$, $—O—$ or $—S—$, with the proviso that $—SiR^{100}R^{101}—$, $—O—$ or $—S—$ are not directly linked to the S of

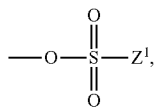

wherein $R^{100}$ and $R^{101}$ are independently from each other $C_{1-6}$-alkyl,
or of formula i is 0 or 1,
t is 0 or 1,
j is 0 or 1,
k is 0 or 1,
l is 0 or 1,
q is 0 or 1
with the proviso that at least h or q is 1, and with the proviso that if q is 0, then j, k and l are also 0,
$R^{7a}$ and $R^{7b}$ are independently of each other $C_{1-4}$-alkyl,
$R^{8a}$, $R^{8b}$ and $R^{8c}$ are independently from each other hydrogen or $C_{1-4}$-alkyl,
$L^6$ is $C_{1-20}$-alkylene, $C_{1-20}$-alkylene-$C_{6-14}$-arylene, $C_{1-20}$-alkylene-$C_{5-8}$-cycloalkylene, $C_{6-14}$-arylene or $C_{5-8}$-cycloalkylene, wherein $L^6$ may be substituted with one or more substituents selected from the group consisting of halogen, $OC_{1-6}$-alkyl, $NO_2$ and OH,
$Y^1$, $Y^2$, $Y^3$ and $Y^4$ are independently of each other $NR^{51}$, O, S, C(O) or C(O)O, wherein $R^{51}$ is $C_{1-20}$-alkyl,
$L^7$, $L^8$, $L^9$, $L^{10}$ and $L^{11}$ are independently of each other $C_{1-20}$-alkylene, $C_{1-20}$-alkylene-$C_{6-14}$-arylene or $C_{1-20}$-alkylene-

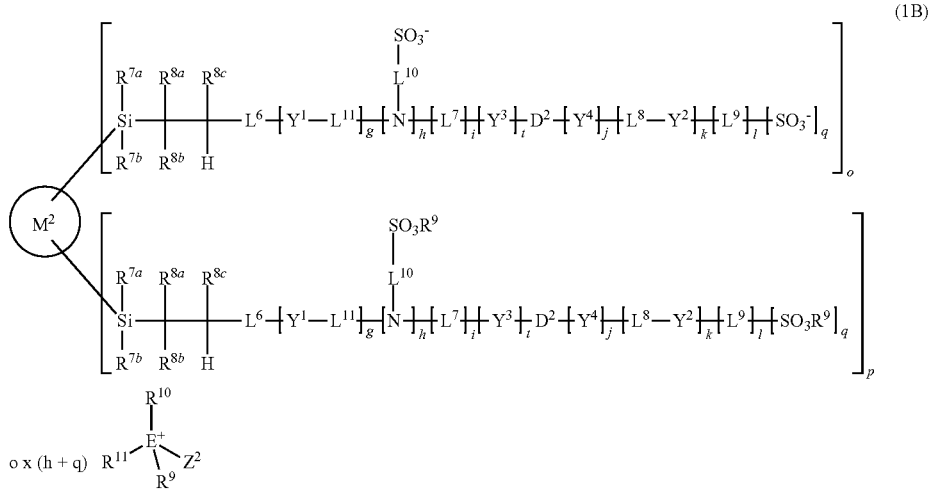

(1B)

wherein

is

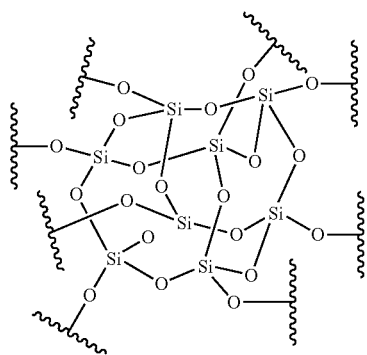

o is 1, 2, 3, 4, 5, 6, 7 or 8,
p is 8-o,
g is 0 or 1,
h is 0 or 1, $C_{5-8}$-cycloalkylene, $C_{6-14}$-arylene or $C_{5-8}$-cycloalkylene, wherein $L^7$, $L^8$, $L^9$, $L^{10}$ and $L^{11}$ may be substituted with one or more substituents selected from the group consisting of halogen, $OC_{1-6}$-alkyl, $NO_2$ and OH,
and
$D^2$ is of formula

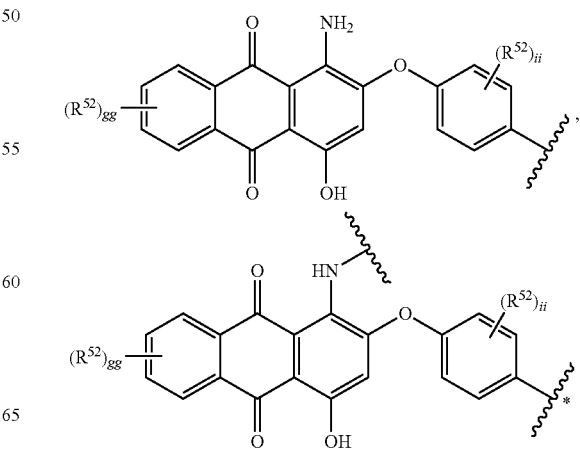

-continued

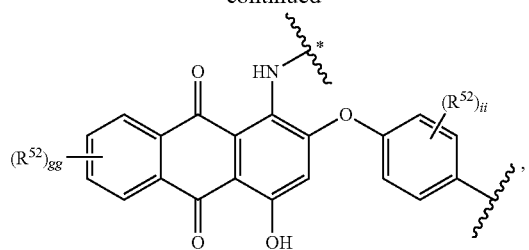

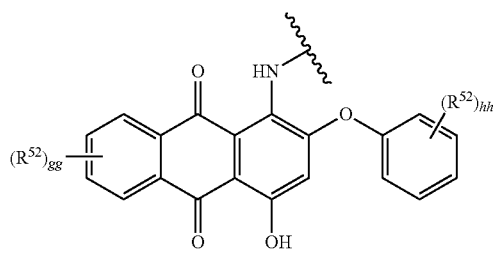

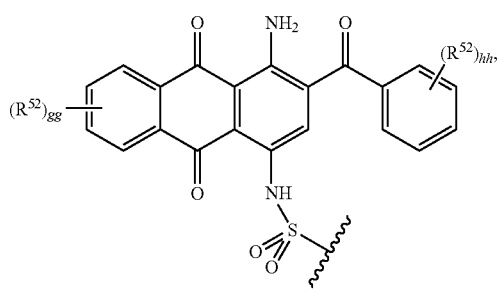

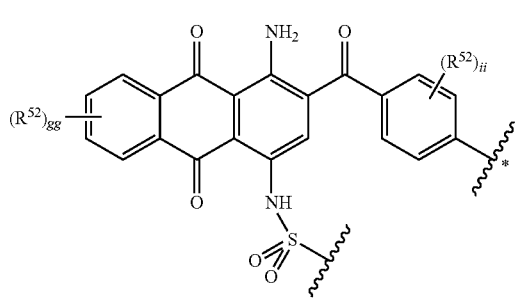

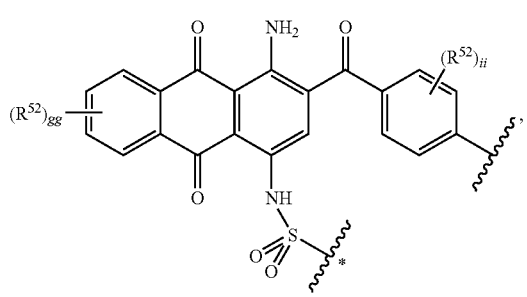

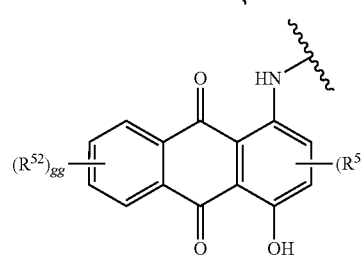

-continued

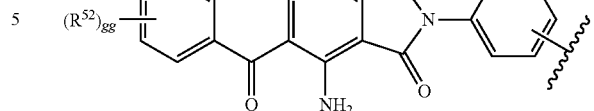

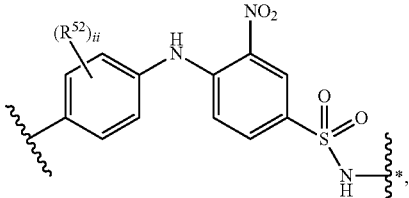

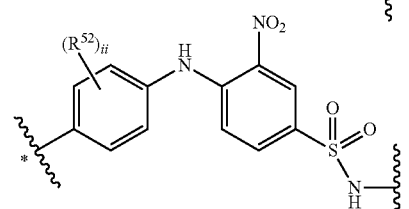

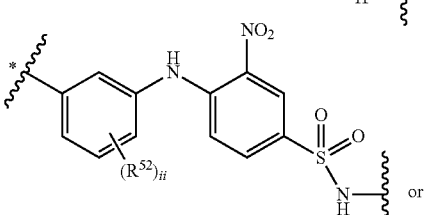 or

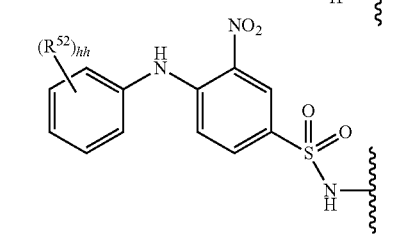

the bond marked with * is linked to

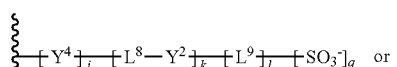 or

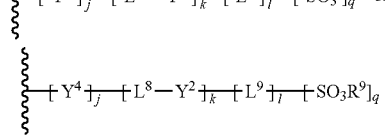

gg is an integer from 0 to 3,
hh is an integer from 0 to 2,
ii is an integer from 0 to 1, and
$R^{52}$ are independently from each other selected from the group consisting of $C_{1-20}$-alkyl, $C_{6-14}$-aryl, halogen, $OC_{1-6}$-alkyl, OH, $NH_2$ and $NO_2$,
$R^9$ is $C_{1-10}$-alkyl,
$R^{10}$ and $R^{11}$ are independently from each other $C_{1-20}$-alkyl, which may be substituted with one or more substituents selected from the group consisting of $C_{6-14}$-aryl, $OC_{1-6}$-alkyl and $NO_2$,
E is N or P,
$Z^2$ is $C_{1-100}$-alkyl, wherein one or more methylene groups are replaced by —$SiR^{102}R^{103}$—, —$SiR^{102}R^{103}O$—, —O— or —S—, with the proviso that —$SiR^{102}R^{103}$—, —$SiR^{102}R^{103}O$—, —O— or —S— are not directly linked to E, wherein $R^{102}$ and $R^{103}$ are independently from each other $C_{1-6}$-alkyl, More preferably, the compounds of the present invention are of formula

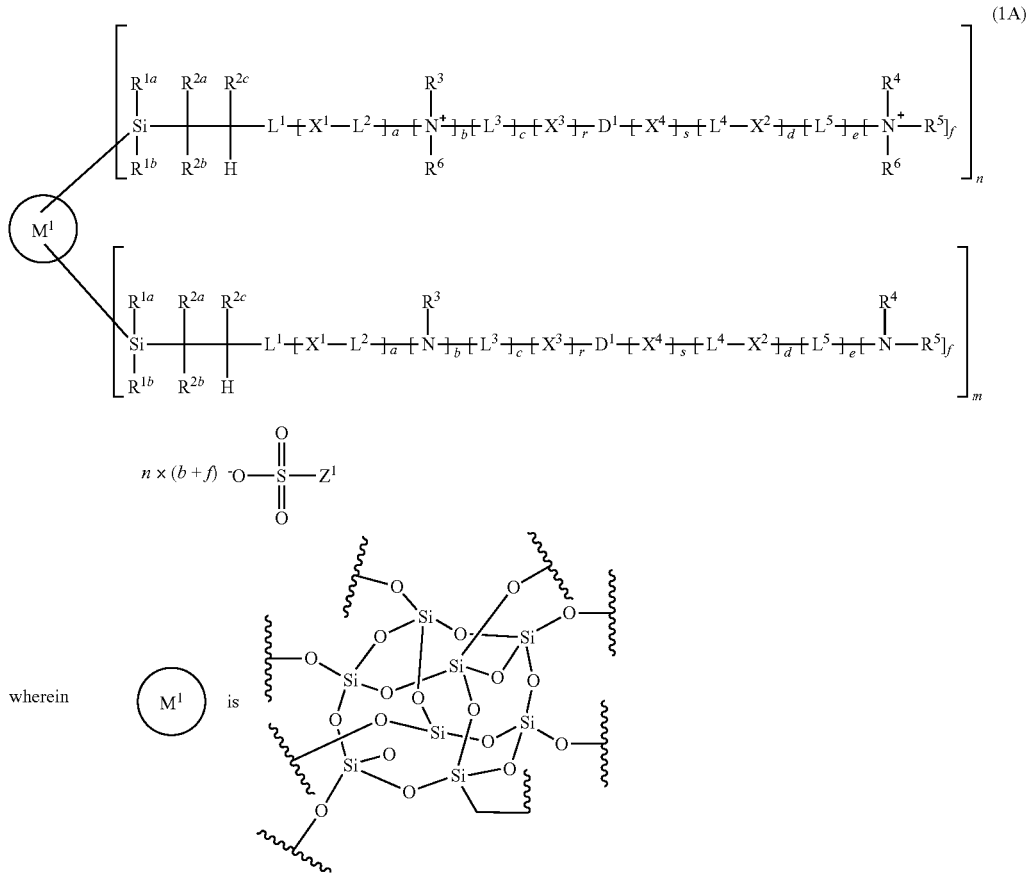

wherein 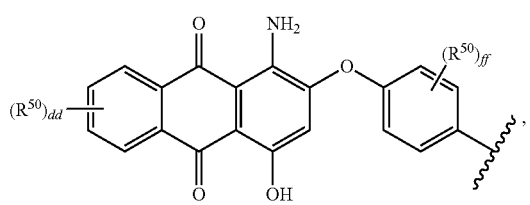

wherein
n is 1, 2, 3, 4, 5, 6 or 7,
m is 8-n,
a is 0 or 1,
b is 0 or 1,
c is 0 or 1,
r is 0 or 1,
s is 0
d is 0,
e is 0 or 1, and
f is 0 or 1,
with the proviso that at least b or f is 1, and with the proviso f is 0, then s, d and e are also 0,
$R^{1a}$ and $R^{1b}$ are independently from each other $C_{1-4}$-alkyl,
$R^{2a}$, $R^{2b}$ and $R^{2c}$ are independently from each other hydrogen or $C_{1-4}$-alkyl,
$L^1$ is $C_{1-10}$-alkylene or phenylene,
$X^1$ and $X^3$ are independently of each other O or S,
$L^2$, $L^3$ and $L^5$ are independently of each other $C_{1-20}$-alkylene or $C_{1-20}$-alkylene-phenylene or phenylene,
$R^3$, $R^4$ and $R^5$ are independently of each other $C_{1-10}$-alkyl or benzyl,
or
$L^2$ and $R^3$ or $L^3$ and $R^3$ together with the N linked to both of them form a 5, 6 or 7 membered ring,
or
$R^4$ and $R^5$ together with the N linked to both of them form a 5, 6 or 7 membered ring, which may also include O or S, or
$L^5$ and $R^4$ together with the N linked to both of them form a 5, 6 or 7 membered ring,
$R^6$ is $C_{1-20}$-alkyl, which may be substituted with phenyl,
$D^1$ is of formula

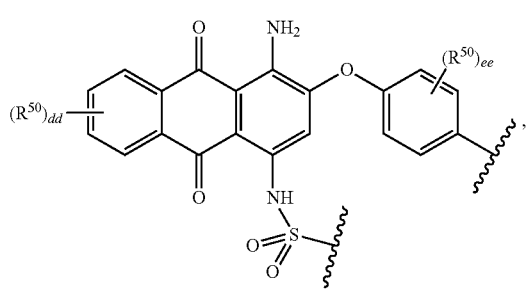

-continued

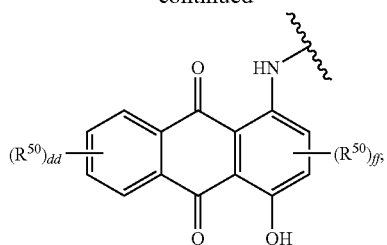

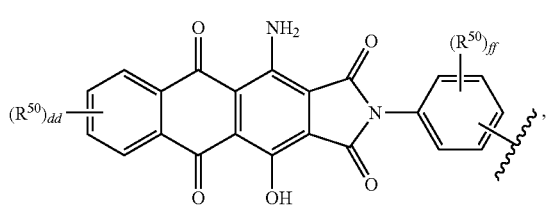

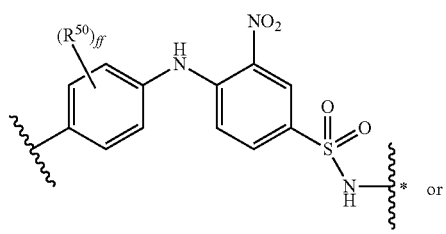

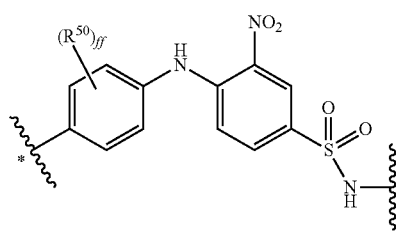

wherein the bond marked with * is linked to

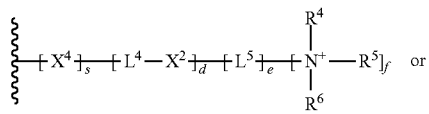   or

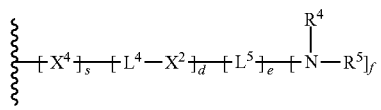

dd is an integer from 0 to 3, ee is an integer from 0 to 2, ff is an integer from 0 to 1, and $R^{50}$ are independently from each other selected from the group consisting of $C_{1-20}$-alkyl, $C_{6-14}$-aryl, halogen, $OC_{1-6}$-alkyl, OH, $NH_2$ and $NO_2$, $Z^1$ is $C_{1-50}$-alkyl, wherein one or more methylene groups are replaced by —$SiR^{100}R^{101}$—, —O— or —S—, with the proviso that —$SiR^{100}R^{101}$—, —O— or —S— are not directly linked to the S of

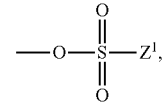

wherein $R^{100}$ and $R^{101}$ are independently from each other $C_{1-6}$-alkyl, or of formula

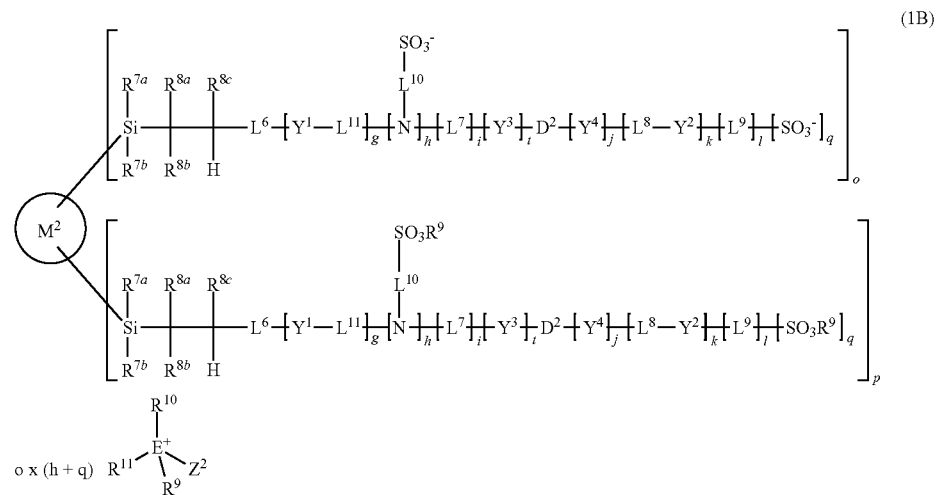

(1B)

wherein

M² is

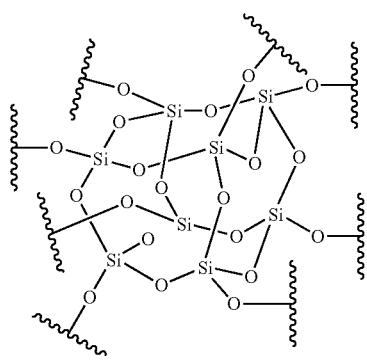

o is 1, 2, 3, 4, 5, 6, 7 or 8,
p is 8-o,
g is 0
h is 0 or 1,
i is 0 or 1,
t is 0 or 1,
j is 0 or 1,
k is 0
l is 0 or 1,
q is 0 or 1
with the proviso that at least h or q is 1, and with the proviso that if q is 0, then j, k and l are also 0,
$R^{7a}$ and $R^{7b}$ are independently of each other $C_{1-4}$-alkyl,
$R^{8a}$, $R^{8b}$ and $R^{8c}$ are independently from each other hydrogen or $C_{1-4}$-alkyl,
$L^6$ is $C_{1-10}$-alkylene or phenylene,
$Y^3$ and $Y^4$ are independently of each other O or $NR^{51}$, wherein $R^{51}$ is $C_{1-6}$-alkyl,
$L^7$, $L^9$ and $L^{10}$ are independently of each other $C_{1-20}$-alkylene or $C_{1-20}$-alkylene-phenylene or phenylene, and
$D^2$ is of formula

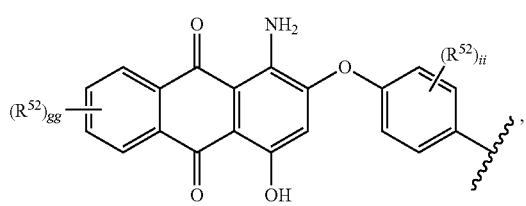

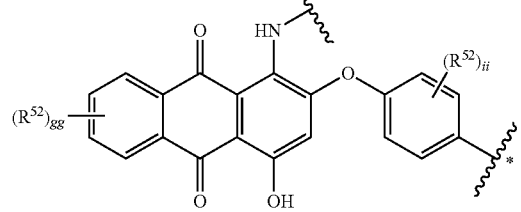

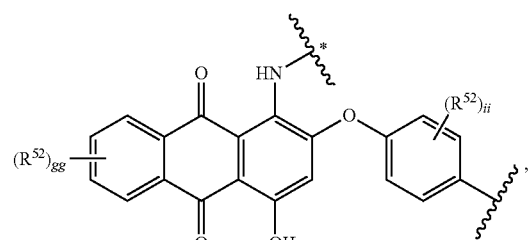

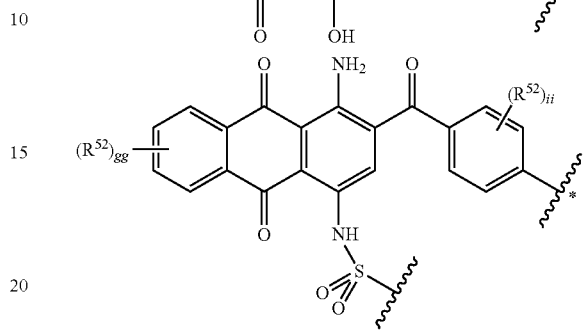

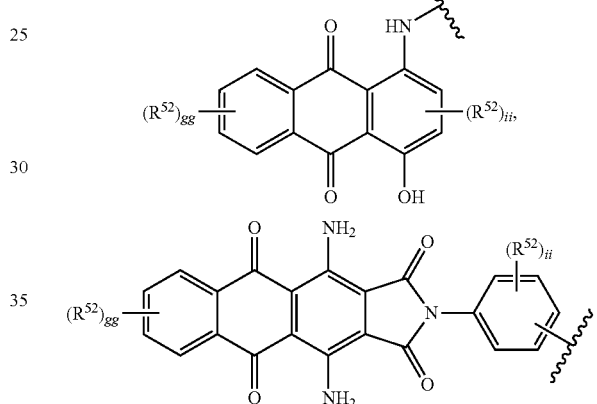

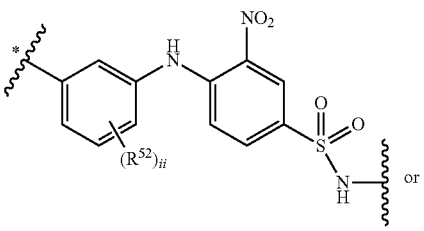

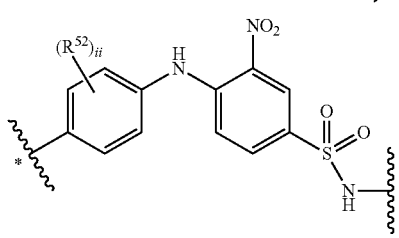

wherein
the bond marked with * is linked to

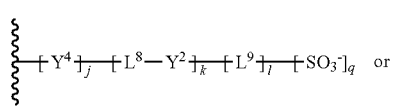

-continued

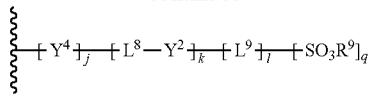

gg is an integer from 0 to 3,
hh is an integer from 0 to 2,
ii is an integer from 0 to 1, and
$R^{52}$ are independently from each other selected from the group consisting of $C_{1-20}$-alkyl, $C_{6-14}$-aryl, halogen, $OC_{1-6}$-alkyl, OH, $NH_2$ and $NO_2$,
$R^9$ is $C_{1-6}$-alkyl,
$R^{10}$ and $R^{11}$ are independently from each other $C_{1-6}$-alkyl, which may be substituted with phenyl,
E is N,
$Z^2$ is $C_{1-50}$-alkyl, wherein one or more methylene groups are replaced by —$SiR^{102}R^{103}$—, —$SiR^{102}R^{103}O$—, —O— or —S—, with the proviso that —$SiR^{102}R^{103}$—, —$SiR^{102}R^{103}O$—, —O— or —S— are not directly linked to E, wherein $R^{102}$ and $R^{103}$ are independently from each other $C_{1-6}$-alkyl, Most preferably, the compounds of the present invention are of formula

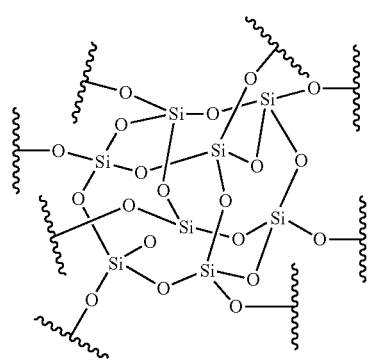

wherein $M^1$ is

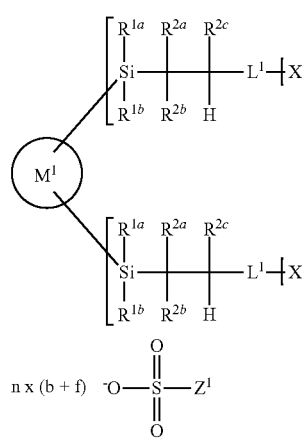

n is 1, 2, 3, 4, 5, 6 or 7,
m is 8-n, a is 0 or 1, b is 0 or 1, c is 0 or 1, r is 0 or 1, s is 0 d is 0, e is 0 or 1, f is 0 or 1, with the proviso that at least b or f is 1, and with the proviso f is 0, then s, d and e are also 0, and that if b is 1, then f is 0, and if f is 1, then b is 0, $R^{1a}$ and $R^{1b}$ are independently from each other methyl, $R^{2a}$, $R^{2b}$ and $R^{2c}$ are independently from each other hydrogen, $L^1$ is $C_{1-10}$-alkylene, $X^1$ and $X^3$ are O, $L^2$, $L^3$ and $L^5$ are independently of each other $C_{1-10}$-alkylene or $C_{1-10}$-alkylene-phenylene, $R^3$, $R^4$ and $R^5$ are independently of each other $C_{1-6}$-alkyl or benzyl, or $L^2$ and $R^3$ or $L^3$ and $R^3$ together with the N linked to both of them form a 6 membered ring, or R[4] and R[5] together with the N linked to both of them form a 6 membered ring, which may also include O or S, or L[5] and R[4] together with the N linked to both of them form a 6 membered ring, R[6] is $C_{1-10}$-alkyl, which may be substituted with phenyl, D[1] is of formula

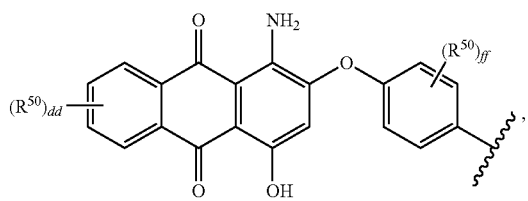

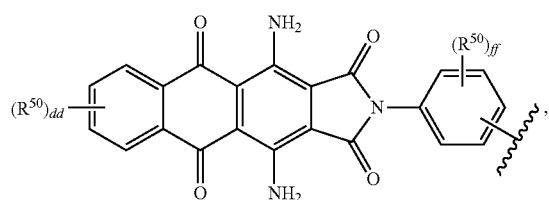

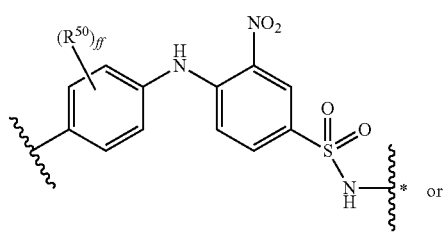

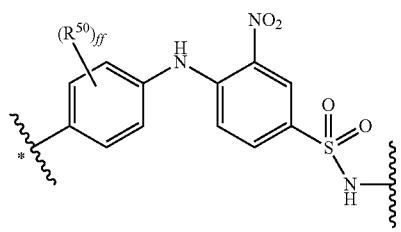

wherein the bond marked with * is linked to

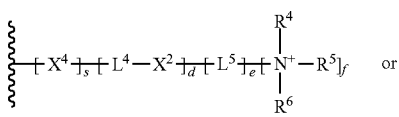

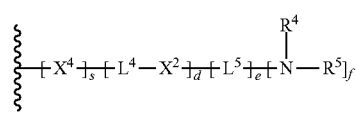

dd is an integer from 0 to 3, ee is an integer from 0 to 2, ff is an integer from 0 to 1, and R[50] are independently from each other selected from the group consisting of $C_{1-6}$-alkyl, OH, $NH_2$ and $NO_2$, Z[1] is

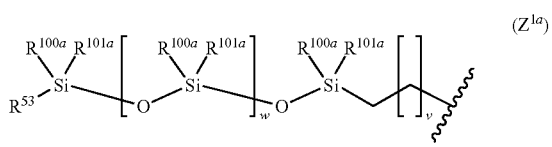

wherein

R[53] is $C_{1-10}$-alkyl,

R[100a] and R[101a] are independently from each other $C_{1-6}$-alkyl, v is an integer from 1 to 12, w is an integer from 2 to 25, or of formula

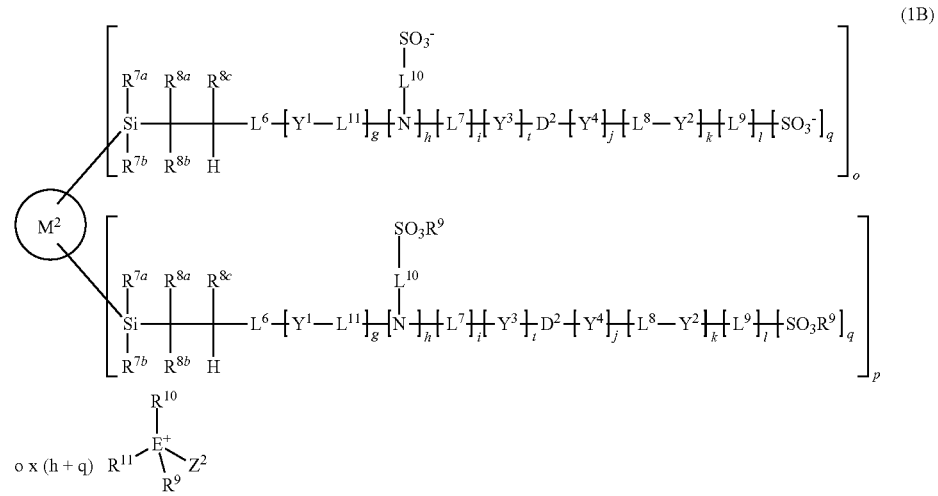

wherein

M² is

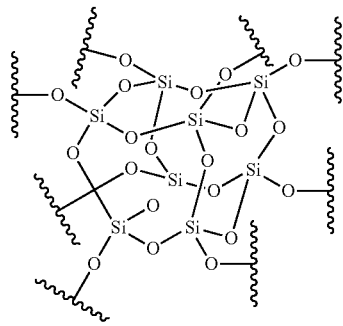

o is 1, 2, 3, 4, 5, 6, 7 or 8, p is 8-o, g is 0 h is 0 or 1, i is 0 or 1, t is 0 or 1, j is 0 or 1, k is 0 l is 0 or 1, g is 0 or 1 with the proviso that at least h or q is 1, and with the proviso that if q is 0, then j, k and l are also 0, and that if h is 1, then q is 0, and if q is 1, then h is 0, $R^{7a}$ and $R^{7b}$ are methyl, $R^{8a}$, $R^{8b}$ and $R^{8c}$ are hydrogen, $L^6$ is $C_{1-10}$-alkylene or phenylene, $Y^3$ and $Y^4$ are independently of each other O or $NR^{51}$, wherein $R^{51}$ is $C_{1-6}$-alkyl, $L^7$, $L^9$ and $L^{10}$ are independently of each other $C_{1-10}$-alkylene or $C_{1-10}$-alkylene-phenylene, $D^2$ is formula

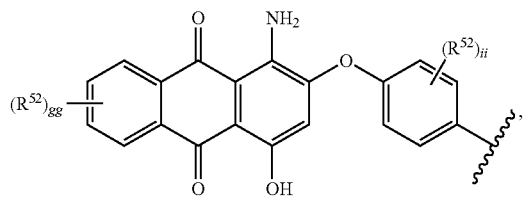

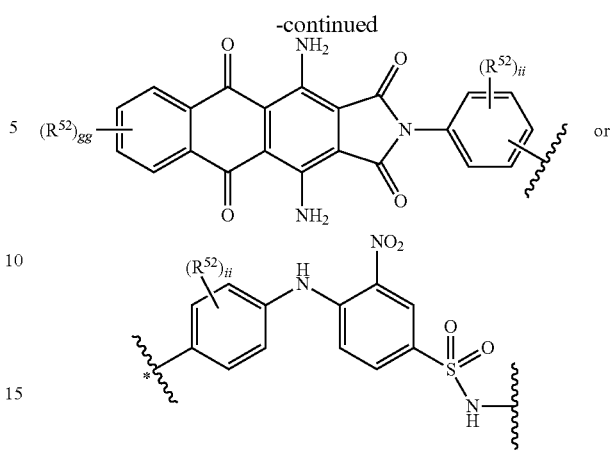

wherein the bond marked with * is linked to

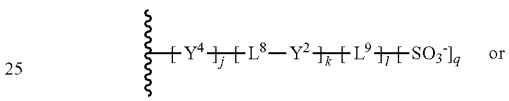

or $$\{-[Y^4]_j-[L^8-Y^2]_k-[L^9]_l-SO_3R^9]_q$$

gg is an integer from 0 to 3, hh is an integer from 0 to 2, ii is an integer from 0 to 1, and $R^{52}$ are independently from each other selected from the group consisting of $C_{1-6}$-alkyl, OH, $NH_2$ and $NO_2$, $R^9$ is $C_{1-6}$-alkyl, $R^{10}$ and $R^{11}$ are independently from each other $C_{1-6}$-alkyl, which may be substituted with phenyl, E is N, $Z^2$ is

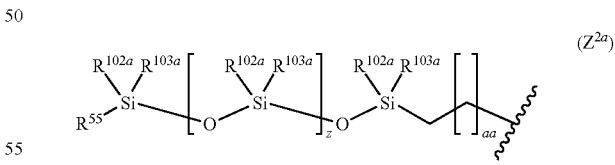

wherein $R^{55}$ is $C_{1-10}$-alkyl, $R^{102a}$ and $R^{103a}$ are independently from each other $C_{1-6}$-alkyl, aa is an integer from 1 to 12, z is an integer from 2 to 25.

In particular, the compounds of the present invention are of formula

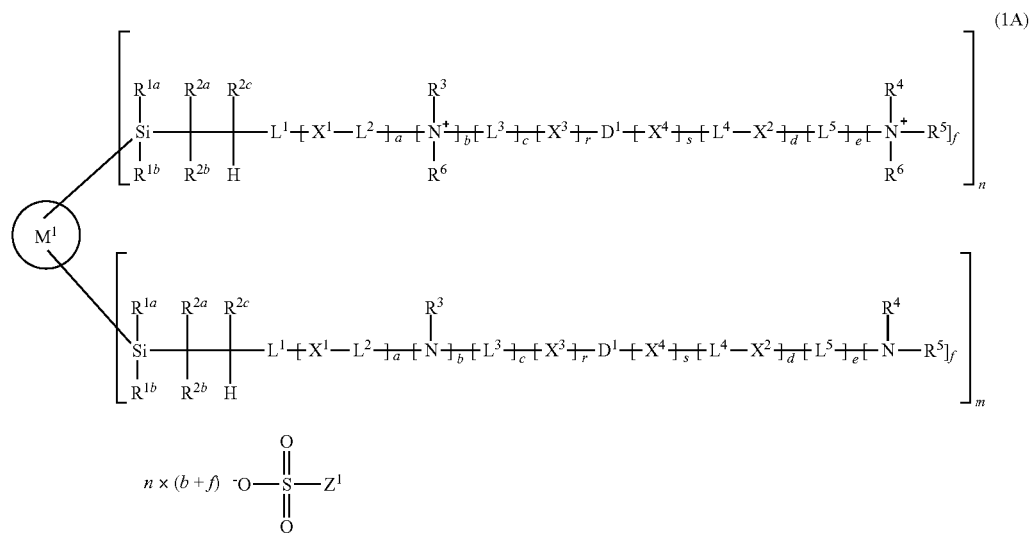

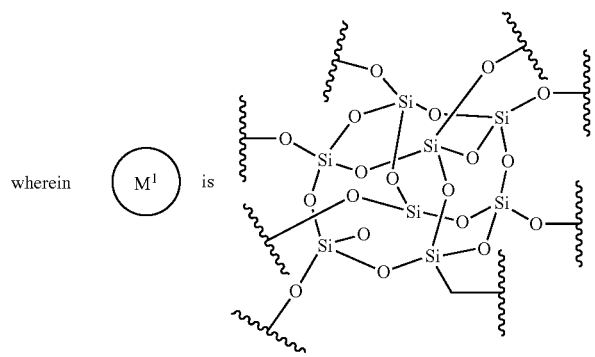

wherein M¹ is

- n is 1, 2, 3, 4 or 5,
- m is 8-n,
- a is 0
- b is 0 or 1,
- c is 0 or 1,
- r is 0
- s is 0
- d is 0,
- e is 0 or 1, and
- f is 0 or 1,
- with the proviso that at least b or f is 1, and with the proviso f is 0, then s, d and e are also 0, and that if b is 1, then f is 0, and if f is 1, then b is 0,
- $R^{1a}$ and $R^{1b}$ are independently from each other methyl,
- $R^{2a}$, $R^{2b}$ and $R^{2c}$ are independently from each other hydrogen,
- $L^1$ is methylene,
- $L^3$ and $L^5$ are independently of each other $C_{1-2}$-alkylene or $C_{1-2}$-alkylene-phenylene,
- $R^3$, $R^4$ and $R^5$ are independently of each other $C_{1-6}$-alkyl or benzyl, or
- $L^2$ and $R^3$ or $L^3$ and $R^3$ together with the N linked to both of them form

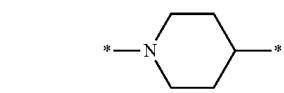 [SMILES: *C1CCN(*)CC1]

or $R^4$ and $R^5$ together with the N linked to both of them form

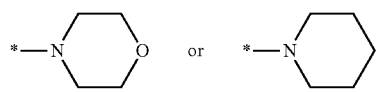 [SMILES: *N1CCOCC1 ; *N1CCCCC1]

- $R^6$ is methyl or benzyl,
- $D^1$ is of formula

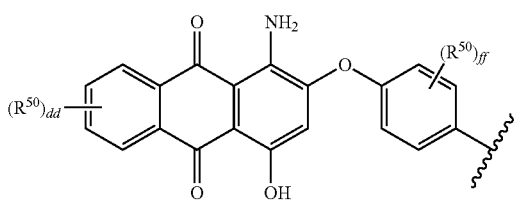

-continued

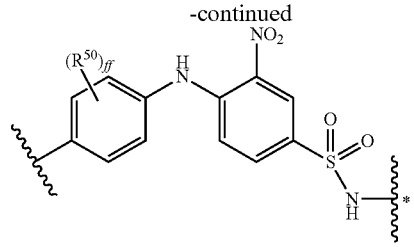

or

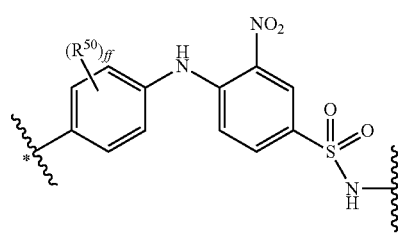

wherein
the bond marked with * is linked to

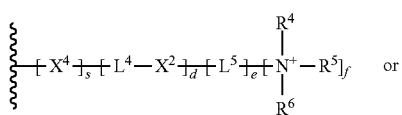

or

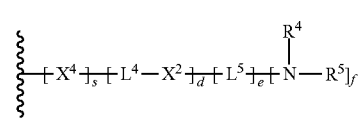

dd is an integer from 0 to 3,
ee is an integer from 0 to 2,
ff is an integer from 0 to 1, and
$R^{50}$ are independently from each other selected from the group consisting of $C_{1-6}$-alkyl, OH, $NH_2$ and $NO_2$, $Z^1$ is

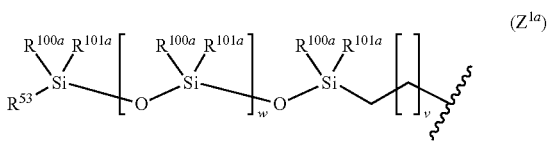

wherein $R^{53}$ is $C_{1-6}$-alkyl, $R^{100a}$ and $R^{101a}$ are methyl, v is an integer from 2 to 6, w is an integer from 5 to 20, or of formula

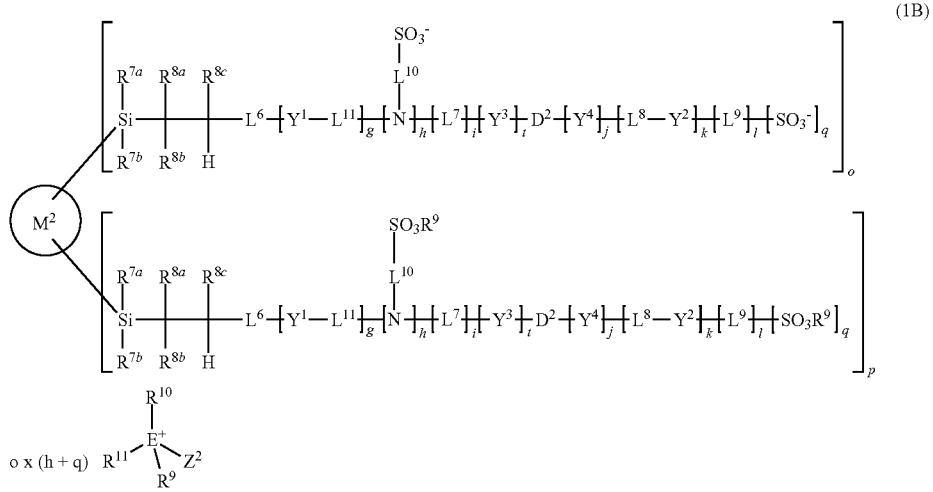

wherein $M^2$ is

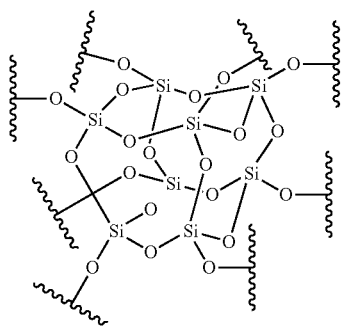

o is 1, 2, 3, 4, 5, 6, 7 or 8,
p is 8-o,
g is 0
h is 0 or 1,
i is 0 or 1,
t is 0 or 1,
j is 0 or 1,
k is 0
l is 0 or 1,
q is 0 or 1
with the proviso that at least h or q is 1, and with the proviso that if q is 0, then j, k and l are also 0, and that if h is 1, then q is 0, and if q is 1, then h is 0,
$R^{7a}$ and $R^{7b}$ are methyl,
$R^{8a}$, $R^{8b}$ and $R^{8c}$ are hydrogen,
$L^6$ is $C_{1-2}$-alkylene or phenylene,
$Y^3$ and $Y^4$ are independently of each other O or $NR^{51}$, wherein $R^{51}$ is methyl,
$L^7$, $L^9$ and $L^{10}$ are independently of each other $C_{1-2}$-alkylene or $C_{1-2}$-alkylene-phenylene,
and
$D^2$ is formula

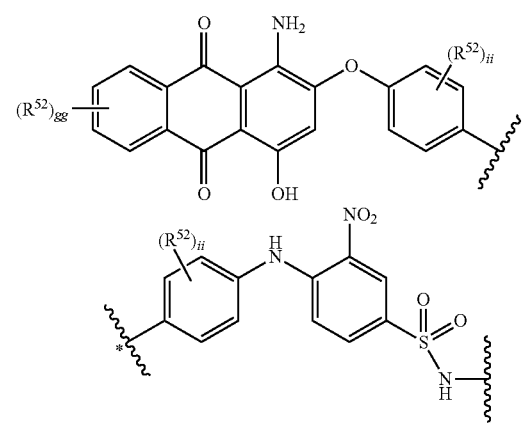

or wherein
the bond marked with * is linked to

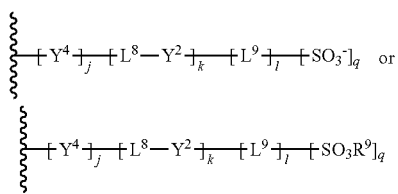

gg is an integer from 0 to 3,
hh is an integer from 0 to 2,
ii is an integer from 0 to 1, and
$R^{52}$ are independently from each other selected from the group consisting of $C_{1-6}$-alkyl, OH, $NH_2$ and $NO_2$,
$R^9$ is methyl,
$R^{10}$ and $R^{11}$ are independently from each other $C_{1-6}$-alkyl, which may be substituted with phenyl,
E is N, $Z^2$ is

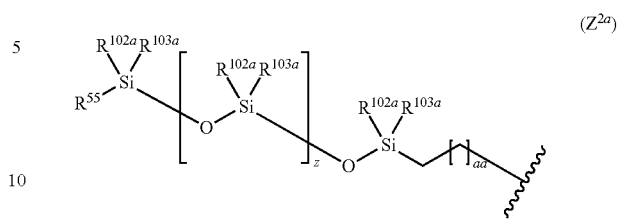

wherein
$R^{55}$ is $C_{1-6}$-butyl,
$R^{102a}$ and $R^{103a}$ are methyl,
aa is an integer from 2 to 10,
z is an integer from 5 to 20.
  Preferably, n is 1, 2, 3, 4, 5, 6 or 7, and m is 8-n. More preferably n is 1, 2, 3, 4 or 5, and m is 8-n
  Preferably, $R^6$ is methyl or benzyl.
  Preferably, $L^1$ is $C_{1-4}$-alkylene, preferably methylene.
  Preferably, $L^2$, $L^3$, $L^4$ and $L^5$ are independently of each $C_{1-4}$-alkylene or $C_{1-4}$-alkylene-phenylene, more preferably methylene, ethylene or phenylene-methylene,
  $R^3$, $R^4$ and $R^5$ are independently of each methyl or benzyl, or
  $L^2$ and $R^3$ or $L^3$ and $R^3$ together with the N linked to both of them form

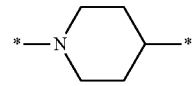 [SMILES: *C1CCN(*)CC1]

or
$R^4$ and $R^5$ together with the N linked to both of them form

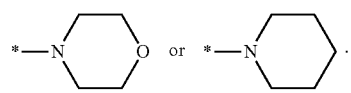 [SMILES: *N1CCOCC1 ; "or" ; *N1CCCCC1 ; "."]

Preferably, $R^{50}$ are independently from each other selected from the group consisting of OH and $NO_2$.
  Preferably $R^{100}$ and $R^{101}$ are methyl.
  Preferably, $R^{53}$ is butyl, $R^{100a}$ and $R^{101a}$ are methyl, v is 3, and w is an integer from 8 to 15, preferably 11.
  Preferably,
  $R^{54}$ is $C_{1-6}$-alkyl, more preferably ethyl,
  x is an integer from 5 to 20, more preferably from 8 to 15, most preferably 12, and
  y is an integer from 1 to 2, more preferably 1.
  Preferably, $R^9$ is methyl.
  Preferably, $L^6$ is $C_{1-4}$-alkylene or phenylene, more preferably $L^6$ is methylene, ethylene or phenylene.
  Preferably, $Y^1$, $Y^2$, $Y^3$ and $Y^4$ are independently of each other O or $NR^{51}$, wherein $R^{51}$ is methyl.
  Preferably, $L^7$, $L^8$, $L^9$, $L^{10}$ and $L^{11}$ are independently of each other $C_{1-4}$-alkylene or $C_{1-4}$-alkylene-phenylene, preferably methylene, ethylene or methylene-phenylene.
  Preferably, $R^{52}$ are independently from each other selected from the group consisting of OH and $NO_2$.
  Preferably, $R^{10}$ and $R^{11}$ are independently from each other methyl, butyl or benzyl.
  Preferably $R^{102}$ and $R^{103}$ are methyl.

Preferably, $R^{55}$ is butyl, $R^{102a}$ and $R^{103a}$ are methyl, aa is an integer from 2 or 10, and z is an integer from 8 to 15, preferably 11.

Preferably, $R^{56}$ is $C_{1-6}$-alkyl, more preferably ethyl bb is preferably an integer from 5 to 20, more preferably from 8 to 15, most preferably 12, and cc is an integer from 1 to 2, more preferably 1.

In particular preferred are the specific compounds of formulae (1A) or (1B) disclosed in the examples.

The compounds of formula (1A) disclosed in the examples are (1A1), (1A2), (1A3), (1A4), (1A5), (1A6), (1A7), (1A8), (1A9) and (1A10).

The compounds of formula (1B) disclosed in the examples are (1B1) and (1B2).

Also part of the present invention, is a process for the preparation of the compounds of formula (1A), which process comprises the step of reacting a compound of formula

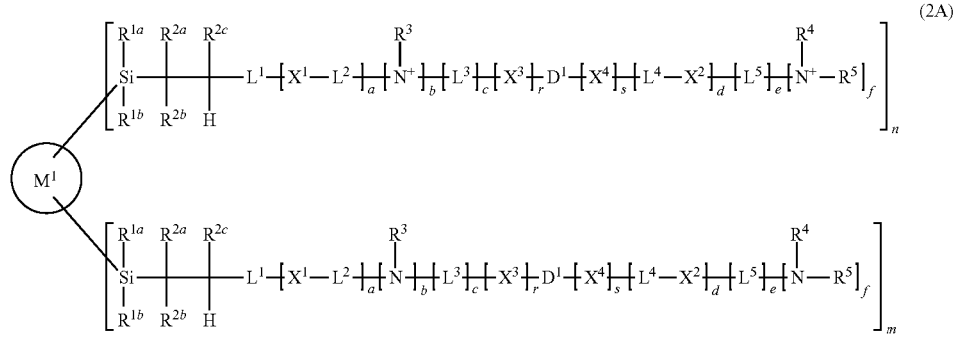

(2A)

wherein

is

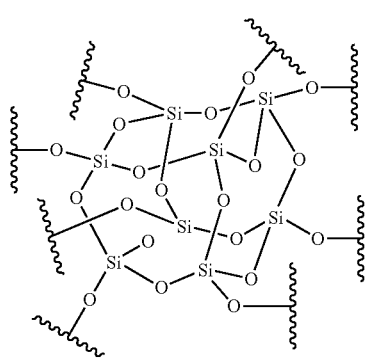

n is 1, 2, 3, 4, 5, 6, 7 or 8,
m is 8-n,
a is 0 or 1,
b is 0 or 1,
c is 0 or 1,
r is 0 or 1,
s is 0 or 1,
d is 0 or 1,
e is 0 or 1,
f is 0 or 1,
with the proviso that at least b or f is 1, and with the proviso f is 0, then s, d and e are also 0,
$R^{1a}$ and $R^{1b}$ are independently from each other $C_{1-4}$-alkyl,
$R^{2a}$, $R^{2b}$ and $R^{2c}$ are independently from each other hydrogen or $C_{1-4}$-alkyl,
$L^1$ is $C_{1-20}$-alkylene, $C_{1-20}$-alkylene-phenylene, $C_{1-20}$-alkylene-$C_{5-8}$-cycloalkylene, phenylene or $C_{5-8}$-cycloalkylene, wherein $L^1$ may be substituted with one or more substituents selected from the group consisting of halogen, $OC_{1-6}$-alkyl, $NO_2$ and OH,
$X^1$, $X^2$, $X^3$ and $X^4$ are independently of each other O, S, C(O) or C(O)O,
$L^2$, $L^3$, $L^4$ and $L^5$ are independently of each other $C_{1-20}$-alkylene, $C_{1-20}$-alkylene-phenylene, $C_{1-20}$-alkylene-$C_{5-8}$-cycloalkylene, phenylene or $C_{5-8}$-cycloalkylene, wherein $L^2$, $L^3$, $L^4$ and $L^5$ may be substituted with one or more substituents selected from the group consisting of halogen, $OC_{1-6}$-alkyl, $NO_2$ and OH,
$R^3$, $R^4$ and $R^5$ are independently of each other $C_{1-20}$-alkyl, which may be substituted with a substituent selected from the group consisting of $C_{6-14}$-aryl, $OC_{1-6}$-alkyl, and $NO_2$,
or
$L^2$ and $R^3$ or $L^3$ and $R^3$ together with the N linked to both of them form a 5, 6 or 7 membered ring,
or
$R^4$ and $R^5$ together with the N linked to both of them form a 5, 6 or 7 membered ring, which may also include O or S,
or
$L^5$ and $R^4$ together with the N linked to both of them form a 5, 6 or 7 membered ring, and
$D^1$ is a chromophoric moiety, which may be substituted with one or more $R^{50}$, wherein $R^{50}$ are independently from each other selected from the group consisting of $C_{1-20}$-alkyl, $C_{6-14}$-aryl, halogen, $OC_{1-6}$-alkyl, OH, $NH_2$ and $NO_2$,
with a compound of formula

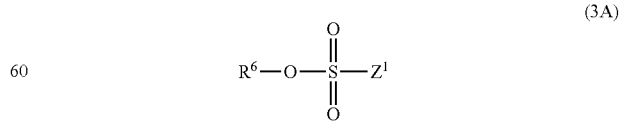

(3A)

wherein $R^6$ is $C_{1-20}$-alkyl, which may be substituted with a substituent selected from the group consisting of $C_{6-14}$-aryl, $OC_{1-6}$-alkyl, and $NO_2$, $Z^1$ is $C_{1-100}$-alkyl, wherein one or more methylene groups are replaced by —SiR$^{100}$R$^{101}$—, —SiR$^{100}$R$^{101}$O—, —O— or —S—, with the proviso that —SiR$^{100}$R$^{101}$—, —SiR$^{100}$R$^{101}$O—, —O— or —S— are not directly linked to the S of

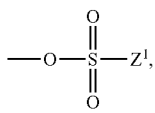

wherein R$^{100}$ and R$^{101}$ are independently from each other $C_{1-6}$-alkyl.

The compound of formula (2A) may be reacted with the compound of formula (3A) in the presence of an inert organic solvent. Examples of inert organic solvents are ethers such as dioxane, tetrahydrofuran or diethylether; and halogenated hydrocarbons such as chloroform. Preferably, the compound of formula (2A) is reacted with the compound of formula (3A) at a temperature in the range from 20 to 200° C., preferably at a temperature in the range from 50 to 150° C., more preferably at a temperature in the range from 50 to 110° C.

The molar ratio of the compound of formula (3A)/compound of formula (2A) can be in the range of 0.1 to 20, preferably in the range of 0.5 to 15, more preferably in the range of 0.7 to 10.

The compound of formula (2A) may be prepared by reacting a compound of formula (4A)

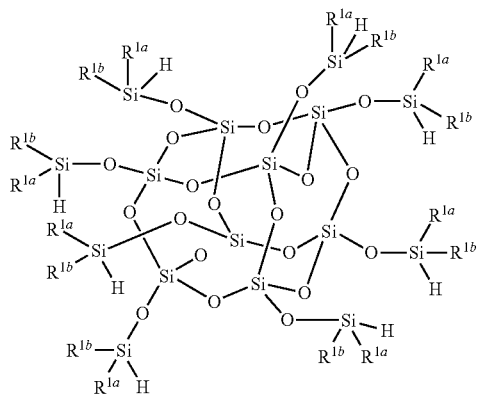

wherein
R$^{1a}$ and R$^{1b}$ are independently from each other $C_{1-4}$-alkyl, with a compound of formula (5A)

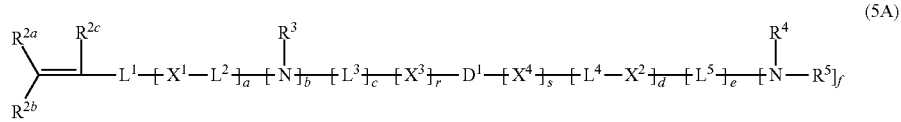

wherein
a is 0 or 1,
b is 0 or 1,
c is 0 or 1,
r is 0 or 1,
s is 0 or 1,
d is 0 or 1,
e is 0 or 1,
f is 0 or 1,
with the proviso that at least b or f is 1, and with the proviso f is 0, then s, d and e are also 0,
R$^{2a}$, R$^{2b}$ and R$^{2c}$ are independently from each other hydrogen or $C_{1-4}$-alkyl,
L$^1$ is $C_{1-20}$-alkylene, $C_{1-20}$-alkylene-phenylene, $C_{1-20}$-alkylene-$C_{5-8}$-cycloalkylene, phenylene or $C_{5-8}$-cycloalkylene, wherein L$^1$ may be substituted with one or more substituents selected from the group consisting of halogen, OC$_{1-6}$-alkyl, NO$_2$ and OH,
X$^1$, X$^2$, X$^3$ and X$^4$ are independently of each other O, S, C(O) or C(O)O,
L$^2$, L$^3$, L$^4$ and L$^5$ are independently of each other $C_{1-20}$-alkylene, $C_{1-20}$-alkylene-phenylene, $C_{1-20}$-alkylene-$C_{5-8}$-cycloalkylene, phenylene or $C_{5-8}$-cycloalkylene, wherein L$^2$, L$^3$, L$^4$ and L$^5$ may be substituted with one or more substituents selected from the group consisting of halogen, OC$_{1-6}$-alkyl, NO$_2$ and OH,
R$^3$, R$^4$ and R$^5$ are independently of each other $C_{1-20}$-alkyl, which may be substituted with a substituent selected from the group consisting of $C_{6-14}$-aryl, OC$_{1-6}$-alkyl, and NO$_2$, or
L$^2$ and R$^3$ or L$^3$ and R$^3$ together with the N linked to both of them form a 5, 6 or 7 membered ring,
or
R$^4$ and R$^5$ together with the N linked to both of them form a 5, 6 or 7 membered ring, which may also include O or S,
or
L$^5$ and R$^4$ together with the N linked to both of them form a 5, 6 or 7 membered ring, and
D$^1$ is a chromophoric moiety, which may be substituted with one or more R$^{50}$, wherein R$^{50}$ are independently from each other selected from the group consisting of $C_{1-20}$-alkyl, $C_{6-14}$-aryl, halogen, OC$_{1-6}$-alkyl, OH, NH$_2$ and NO$_2$.

The compound of formula (4A) can be reacted with the compound of formula (5A) in the presence of an inert organic solvent. Examples of inert organic solvents are hydrocarbons such as toluene. The compound of formula (4A) can be reacted with the compound of formula (5A) in the presence of a catalyst. Suitable catalysts are for example platinum containing compounds such as hexachloroplatinic acid, also known as Speier's catalyst, or Pt$_2$[(CH$_2$=CH$_2$Si(Me)$_2$)$_2$O]$_3$, also known as Karstedt's catalyst, or various other catalysts described by N. Sabourault at al. in Org. Lett. 2002, 4(3), 2117. The compound of formula (4A) is usually reacted with the compound of formula (5A) at a temperature in the range of 20 to 200° C., preferably at a temperature in the range of 40 to 120° C., more preferably at a temperature in the range of 60 to 100° C.

The compound of formula (4A), wherein R$^{1a}$ and R$^{1b}$ are methyl, may be prepared according to D. Höbbel et al., Z. Chem. 1989, 29(7), 260-261 or according to reference example C) of WO 2007/147742. Alternatively, compound (4A) can directly be bought from Sigma-Aldrich ("Aldrich"), St. Louis, Mo., USA.

The compound of formula (5A) can be prepared by methods known in the art.

The compound of formula (3A) may be a compound of formula $$R^6-O-\underset{\underset{O}{\|}}{\overset{\overset{O}{\|}}{S}}-Z^{1a} \qquad (3AX)$$

wherein $R^6$ is $C_{1-20}$-alkyl, which may be substituted with a substituent selected from the group consisting of $C_{6-14}$-aryl, $OC_{1-6}$-alkyl and $NO_2$, and $Z^{1a}$ is

[structure with $R^{53}$, $R^{100a}$, $R^{101a}$, Si-O chain, subscripts w and v]

wherein $R^{53}$ is $C_{1-6}$-alkyl, $R^{100a}$ and $R^{101a}$ are methyl, v is an integer from 2 to 6, w is an integer from 5 to 20;

or of formula $$R^6-O-\underset{\underset{O}{\|}}{\overset{\overset{O}{\|}}{S}}-Z^{1b} \qquad (3AY)$$

wherein $R^6$ is $C_{1-20}$-alkyl, which may be substituted with a substituent selected from the group consisting of $C_{6-14}$-aryl, $OC_{1-6}$-alkyl, and $NO_2$, and $Z^{1b}$ is

[structure with $R^{54}$-O, repeating O units, subscripts x and y]

wherein $R^{54}$ is $C_{1-10}$-alkyl, x is an integer from 5 to 25, and y is an integer from 1 to 5.

The compound of formula (3AX) may be prepared by reacting a compound of formula

[structure 6A with $R^{53}$, $R^{100a}$, $R^{101a}$, Si-O chain terminating in Si-H, subscript w] (6A)

wherein $R^{53}$ is $C_{1-6}$-alkyl, $R^{100a}$ and $R^{101a}$ are methyl, w is an integer from 5 to 20;

with a compound of formula $$R^6-O-\underset{\underset{O}{\|}}{\overset{\overset{O}{\|}}{S}}-\!\!\!\!\!\overset{}{\underset{v\text{-}1}{\frown}}\!\!\!\!\!= \qquad (7A)$$

wherein $R^6$ is $C_{1-20}$-alkyl, which may be substituted with a substituent selected from the group consisting of $C_{6-14}$-aryl, $OC_{1-6}$-alkyl, and $NO_2$, and v is an integer from 2 to 6.

The compound of formula (6A) can be reacted with the compound of formula (7A) in the presence of an inert organic solvent. Examples of inert organic solvents are hydrocarbons such as toluene. The compound of formula (6A) can be reacted with the compound of formula (7A) in the presence of a catalyst. Suitable catalysts are for example platinum containing compounds such as hexachloroplatinic acid, also known as Speier's catalyst, or $Pt_2[(CH_2=CH_2Si(Me)_2)_2O]_3$, also known as Karstedt's catalyst, or various other catalysts described by N. Sabourault at al. in Org. Lett. 2002, 4(3), 2117. The compound of formula (6A) is usually reacted with the compound of formula (7A) at a temperature in the range of 0 to 160° C., preferably at a temperature in the range of 10 to 100° C., more preferably at a temperature in the range of 15 to 40° C.

The compound of formula

[structure 6A1 with butyl-Si-O-Si-O-Si-H, subscript 11] (6A1)

is commercially available (Supplier ABCR).

The compound of formula (7A) can be prepared by methods known in the art.

The compounds of formula (3AY) can be prepared by reacting a compound of formula (10)

$$\text{Hal-}\underset{\underset{O}{\|}}{\overset{\overset{O}{\|}}{S}}-Z^{1b} \qquad (10)$$

wherein

Hal is halogen, preferably Cl, $Z^{1b}$ is

[structure with $R^{54}$-O, repeating units, subscripts x and y]

wherein $R^{54}$ is $C_{1-10}$-alkyl, x is an integer from 5 to 25, and y is an integer from 1 to 5.

with $R^6$—O—Na, wherein $R^6$ is $C_{1-20}$-alkyl, which may be substituted with a substituent selected from the group consisting of $C_{6-14}$-aryl, $OC_{1-6}$-alkyl, and $NO_2$.

The compounds of formula (10) are usually reacted with Na—O—$R^6$ in the presence of a suitable solvent such as methanol. The compounds of formula (10) are usually reacted with Na—O—$R^6$ at a temperature of around 0° C.

The compounds of formula (10) can be prepared by methods known in the art.

Also part of the present invention, is a process for the preparation of compounds of formula (1B), which process comprises the step of reacting a compound of formula $R^{7a}$ and $R^{7b}$ are independently of each other $C_{1-4}$-alkyl, $R^{8a}$, $R^{8b}$ and $R^{8c}$ are independently from each other hydrogen or $C_{1-4}$-alkyl, $L^6$ is $C_{1-20}$-alkylene, $C_{1-20}$-alkylene-phenylene, $C_{1-20}$-alkylene-$C_{5-8}$-cycloalkylene, phenylene or $C_{5-8}$-cycloalkylene, wherein $L^6$ may be substituted with one or more substitutents selected from the group consisting of halogen, $OC_{1-6}$-alkyl, $NO_2$ and OH, $Y^1$, $Y^2$, $Y^3$ and $Y^4$ are independently of each other $NR^{51}$, O, S, C(O) or C(O)O, wherein $R^{51}$ is $C_{1-20}$-alkyl, $L^7$, $L^8$, $L^9$, $L^{10}$ and $L^{11}$ are independently of each other $C_{1-20}$-alkylene, $C_{1-20}$-alkylene-phenylene or $C_{1-20}$-alkylene-$C_{5-8}$-cycloalkylene, phenylene or $C_{5-8}$-cycloalkylene,

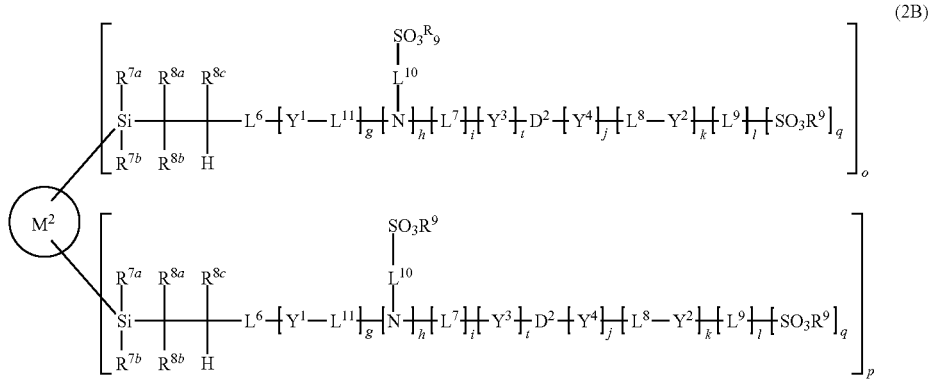

(2B)

wherein

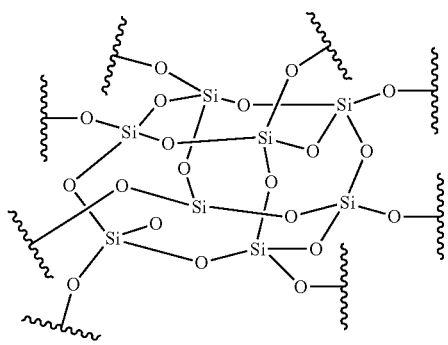

is wherein $L^7$, $L^8$, $L^9$, $L^{10}$ and $L^{11}$ may be substituted with one or more substituents selected from the group consisting of halogen, $OC_{1-6}$-alkyl, $NO_2$ and OH, and $R^9$ is $C_{1-10}$-alkyl, $D^2$ is a chromophoric moiety, which may be substituted with one or more $R^{52}$, wherein $R^{52}$ are independently from each other selected from the group consisting of $C_{1-20}$-alkyl, $C_{6-14}$-aryl, halogen, $OC_{1-6}$-alkyl, OH, $NH_2$ and $NO_2$, with a compound of formula

(3B)

wherein $R^{10}$ and $R^{11}$ are independently from each other $C_{1-20}$-alkyl, which may be substituted with one or more substituents selected from the group consisting of $C_{6-14}$-aryl, $OC_{1-6}$-alkyl, and $NO_2$, E is N or P, $Z^2$ is $C_{1-100}$-alkyl, wherein one or more methylene groups are replaced by —$SiR^{102}R^{103}$—, —$SiR^{102}R^{103}O$—, —O— or —S—, with the proviso that —$SiR^{102}R^{103}$—, —$SiR^{102}R^{103}O$—, —O— or —S— are not directly linked to E, wherein $R^{102}$ and $R^{103}$ are independently from each other $C_{1-6}$-alkyl.

o is 1, 2, 3, 4, 5, 6, 7 or 8,
p is 8-o,
g is 0 or 1,
h is 0 or 1,
i is 0 or 1,
t is 0 or 1,
j is 0 or 1,
k is 0 or 1,
l is 0 or 1,
q is 0 or 1
with the proviso that at least h or q is 1, and with the proviso that if q is 0, then j, k and l are also 0, The compound of formula (2B) may be reacted with the compound of formula (3B) in the presence of an inert organic solvent. Examples of inert organic solvents are ethers such as dioxane or tetrahydrofuran, hydrocarbons such as toluene, and halogenated hydrocarbons such as chloroform. Preferably, the compound of formula (2B) is reacted with the compound of formula (3B) at a temperature in the range from 40 to 120° C., preferably at a temperature in the range from 40 to 70° C.

The molar ratio of the compound of formula (3B)/compound of formula (2B) can be in the range of 0.1 to 20, preferably in the range of 0.5 to 15, more preferably in the range of 0.7 to 10.

The compound of formula (2B) may be prepared by reacting a compound of formula

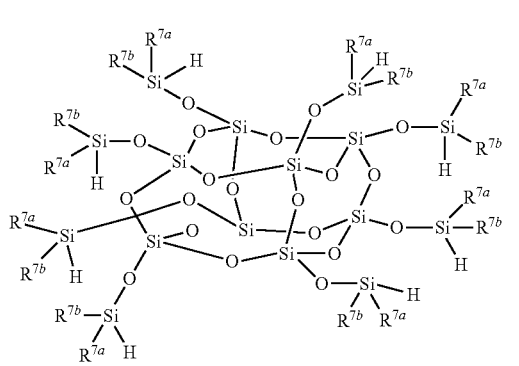

(4B)

wherein
$R^{7a}$ and $R^{7b}$ are independently of each other $C_{1-4}$-alkyl, with a compound of formula

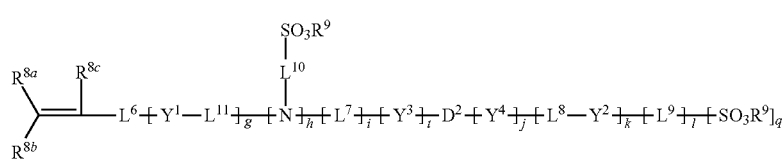

wherein
g is 0 or 1,
h is 0 or 1,
i is 0 or 1,
t is 0 or 1,
j is 0 or 1,
k is 0 or 1,
l is 0 or 1,
q is 0 or 1
with the proviso that at least h or q is 1, and with the proviso that if q is 0, then j, k and l are also 0,
$R^{7a}$ and $R^{7b}$ are independently of each other $C_{1-4}$-alkyl,
$R^{8a}$, $R^{8b}$ and $R^{8c}$ are independently from each other hydrogen or $C_{1-4}$-alkyl,
$L^6$ is $C_{1-20}$-alkylene, $C_{1-20}$-alkylene-phenylene, $C_{1-20}$-alkylene-$C_{5-8}$-cycloalkylene, phenylene or $C_{5-8}$-cycloalkylene, wherein $L^6$ may be substituted with one or more substitutents selected from the group consisting of halogen, $OC_{1-6}$-alkyl, $NO_2$ and OH,
$Y^1$, $Y^2$, $Y^3$ and $Y^4$ are independently of each other $NR^{51}$, O, S, C(O) or C(O)O, wherein $R^{51}$ is $C_{1-20}$-alkyl,
$L^7$, $L^8$, $L^9$, $L^{10}$ and $L^{11}$ are independently of each other $C_{1-20}$-alkylene, $C_{1-20}$-alkylene-phenylene or $C_{1-20}$-alkylene-$C_{5-8}$-cycloalkylene, phenylene or $C_{5-8}$-cycloalkylene, wherein $L^7$, $L^8$, $L^9$, $L^{10}$ and $L^{11}$ may be substituted with one or more substituents selected from the group consisting of halogen, $OC_{1-6}$-alkyl, $NO_2$ and OH, and $R^9$ is $C_{1-10}$-alkyl,
$D^2$ is a chromophoric moiety, which may be substituted with one or more $R^{52}$, wherein $R^{52}$ are independently from each other selected from the group consisting of $C_{1-20}$-alkyl, $C_{6-14}$-aryl, halogen, $OC_{1-6}$-alkyl, OH, $NH_2$ and $NO_2$, The compound of formula (4B) can be reacted with the compound of formula (5B) in the presence of an inert organic solvent. Examples of inert organic solvents are hydrocarbons such as toluene. The compound of formula (4B) can be reacted with the compound of formula (5B) in the presence of a catalyst. Suitable catalysts are for example platinum containing compounds such as hexachloroplatinic acid, also known as Speier's catalyst, or $Pt_2[(CH_2=CH_2Si(Me)_2)_2O]_3$, also known as Karstedt's catalyst, or various other catalysts described by N. Sabourault at al. in Org. Lett. 2002, 4(3), 2117. The compound of formula (4B) is usually reacted with the compound of formula (5B) at a temperature in the range of 20 to 200° C., preferably at a temperature in the range of 40 to 120° C., more preferably in the range of 60 to 100° C.

The compound of formula (4B), wherein $R^{7a}$ and $R^{7b}$ are methyl, may be prepared according to D. Höbbel et al., Z. Chem. 1989, 29(7), 260-261 or according to reference example C) of WO 2007/147742. Alternatively, compound (4B) can directly be bought from Sigma-Aldrich ("Aldrich"), St. Louis, Mo., USA.

The compound of formula (5B) can be prepared by methods known in the art.

The compound of formula (3B) may be a compound of formula

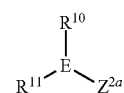

(3BX)

wherein
$R^{10}$ and $R^{11}$ are independently from each other $C_{1-20}$-alkyl, which may be substituted with one or more substituents selected from the group consisting of $C_{6-14}$-aryl, $OC_{1-6}$-alkyl, and $NO_2$,
E is N or P,
$Z^{2a}$ is

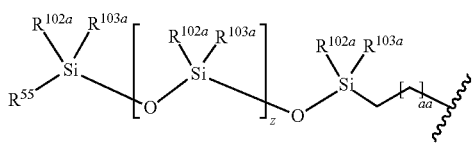

wherein
$R^{55}$ is $C_{1-10}$-alkyl,
$R^{102a}$ and $R^{103a}$ are independently from each other $C_{1-6}$-alkyl, aa is an integer from 1 to 12,
z is an integer from 2 to 25,
or
a compound of formula

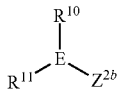 (3BY)

wherein
$R^{10}$ and $R^{11}$ are independently from each other $C_{1\text{-}20}$-alkyl, which may be substituted with one or more substituents selected from the group consisting of $C_{6\text{-}14}$-aryl, $OC_{1\text{-}6}$-alkyl, and $NO_2$,
E is N or P,
$Z^{2b}$ is

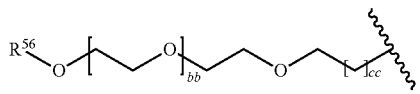

wherein
$R^{56}$ is $C_{1\text{-}10}$-alkyl,
bb is preferably an integer from 5 to 25,
cc is an integer from 1 to 5.

The compound of formula (3BX) may be prepared by reacting a compound of formula

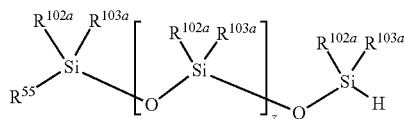 (6B)

wherein
$R^{55}$ is $C_{1\text{-}10}$-alkyl,
$R^{102a}$ and $R^{103a}$ are independently from each other $C_{1\text{-}6}$-alkyl,
z is an integer from 2 to 25,
with a compound of formula

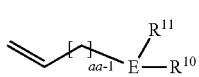 (7B)

wherein
aa is an integer from 1 to 12,
$R^{10}$ and $R^{11}$ are independently from each other $C_{1\text{-}20}$-alkyl, which may be substituted with one or more substituents selected from the group consisting of $C_{6\text{-}14}$-aryl, $OC_{1\text{-}6}$-alkyl, and $NO_2$,
E is N or P.

The compound of formula (6B) can be reacted with the compound of formula (7B) in the presence of an inert organic solvent. Examples of inert organic solvents are hydrocarbons such as toluene. The compound of formula (6B) can be reacted with the compound of formula (7B) in the presence of a catalyst. Suitable catalysts are for example platinum containing compounds such as hexachloroplatinic acid. The compound of formula (6B) is usually reacted with the compound of formula (7B) at a temperature in the range of 0 to 160° C., preferably at a temperature in the range of 10 to 100° C., more preferably at a temperature in the range of 15 to 40° C.

The compound of formula

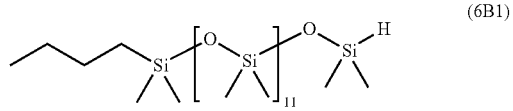 (6B1)

is commercially available (Supplier ABCR).
The compound of formula (7B) can be prepared by methods known in the art.
The compounds of formula (3BY) can be prepared by reacting a compound of formula (12)

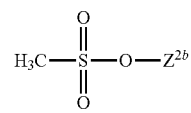 (12)

wherein
$Z^{2b}$ is

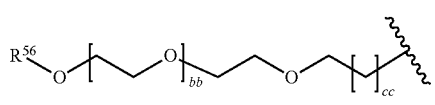

wherein
$R^{56}$ is $C_{1\text{-}10}$-alkyl,
bb is preferably an integer from 5 to 25,
cc is an integer from 1 to 5.
with

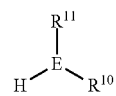

wherein
$R^{10}$ and $R^{11}$ are independently from each other $C_{1\text{-}20}$-alkyl, which may be substituted with one or more substituents selected from the group consisting of $C_{6\text{-}14}$-aryl, $OC_{1\text{-}6}$-alkyl, and $NO_2$,
E is N or P.

The compounds of formula (12) is usually reacted with

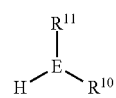

in the presence of a suitable solvent such as dioxane. The reaction is usually performed at a temperature in the range of 5 to 50° C., preferably 10 to 30° C.

The compounds of formulae (1A) and (1B) usually have an average particle size of 0.5 to 1.5 nm, preferably from 0.8 to 1.2 nm.

The compounds of formulae (1A) and (1B) are coloured. The colour of the compounds of formulae (1A) and (1B) depends on the chromophoric moiety $D^1$ and $D^2$.

For example, if the chromophoric moiety D1 is of formula

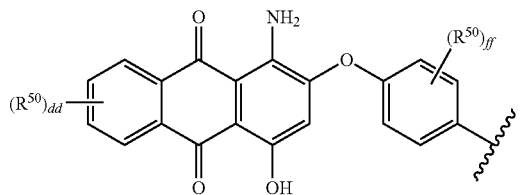

wherein
dd is an integer from 0 to 3,
ff is an integer from 0 to 1, and
$R^{50}$ are independently from each other selected from the group consisting of $C_{1-20}$-alkyl, $C_{6-14}$-aryl, halogen, $OC_{1-6}$-alkyl, OH, $NH_2$ and $NO_2$,
the compound of formula (1A) is magenta.

For example, if the chromophoric moiety $D^1$ is of formulae

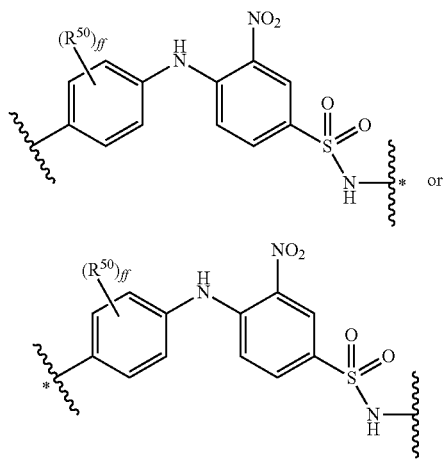

wherein
the bond marked with * is linked to

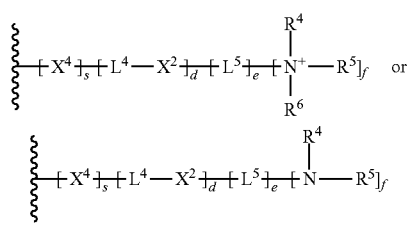

ff is an integer from 0 to 1, and
$R^{50}$ are independently from each other selected from the group consisting of $C_{1-20}$-alkyl, $C_{6-14}$-aryl, halogen, $OC_{1-6}$-alkyl, OH, $NH_2$ and $NO_2$,
the compound of formula (1A) is yellow.

For example, if the chromophoric moiety $D^1$ is of formula

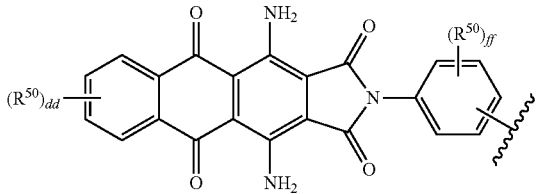

wherein
dd is an integer from 0 to 3,
ff is an integer from 0 to 1, and
$R^{50}$ are independently from each other selected from the group consisting of $C_{1-20}$-alkyl, $C_{6-14}$-aryl, halogen, $OC_{1-6}$-alkyl, OH, $NH_2$ and $NO_2$;
the compound of formula (1A) is cyan.

For example, if the chromophoric moiety $D^2$ is of formula

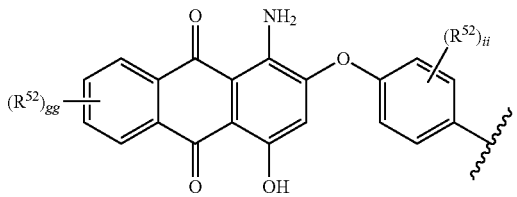

wherein
gg is an integer from 0 to 3,
hh is an integer from 0 to 2,
ii is an integer from 0 to 1, and
$R^{52}$ are independently from each other selected from the group consisting of $C_{1-20}$-alkyl, $C_{6-14}$-aryl, halogen, $OC_{1-6}$-alkyl, OH, $NH_2$ and $NO_2$,
the compound of formula (1B) is magenta.

For example, if the chromophoric moiety $D^2$ is of formula

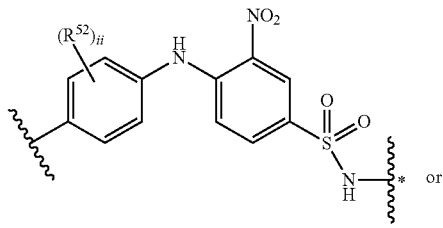

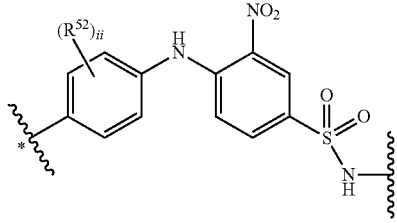

wherein
the bond marked with * is linked to

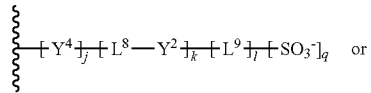

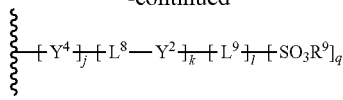

ii is an integer from 0 to 1, and
$R^{52}$ are independently from each other selected from the group consisting of $C_{1-20}$-alkyl, $C_{6-14}$-aryl, halogen, $OC_{1-6}$-alkyl, OH, $NH_2$ and $NO_2$,
the compound of formula (1B) is yellow.

For example, if the chromophoric moiety $D^2$ is of formula

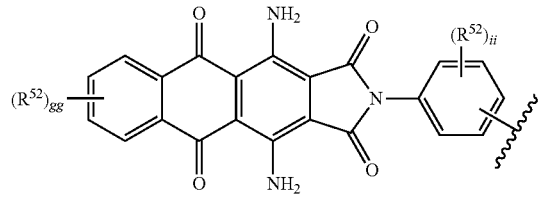

wherein
gg is an integer from 0 to 3,
ii is an integer from 0 to 1, and
$R^{52}$ are independently from each other selected from the group consisting of $C_{1-20}$-alkyl, $C_{6-14}$-aryl, halogen, $OC_{1-6}$-alkyl, OH, $NH_2$ and $NO_2$,
the compound of formula (1B) is cyan.

The compounds of formulae (1A) or (1B) can be used in electronic displays, paints, lacquers, electrostatic toners, inks, additives to plastic and polymers, sealants, color filters, in printing systems, LED coatings, packaging, tagging and labeling applications.

Also part of the present invention is the use of the compounds of formulae (1A) or (1B) as charged coloured particles in electrophoretic devices, preferably in electrophoretic displays, more preferably in electronic paper.

Also part of the present invention is an electrophoretic device comprising compounds of formula (1A) or compounds of formula (1B). Preferably, the electrophoretic device is an electrophoretic display, more preferably electronic paper. The electronic device can be flexible.

The electrophoretic device comprising compounds of formula (1A) or compounds of formula (1B) can be prepared by a process comprising the steps of (i) forming a dispersion of the compounds of formula (1A) or (1B) in a dielectric fluid, and (ii) placing the dispersion obtained in step (i) between a pair of electrodes.

The dielectric fluid is preferably dodecane or a silicon oil having a viscosity which suits this application. The dispersion obtained in step (i) can contain further additives known to a person skilled in the art. The dispersion obtained in step (i) can be encapsulated in microcapsules or incorporated in foils containing microcavities by methods known to a person skilled in the art before being placed between the pair of electrodes in step (ii).

The compounds of formulae (1A) and (1B) are charged coloured particles suitable for use in full-colour electronic paper.

The charged coloured particles of the present invention have an average particle size of 0.5 to 1.5 nm, preferably 0.8 to 0.2 nm, and show a narrow size distribution. Thus, the charged coloured particles of the present invention are suitable for use in video applications based on CMY technology. The charged coloured particles of the present invention form homogeneous dispersions in dielectric fluids such as dodecane. The Zeta potential of the charged coloured partricles of the present invention in dodecane is above −30 mV and below +30 mV. The dispersion in dodecane has a viscosity (at 25° C.) of below 5 mNs/m². The dispersion in dodecane has a resistivity of about $10^{10}$ Ωcm. The relative permittivity of the dispersion in dodecane is about 2. In additon, the charged coloured particles show a high colour strength.

The process for the preparation of the charged coloured particles of the present invention is advantageous, as the process allows a convenient purification, respectively, isolation of the charged coloured particles. In particular, the process does not produce the charged coloured particles along with considerable high amounts of unwanted by-products such as water or sodium iodide, which are tedious to remove. In addition, the process allows the targeted preparation of the charged coloured particles, consisting of defined supra-molecular structures of the present invention, in particular with regard to the number of charges.

EXAMPLES

Parts or percentages are by weight.

Example 1

Preparation of Compound 3AX1

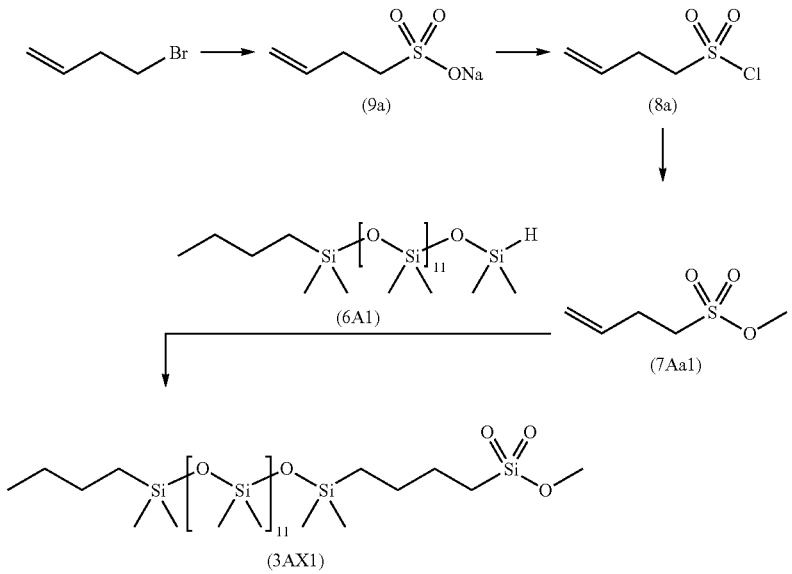

Preparation of Compound 9a

A mixture of 50.0 g 3-butenyl-bromide (Aldrich) and 54.2 g disodium sulfite are refluxed in 300 ml water until all bromide is consumed (TLC). The mixture is cooled and extracted with diethylether, the aqueous phase is evaporated to dryness and the resulting solid is dried in vacuum at 130° C. 56 g of compound 9a are obtained sufficiently pure for further elaboration.

Preparation of Compound 8a

A mixture of 50.5 g of crude compound 9a and 48 ml of phosphoryl chloride are refluxed for four hours. Excess phosphoryl chloride is then distilled off in vacuum (100 mbar) and the resulting residue is taken up in dichloromethane and poured on ice-water. The organic phase is washed with water, dried over sodium sulfate and evaporated giving a liquid which is distilled (65° C., 0.35 mbar) resulting in 14.6 g of compound 8a as a colorless liquid. $^1$H-NMR (CDCl$_3$, 300 MHz): δ 2.79 (dt, 2H); 3.74 (t, 2H); 5.20 (ddt, 2H); 5.84 (m, 1H). $^{13}$C-NMR (CDCl$_3$, 75 MHz): δ 28.38; 64.40; 118.79; 131.90.

Preparation of Compound 7Aa1

A solution of 5.3 g of compound 8a in 15 ml of dry methanol is treated with one equivalent of sodium methanolate at 0° C. until compound 8a is consumed. The mixture is filtered and the methanol solution diluted with diethyl ether and filtered again to remove sodium chloride. Evaporation of the solvent leaves 4.7 g of compound 7Aa1. $^1$H-NMR (CDCl$_3$, 300 MHz): δ 2.60 (dt, 2H); 3.19 (t, 2H); 3.90 (s, 3H); 5.17 (ddt, 2H); 5.84 (m, 1H). $^{13}$C-NMR (CDCl$_3$, 75 MHz): δ 27.58; 48.89; 55.35; 117.46; 133.58.

Preparation of Compound 3AX1

A mixture of 29.5 g commercial polydimethylsiloxane (6A1) (supplier ABCR) and 4.0 g of compound 7Aa1 is dissolved in 75 ml of toluene in an argon atmosphere and treated with 0.9 ml of a solution of hexachloro platinic acid in iso-propanol (10% (w/v)) until compound 6A1 is consumed. The mixture is subsequently evaporated and filtered over a small pad of silica (eluent: hexane-ethyl acetate (20-1)) to remove the catalyst. Evaporation leaves 19.3 g of compound 3AX1 as colorless oil. $^1$H-NMR (CDCl$_3$, 400 MHz): δ 0.08 (Si(CH$_3$) ca. 72H); 0.59 (dt, 4H); 0.89 (t, 3H); 1.26 (m, 4H); 1.51 (quint. 2H); 1.91 (quint. 2H); 3.12 (t, 2H); 3.91 (s, 3H). $^{13}$C-NMR (CDCl$_3$, 100 MHz): δ 0.09; 1.03; 13.78; 17.69; 17.94; 22.12; 25.43; 26.34; 26.80; 54.88.

Example 2

Preparation of Compound 3AX2

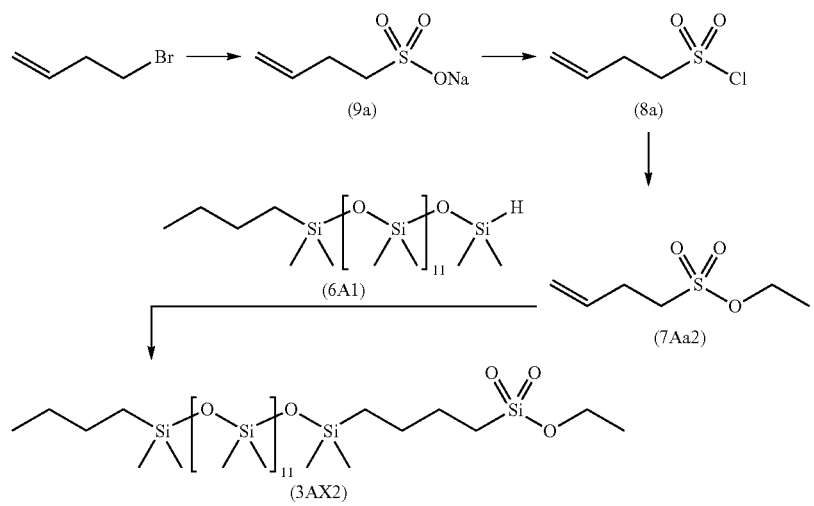

Preparation of Compound 9a and 8a

Compounds 9a and 8a are prepared as described in example 1.

Preparation of Compound 7Aa2

Compound 7Aa2 is prepared as described for compound 7Aa1 in example 1, but methanol and methanolate are replaced by ethanol and ethanolate. 2.0 g of compound 7Aa2 are obtained from 2.0 g of compound 8a. $^1$H-NMR (CDCl$_3$, 300 MHz): δ 1.42 (t, 3H); 2.60 (dt, 2H); 3.18 (t, 2H); 4.30 (q, 2H); 5.14 (ddt, 2H); 5.82 (m, 1H). $^{13}$C-NMR (CDCl$_3$, 75 MHz): δ 15.12; 27.65; 49.66; 66.13; 117.37; 133.69.

Preparation of Compound 3AX2

Compound 3AX2 is prepared in analogy to compound 3AX1 in example 1. 2.7 g of compound 3AX2 are obtained from 0.7 g of the compound 7Aa2 and 3.0 g of the compound 6A1. $^1$H-NMR (CDCl$_3$, 300 MHz): δ 0.08 (Si(CH$_3$) ca. 72H); 0.55 (dt, 4H); 0.82 (t, 6H); 1.33 (m, 6H); 1.51 (quint. 2H); 1.79 (quint. 2H); 3.00 (t, 2H); 4.22 (quart. 2H). $^{13}$C-NMR (CDCl$_3$, 75 MHz): δ 0.07; 0.14; 1.01; 13.76; 15.12; 17.70; 17.93; 22.12; 25.42; 26.33; 26.85; 50.24; 65.64.

Example 3

Preparation of Compound 3AX3

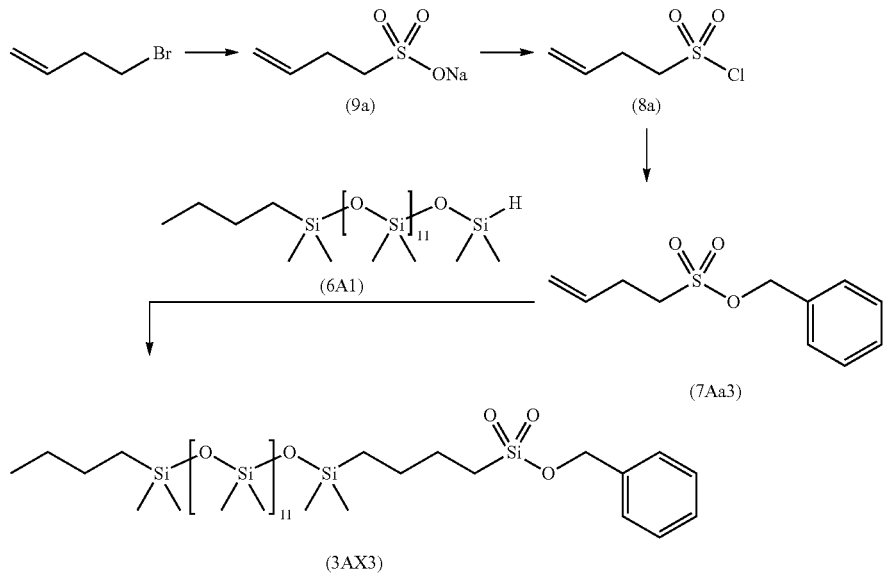

Preparation of compounds 9a and 8a

Compounds 9a and 8a are prepared as described in example 1.

Preparation of Compound 7Aa3

Compound 7Aa3 is prepared as described for compound 7Aa1 in example 1, but methanol and methanolate are replaced by benzylalcohol and benzylate. 6.0 g of compound 7Aa3 are obtained from 6.0 g of compound 8a. $^1$H-NMR (CDCl$_3$, 300 MHz): δ 2.57 (m, 2H); 3.10 (t, 2H); 5.10 (d, 2H); 5.26 (s, 2H); 5.76 (ddt, 1H); 7.43 (s, 5H). $^{13}$C-NMR (CDCl$_3$, 75 MHz): δ 27.60; 50.43; 71.31; 117.41; 128.89; 129.38; 133.57.

Preparation of Compound 3AX3

Compound 3AX3 is prepared in analogy to compound 3AX1 in example 1. 2.5 g of compound 3AX3 are obtained from 0.6 g of the compound 7Aa3 and 3.0 g of the compound 6A1. $^1$H-NMR (CDCl$_3$, 300 MHz): δ 0.02 (s, ca. 84H); 0.44 (dt, 4H); 0.80 (t, 3H); 1.27 (m, 6H); 1.75 (quint. 2H); 2.92 (t, 2H); 5.18 (s, 2H); 7.31 (s, 5H). $^{13}$C-NMR (CDCl$_3$, 75 MHz): δ 0.07; 0.16; 1.04; 13.79; 17.65; 17.95; 22.05; 25.44; 26.35; 26.79; 50.97; 70.96; 128.84; 129.28; 133.72.

Example 3a

Preparation of Compound 8b

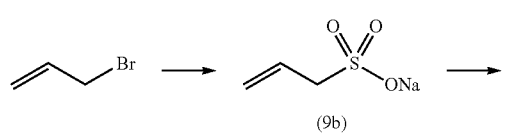

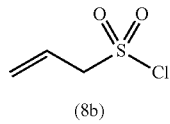

Preparation of compound 9b

Compound 9b is prepared in analogy to compound 9a in example 1. 31.2 g of compound 9b are obtained from 20 ml allylbromide and 34.9 g of sodium sulfite in 150 ml water.

Preparation of Compound 8b

Compound 8b is prepared in analogy to compound 8a in example 1. 20.6 g of compound 8b are obtained from 55.0 g of crude compound 9b and 56 ml of phosphoryl chloride. $^1$H-NMR (CDCl$_3$, 400 MHz): δ 4.39 (d, 2H); 5.67 (dt, 2H); 6.00 (ddt, 1H). $^{13}$C-NMR (CDCl$_3$, 100 MHz): δ 68.8; 123.1; 127.8.

Example 3b

Preparation of Compound 8c

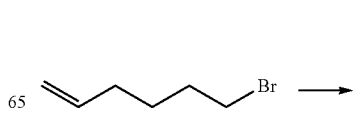

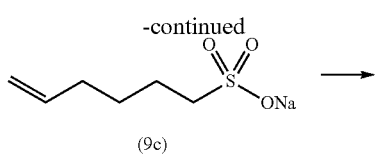

(9c)

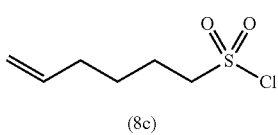

(8c)

Preparation of Compound 9c

Compound 9c is prepared in analogy to compound 9a in example 1. 4.1 g of compound 9c are obtained from 3.0 ml 5-hexenylbromide and 3.4 g of sodium sulfite in 15 ml water.

Preparation of Compound 8c

Compound 8c is prepared in analogy to compound 8a in example 1. 20.6 g of compound 8c are obtained from 55.0 g of crude compound 9c and 56 ml of phosphoryl chloride. $^1$H-NMR (CDCl$_3$, 400 MHz): δ 1.58 (quint. 2H); 1.86 (quint. 2H); 2.14 (quart. 2H); 3.16 (t 2H); 5.05 (m, 2H); 5.78 (ddt 1H). $^{13}$C-NMR (CDCl$_3$, 100 MHz): δ 23.3; 27.4; 33.1; 55.1; 115.4; 137.7.

Example 4

Preparation of Compound 3AY1

Preparation of Compound 12a

A solution of 20.0 g of commercial polyethyleneglycol-ethyl ether (Fluka) in 3.1 ml of pyridine and 100 ml of dichloromethane is treated with 2.9 ml methane sulfonylchloride at 0° C. for 24 h. The mixture is subsequently diluted with 50 ml dichloromethane and extracted successively with 1N hydrochloric acid, satured sodium hydrogen carbonate solution and brine. Evaporation of the organic phase leaves 20.6 g of colorless compound 12a. $^1$H-NMR (CDCl$_3$, 300 MHz): δ 3.08 (s, 3H); 3.38 (s, 3H); 3.69 (m, ca. 45H); 4.38 (t, 2H). $^{13}$C-NMR (CDCl$_3$, 75 MHz): δ 37.72; 59.01; 69.01; 69.30; 70.56; 71.92.

Preparation of Compound 11a

A mixture of 10.0 g of compound 12a and 2.4 g sodium sulfite in 30 ml of water is refluxed for 24 h, cooled to room tempaerature and extracted with diethyl ether. The aqueous phase is subsequently evaporated to dryness and stored at 110° C. and 100 mbar to give 4.0 g of a sticky compound 11a, which is used without further purifications.

Preparation of Compound 10a

Compound 10a is prepared as described for compound 8a in example 1. 4.1 g of compound 10a are obtained from 4.0 g of crude compound 11a and 10 ml of phosphoryl chloride. $^1$H-NMR (CDCl$_3$, 300 MHz): δ 3.65 (m). $^{13}$C-NMR (CDCl$_3$, 75 MHz): δ 42.72; 52.58; 53.51; 62.79; 68.80; 70.57; 70.82; 71.29; 71.35.

Preparation of Compound 3AY1

Compound 3AY1 is prepared in analogy to compound 7Aa1 in example 1. 3.9 g of compound 3YA1 are obtained from 4.1 g of crude compound 10a in 13 ml of methanol and 1.1 equivalent sodium methoxide. $^1$H-NMR (CDCl$_3$, 300 MHz): δ 3.49 (m, 5H); 3.71 (m, ca. 46H); 3.92 (s, 3H).

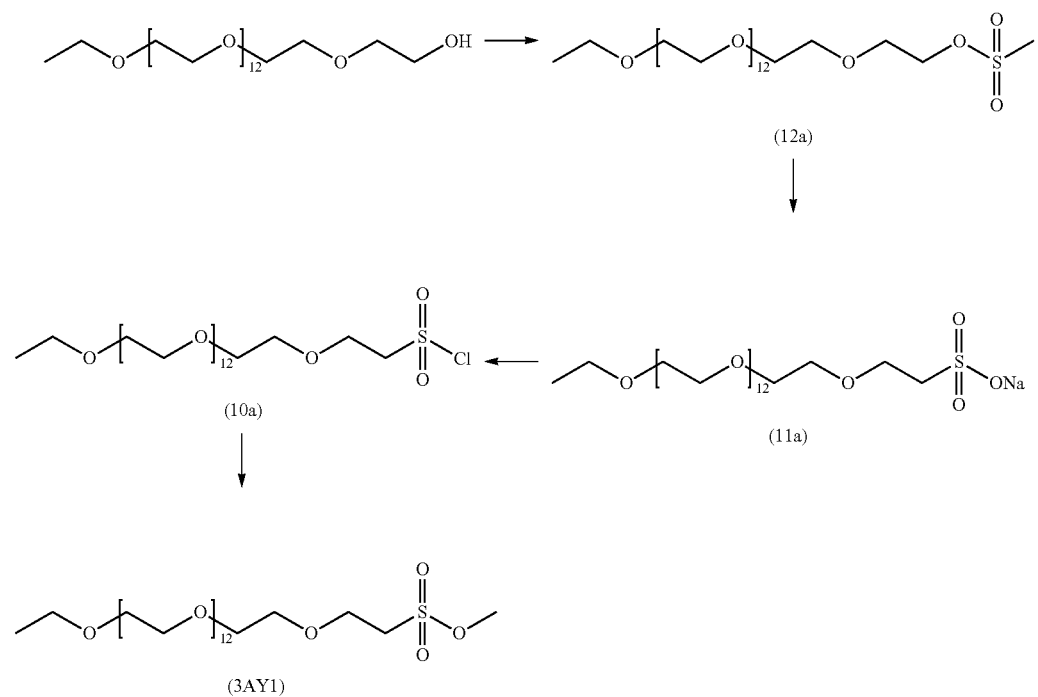

Example 5

Preparation of Yellow Compound 5A1

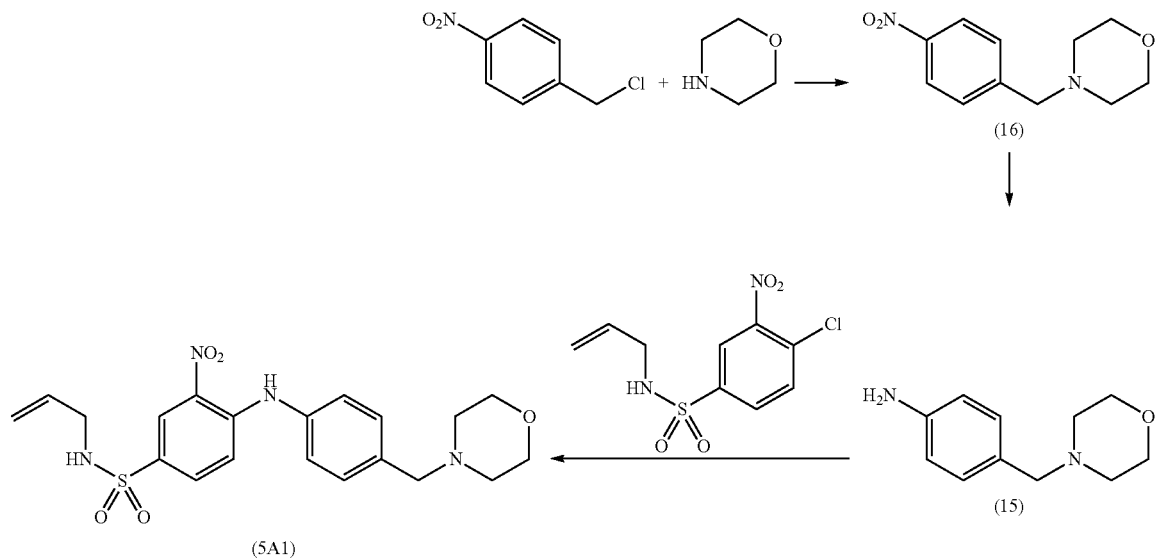

Preparation of Compound 16

A solution of 20.0 g of morpholine in 600 ml chloroform is successively treated with 40.0 g of p-nitrobenzylchloride and 24.0 g of sodium carbonate at 65° C. for 18 h. Usual work-up and purification by column chromatography (eluent: hexane-ethyl acetate (8-10)) gives 40.4 g of compound 16. $^1$H-NMR (CDCl$_3$, 300 MHz): δ 2.43 (m, 4H); 3.56 (s, 2H); 3.68 (m, 4H); 7.49 (d, 2H); 8.12 (d, 2H). $^{13}$C-NMR (CDCl$_3$, 75 MHz): δ 53.59; 62.40; 66.65; 123.45; 129.50; 145.94; 147.15.

Preparation of Compound 15

A mixture of 250 ml of dioxane and 80 ml of concentrated hydrochloric acid is charged under vigourous stirring with 30.0 g tin granules and 34.8 g of compound 16. The mixture is stirred at 35° C. until compound 16 is consumed, filtered and diluted with ethyl acetate. Usual extraction procedures leave 23.4 g of compound 15. $^1$H-NMR (CDCl$_3$, 300 MHz): δ 2.43 (t, 4H); 3.40 (s, 2H); 3.67 (broad, NH$_2$); 3.69 (t, 4H); 6.64 (d, 2H); 7.13 (d, 2H). $^{13}$C-NMR (CDCl$_3$, 75 MHz): δ 53.50; 63.04; 67.02; 114.87; 127.39; 130.40; 145.58.

Preparation of yellow compound 5A1

A solution of 10 ml satured sodium carbonate is charged with 1.0 g 4-chloro-3-nitro-benzeneallylsulfonamide and 0.6 g of compound 15 and stirred at 100° C. for 8 h until compound 15 is consumed. After cooling down the mixture is diluted with dichloromethane and worked-up in the usual extractive manner to give 1.0 g of yellow compound 5A1 after purification by column chromatography (eluent: hexane-ethyl acetate (4-6)). $^1$H-NMR (CDCl$_3$, 300 MHz): δ 2.43 (t, 4H); 3.49 (s, 2H); 3.57 (NH); 3.67 (t, 4H); 5.08 (ddd, 2H); 5.69 (ddt, 1H); 7.17 (d, 1H); 7.21 (d, 2H); 7.39 (d, 2H); 7.71 (dd 1H); 8.65 (dd, 1H); 9.74 (NH). $^{13}$C-NMR (CDCl$_3$, 75 MHz): δ 45.66; 53.53; 62.66; 66.90; 116.59; 117.60; 125.07; 126.93; 128.43; 130.65; 131.47; 133.04; 133.26; 134.13; 136.99; 145.73.

Example 6

Preparation of Magenta Compound 5A2

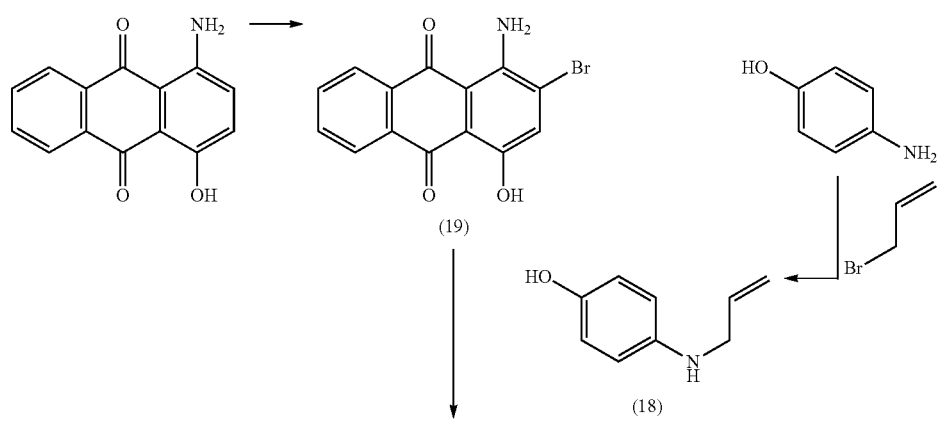

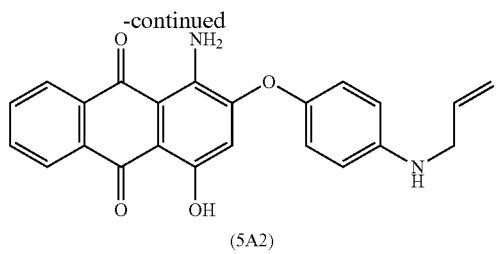

(5A2)

Preparation of Compound 19

31.0 g of 1-amino-4-hydroxyanthrachinone are dissolved in 300 ml of nitrobenzene and heated to 100° C. in an argon atmosphere. During one hour 23.0 g of bromine are dropped into that mixture which is subsequently heated to 130° C. for additional three hours. After cooling down to room temperature the mixture is poured into 100 ml methanol and filtered. The residue is thouroughly washed with methanol and hexane and finally dried at 100° C. in vacuum. By concentrating the mother liquors an additional crop of compound 19 is obtained resulting in an overall yield of 33.9 g. $^1$H-NMR (CDCl$_3$, 300 MHz): δ 7.03 (s, 1H); 7.55 (m, 2H); 8.03 (m, 2H).

Preparation of Compound 18

55.0 g para-aminophenol and 60.0 g of allylbromide are dissolved in 300 ml ethanol and treated at reflux with 35.0 g potassium carbonate until para-aminophenol is consumed. The mixture is filtered while hot and the organic phase is evaporated. The resulting residue is chromatographed on silica gel (eluent: hexane-ethyl acetate (10-1)) to give 10.1 g of compound 18. $^1$H-NMR (CD$_3$OD, 300 MHz): δ 3.66 (d, 2H); 3.88 (OH, NH); 5.11 (d, 1H); 5.24 (d, 1H); 5.94 (ddt, 1H); 6.65 (m, 4H). $^{13}$C-NMR (CD$_3$OD, 100 MHz): δ 115.09; 115.43; 115.53; 135.92; 141.42; 149.32.

Preparation of Magenta Compound 5A2

A suspension of 1.0 g cesium carbonate in 2 ml dimethylformamide is charged with 1.0 g of compound 19 and 0.5 g compound 18 and heated to 80° C. until compound 19 is consumed. The mixture is subsequently dropped into water and the precipitate filtered off, dissolved in ethyl acetate, dried over sodium sulfate yielding 1.0 g of magenta compound 5A2 after removal of solvent. $^1$H-NMR (CDCl$_3$, 300 MHz): δ 3.80 (d, 2H); 5.27 (dd, 2H); 5.93 (ddt, 1H); 6.39 (s, 1H); 6.68 (m, 2H); 6.97 (m, 2H); 7.75 (m, 2H); 8.33 (M, 2H). $^{13}$C-NMR (CDCl$_3$, 75 MHz): δ 46.75; 107.86; 108.21; 109.08; 113.96; 114.49; 116.14; 116.56; 121.99; 126.28; 126.77; 132.80; 133.44; 133.52; 135.00; 139.17; 144.27; 146.37; 156.52; 159.91; 183.16; 185.18.

Example 7

Preparation of Magenta Compound 5A3

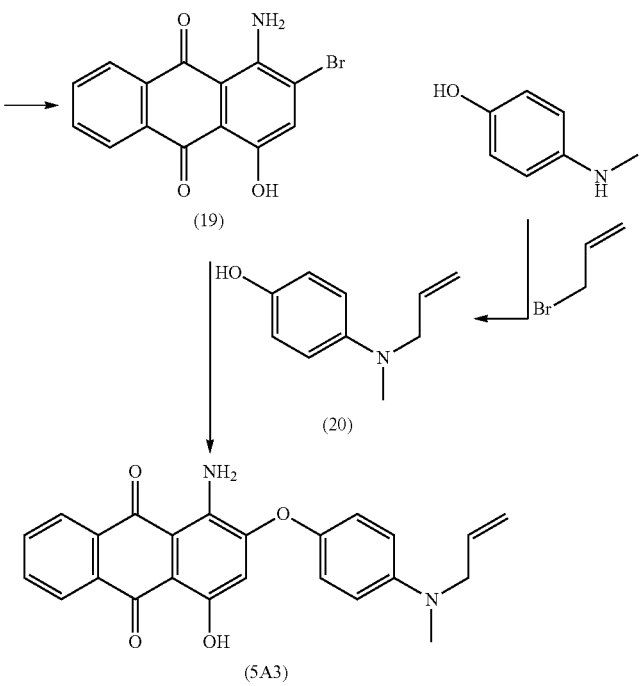

Preparation of Compound 19

Compound 19 is prepared as described in example 6.

Preparation of Compound 20

10.0 g of para-N-methylaminophenol and 7.5 ml of allylbromide are heated to 40° C. in 60 ml water containing 12.2 g sodium hydrogencarbonate for four hours. The mixture is then extracted with ethyl acetate. Usual work-up and column chromatograpgy over silica gel (eluent: ethyl acetate) gives 4.6 g of compound 20. $^1$H-NMR (CD$_3$OD, 300 MHz): δ 2.75 (s, 3H); 3.33 (d, 2H); 5.16 (dd, 2H); 5.84 (ddt, 1H); 6.71 (dd, 4H). $^{13}$C-NMR (CD$_3$OD, 100 MHz): δ 38.45; 57.39; 115.62; 116.24; 116.76; 134.46; 143.76; 149.68.

Preparation of Magenta Compound 5A3

Compound 5A3 is prepared in analogy to compound 5A2 in example 6. 4.7 g of magenta compound 5A3 are obtained from 3.5 g of compound 20 and 6.2 compound 19. $^1$H-NMR (CDCl$_3$, 300 MHz): δ 3.00 (s, 3H); 3.96 (d, 2H); 5.21 (dd, 2H); 5.89 (ddt, 1H); 6.40 (s, 1H); 6.77 (d, 2H); 7.01 (d 2H); 7.77 (m, 2H); 8.35 (dd, 2H). $^{13}$C-NMR (CDCl$_3$, 75 MHz): δ 38.40; 55.56; 107.86; 108.21; 109.08; 113.46; 116.46; 120.73; 126.26; 126.77; 132.75; 133.33; 133.41; 133.49; 135.00; 139.19; 143.54; 147.83; 156.61; 159.95; 183.14; 185.15.

Example 8

Preparation of Magenta Compound 5A4

Preparation of Compound 22

12.0 g of tyramine and 9.3 g of benzaldehyde are stirrred in 250 ml of methanol containing 100 g of activated molecular sieves (4A) for 24 h. The mixture is then filtered, cooled to 0° C. and treated with excess solid sodium boronate for 3 h. The solvent is then evaporated and the residue taken up in a small volume of brine and extracted with diethyl ether, yielding after usual work-up 13.7 g of compound 22. $^1$H-NMR (CD$_3$OD, 300 MHz): δ 2.76 (m, 2H); 2.85 (m, 2H); 3.81 (s, 2H); 6.73 (d, 2H); 7.01 (d, 2H); 7.30 (m, 5H). $^{13}$C-NMR (CD$_3$OD, 100 MHz): δ 33.64; 49.59; 52.63; 114.98; 127.17; 128.26; 128.35; 129.20; 138.01; 155.85.

Preparation of Compound 21

9.0 g of compound 22 and 2.8 ml allylbromide are refluxed in 25 ml of acetonitrile containg 6.8 g of potassium carbonate and 0.1 g sodium iodide for 24 h. Filtration and evaporation of solvent gives a residue which is taken up in ethyl acetate and acidified with 1N hydrochloric acid to pH=3. The aqueous phase is separated and repeatedly extracted with ethyl acetate to give after removal of solvent 7.0 g of compound 21 as a white solid. $^1$H-NMR (CD$_3$OD, 300 MHz): δ 2.80 (m, 4H); 3.28 (d, 2H); 3.78 (s, 2H); 5.28 (dd, 2H); 6.00 (dddt, 1H); 6.76 (d, 2H); 7.02 (d, 2H); 7.40 (m, 5H). $^{13}$C-NMR (CDCl$_3$, 75 MHz): δ 31.85; 55.19; 56.51; 57.98; 115.65; 118.33; 127.24; 128.38; 129.44; 129.82; 131.80; 134.92; 138.15; 154.39.

Preparation of Compound 19

Compound 19 is prepared as described in example 6.

Preparation of Magenta Compound 5A4

Compound 5A4 is prepared in analogy to compound 5A2 in example 6. 7.2 g of magenta compound 5A4 are obtained from 5.9 g of compound 21 and 6.5 g of compound 19.

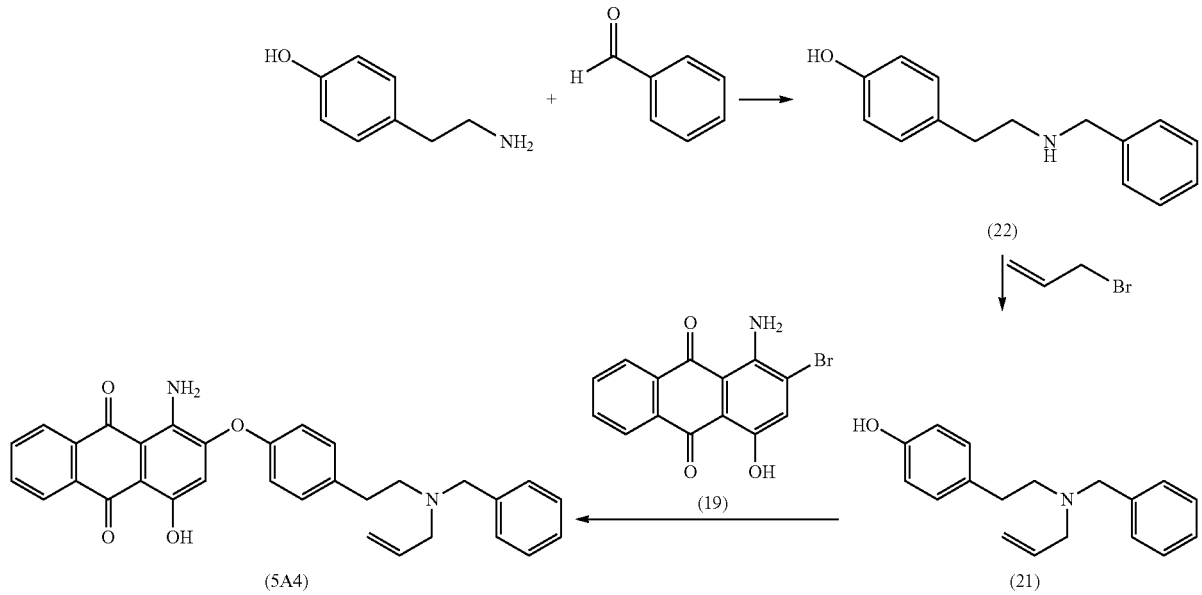

$^1$H-NMR (CDCl$_3$, 300 MHz): δ 2.78 (m, 4H); 3.18 (d, 2H); 5.17 (d, 1H); 5.27 (d, 1H); 5.91 (ddt, 1H); 6.35 (s, 1H); 7.03 (d, 2H); 7.20 (d, 2H); 7.30 (m, 5H); 7.73 (m, 2H); 8.30 (m, 2H). $^{13}$C-NMR (CDCl$_3$, 75 MHz): δ 32.97; 55.02; 56.85; 58.20; 108.52; 117.41; 120.82; 126.31; 126.93; 128.24; 128.81; 130.70; 132.85; 133.37; 133.61; 134.95; 135.82; 138.71; 139.45; 151.53; 155.51; 159.69; 169.20; 183.16; 185.38.

Example 9

Preparation of Magenta Compound 5A5

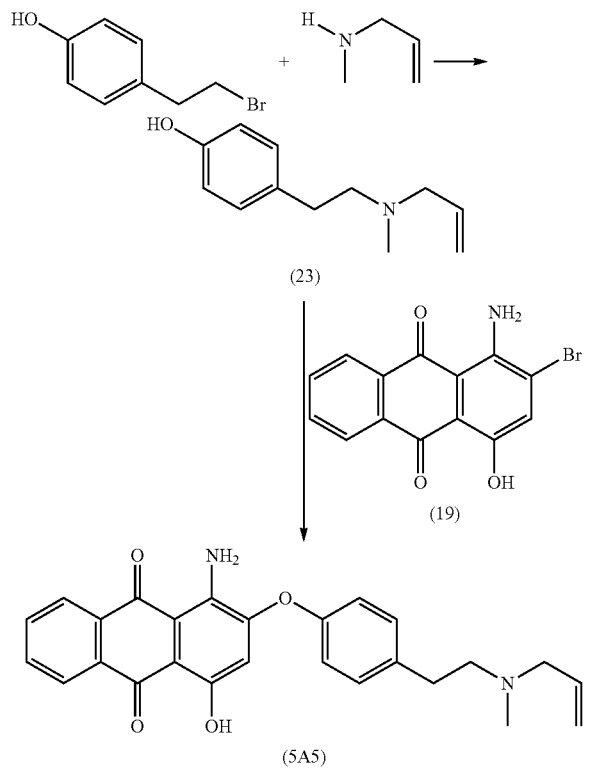

Preparation of Compound 23

10.6 g of 4-hydroxyphenethylbromide and 3.9 g of N-methylallylamine are dissolved in 100 ml of chloroform containing 5.6 g of potassium carbonate and heated to reflux for 3 d. The mixture is then filtered and evaporated. The residue is chromatographed on silica gel (eluent: dichloromethane-methanol (10-1.5)) to give 5.8 g of compound 23. $^1$H-NMR (CDCl$_3$, 300 MHz): δ 2.36 (s, 3H); 2.74 (m, 4H); 3.16 (d, 2H); 5.23 (dd, 2H); 5.91 (ddt, 1H); 6.74 (d, 2H); 7.01 (d, 2H). $^{13}$C-NMR (CDCl$_3$, 75 MHz): δ 32.03; 41.46; 54.94; 60.65; 115.78; 119.23; 129.66; 130.52; 133.70; 155.26.

Preparation of Compound 19

Compound 19 is prepared as described in example 6.

Preparation of Magenta Compound 5A5

Compound 5A5 is prepared in analogy to compound 5A2 in example 6. 11.8 g of magenta compound 5A5 are obtained from 7.6 g of compound 23 and 14.0 g of compound 19. $^1$H-NMR (CDCl$_3$, 300 MHz): δ 2.35 (s, 3H); 2.67 (m, 2H); 2.85 (m, 2H); 3.11 (d, 2H); 5.19 (d, 1H); 5.25 (d, 1H); 5.90 (ddt, 1H); 6.37 (s, 1H); 7.08 (d, 2H); 7.30 d, 2H); 7.75 (m, 2H); 8.31 (dd, 2H). $^{13}$C-NMR (CDCl$_3$, 75 MHz): δ 33.25; 42.03; 58.81; 60.84; 108.55; 109.32; 117.85; 120.96; 126.28; 126.77; 130.60; 132.82; 133.32; 133.53; 134.91; 135.34; 138.56; 139.07; 151.65; 155.42; 159.41; 183.11; 185.36.

Example 9a

Preparation of Cyan Compound 5A6

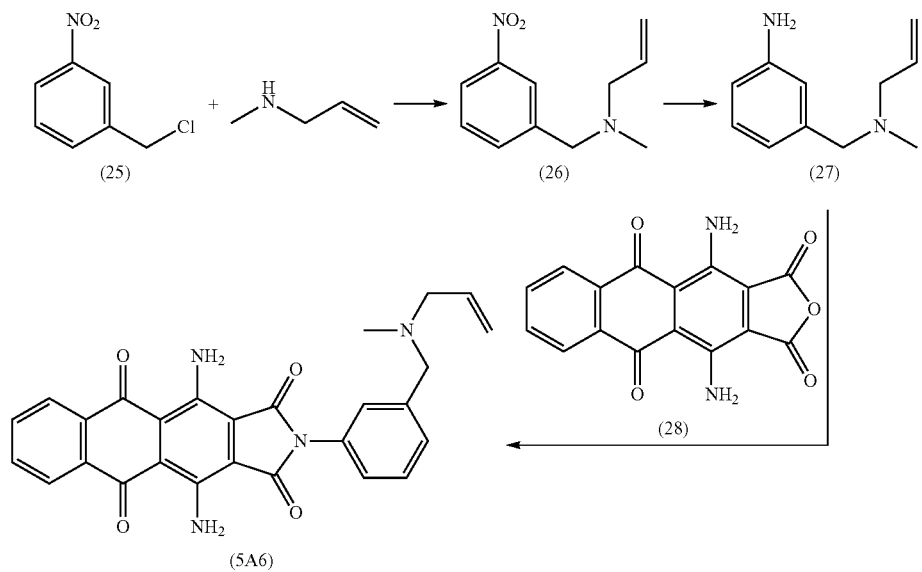

Preparation of Compound 26

A mixture of 1.55 g of dry sodium carbonate, 0.85 g of N-allylmethyl amine and 2.00 g of compound 25 are suspended in 25 ml of chloroform and refluxed for 48 h. The mixture is filtered and the solvent evaporated to leave 2.40 g of compound 26 as an oil. $^1$H-NMR (CDCl$_3$, 300 MHz): 2.18 (s, 3H); 3.03 (dt, 2H); 3.55 (s, 2H); 5.17 (dd, 2H); 5.88 (ddd, 1H); 7.45 (t, 1H); 7.64 (d, 1H); 8.07 (ddd, 1H); 8.17 (d, 1H). $^{13}$C-NMR (CDCl$_3$, 75 MHz): 42.0; 60.5; 117.8; 121.9; 123.5; 129.1; 134.9; 135.4; 141.7; 148.3.

Preparation of Compound 27

The compound 26 is dissolved in 25 ml dioxane containing 2.2 g of tin granules and treated with 6.2 ml conc. hydrogenchloride at room temperature dropwise. The mixture is filtered, diluted with ethyl acetate and neutralized with sodium hydroxide solution (2N). Separation and evaporation of the organic pühase leaves an oily residue which is further purified over silicagel (eluent: hexane-ethyl acetate: 1-1) to yield 1.40 g of compound 27. $^1$H-NMR (CDCl$_3$, 300 MHz): 2.20 (s, 3H); 3.06 (dt, 2H); 3.59 (s, 2H); 5.20 (dd, 2H); 5.93 (ddd, 1H); 6.57 (dd, 1H); 6.71 (s, 1H); 6.73 (dd, 1H); 7.12 (t, 1H). $^{13}$C-NMR (CDCl$_3$, 75 MHz): 43.1; 60.6; 61.8; 113.9; 115.7; 117.6; 119.4; 129.1; 135.9; 140.2; 146.5.

Preparation of Compound 5A6

A mixture of 0.50 g of compound 28, obtained according to FR 1410259, and 0.34 g of compound 27 are heated in 10 ml of cellosolve for 2 h at 130° C. The mixture is cooled to room temperature and filtered, and the residue washed with methanol and diethyl ether to give 0.51 g of cyan compound 5A6. $^1$H-NMR (CDCl$_3$, 300 MHz): 2.26 (s, 3H); 3.11 (d, 2H); 3.61 (s, 2H); 5.22 (ddd, 2H); 5.96 (ddd, 1H); 6.57 (dd, 1H); 7.36 (t, 1H); 7.50 (m, 3H); 7.77 (dd, 2H); 8.26 (dd, 2H). $^{13}$C-NMR (CDCl$_3$, 75 MHz): 42.1; 60.5; 61.2; 117.7; 119.3; 119.5; 124.4; 126.6; 126.8; 128.8; 129.0; 133.5; 133.7; 135.7; 140.6; 140.9; 167.3; 184.8.

Example 9b

Preparation of Cyan Compound 5A7

Preparation of Compound 29

In analogy to the preparation of compound 26 in example 9a, compound 29 is obtained from 5.75 g of compound 25 and 8.50 g of N-allylundecenylamine to give 8.60 g of compound 29. $^1$H-NMR (CDCl$_3$, 300 MHz): 0.89 (t, 3H); 1.40 (m, 25H); 2.03 (2H); 2.43 (t, 4H); 3.64 (s, 2H); 4.94 (ddd, 2H); 5.83 (ddd, 1H); 7.47 (t, 1H); 7.69 (d, 1H); 8.08 (dd, 1H); 8.21 (dd, 1H). $^{13}$C-NMR (CDCl$_3$, 75 MHz): 11.0; 22.6; 24.9; 27.1; 27.4; 28.5; 29.1; 29.4; 29.5; 29.6; 30.7; 30.8; 53.9; 56.1; 114.1; 121.7; 123.4; 128.8; 134.6; 139.2; 144.6; 148.3.

Preparation of Compound 30

In analogy to the preparation of compound 27 in example 9a, compound 30 is obtained from 8.5 g of compound 29 and 7.80 g tin granules in 5.00 ml conc. hydrogenchloride and 40 ml dioxane. Purification of the crude oil (silicagel eluent: ethyl acetate-hexane: 2-1) yields 5.10 g of compound 30. $^1$H-NMR (CDCl$_3$, 300 MHz): 0.89 (t, 3H); 1.39 (m, 25H); 2.06 (2H); 2.45 (t, 4H); 3.57 (s, 2H); 4.98 (ddd, 2H); 5.82 (ddd, 1H); 6.57 (t, 1H); 6.72 (dd, 1H); 6.93 (t, 1H); 7.12 (dd, 1H). $^{13}$C-NMR (CDCl$_3$, 75 MHz): 14.1; 22.7; 26.5; 26.9; 27.4; 28.9; 29.1; 29.5; 29.6; 29.7; 29.8; 31.7; 33.8; 53.7; 58.5; 113.0; 113.8; 114.1; 119.5; 123.9; 139.2; 148.4; 154.3.

Preparation of Compound 5A7

In analogy the preparation of compound 5A6 in example 9a compound 5A7 is obtained from 1.00 g of compound 28 and 1.40 g of compound 30. Purification of the crude material (silicagel eluent: dichloromethane-methanol: 40-1) yields 0.81 g of compound 5A7. $^1$H-NMR (CDCl$_3$, 400 MHz): 0.90 (t, 3H); 1.45 (m, 22H); 2.03 (dt, 2H); 2.50 (m, 4H); 3.69 (m, 2H); 4.98 (ddd, 2H); 5.83 (ddd, 1H); 6.80 (broad, NH$_2$); 7.34-7.56 (m, 4H); 7.44 (dd, 2H), 8.23 (dd, 2H), 8.90 (broad, NH$_2$). $^{13}$C-NMR (CDCl$_3$, 75 MHz): 14.1; 22.7; 26.5; 26.9; 27.4; 28.9; 29.1; 29.5; 29.6; 29.7; 29.8; 31.7; 33.8; 53.8; 55.1; 58.2; 114.1; 119.2; 126.6; 133.4; 133.6; 139.2; 140.2; 167.3; 184.6.

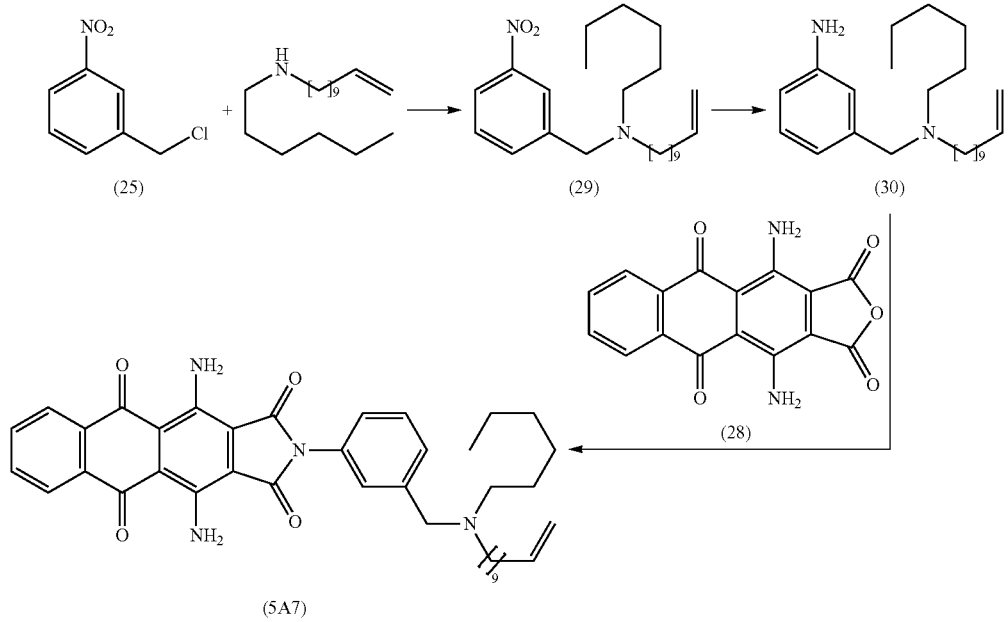

Example 10

Preparation of Yellow Compound 2A1

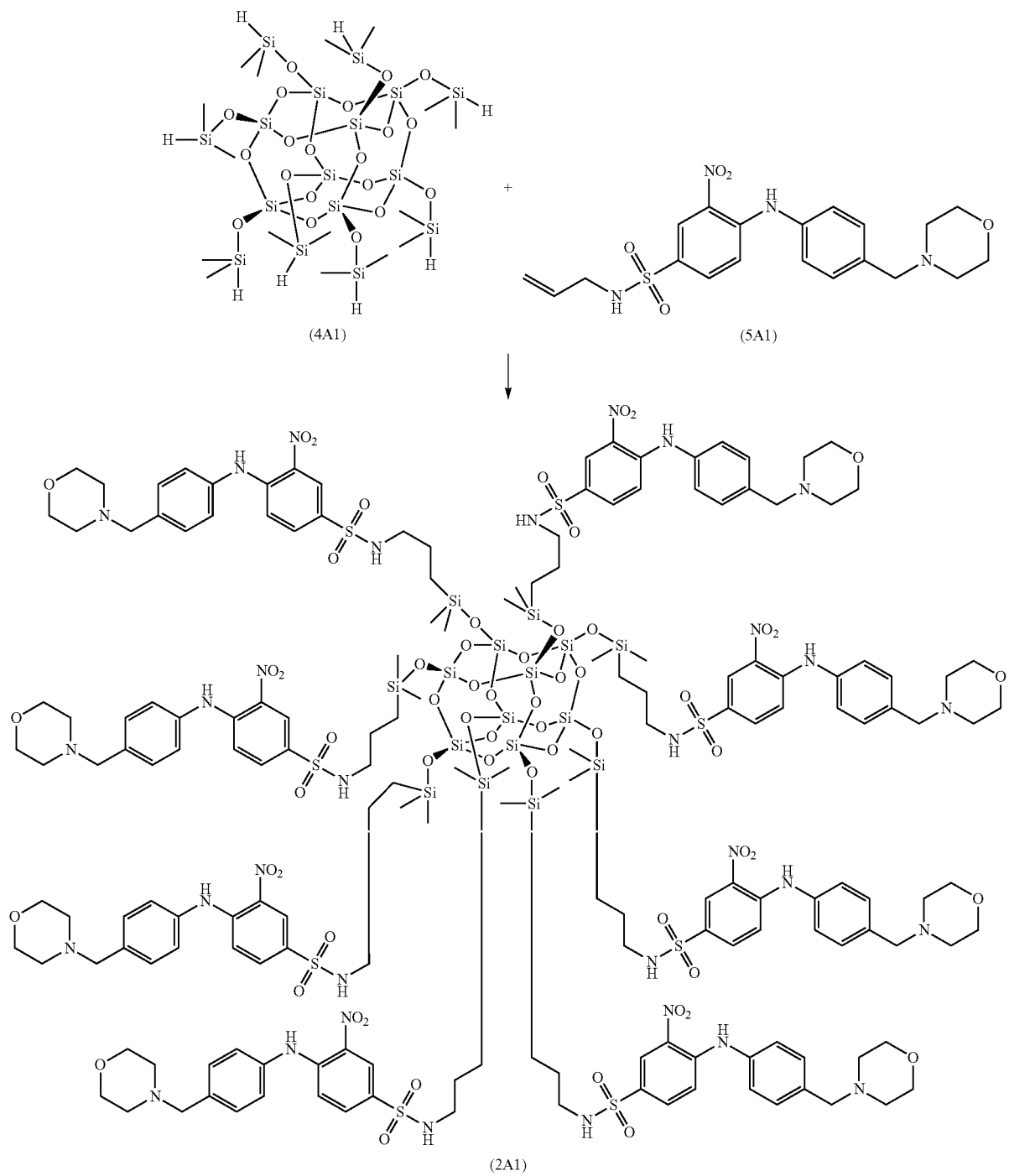

A solution of 2.0 g of compound 4A1 and 7.47 g of compound 5A1, prepared as described in example 5, are dissolved in 50 ml toluene under an argon atmosphere and treated with 0.6 ml of a solution of hexachloroplatinic acid in iso-propanol (10% (w/v)) at 80° C. until a $^{29}$Si-NMR confirms the consumption of all Si—H moieties (ca. 24 h). The mixture is then cooled down and dropped into diethyl ether to precipitate the product. The resulting solid is taken up in dichloromethane and precipitated a second time with diethyl ether. This procedure is repeated a third time to yield 6.1 g of yellow compound 2A1. $^1$H-NMR (CDCl$_3$, 300 MHz): δ 0.15 (s, 6H); 0.61 (t, 2H); 1.62 (quint, 2H); 2.48 (m, 4H); 2.94 (t, 2H); 2.72 (m, 4H); 7.21 (d, 1H); 7.25 (d, 2H); 7.42 (d, 2H); 7.78 (m, 2H); 8.67 (d, 2H); 9.76 (NH). $^{29}$Si-NMR (CDCl$_3$, 80 MHz): δ −109; +13.

Example 11
Preparation of Magenta Compound 2A2
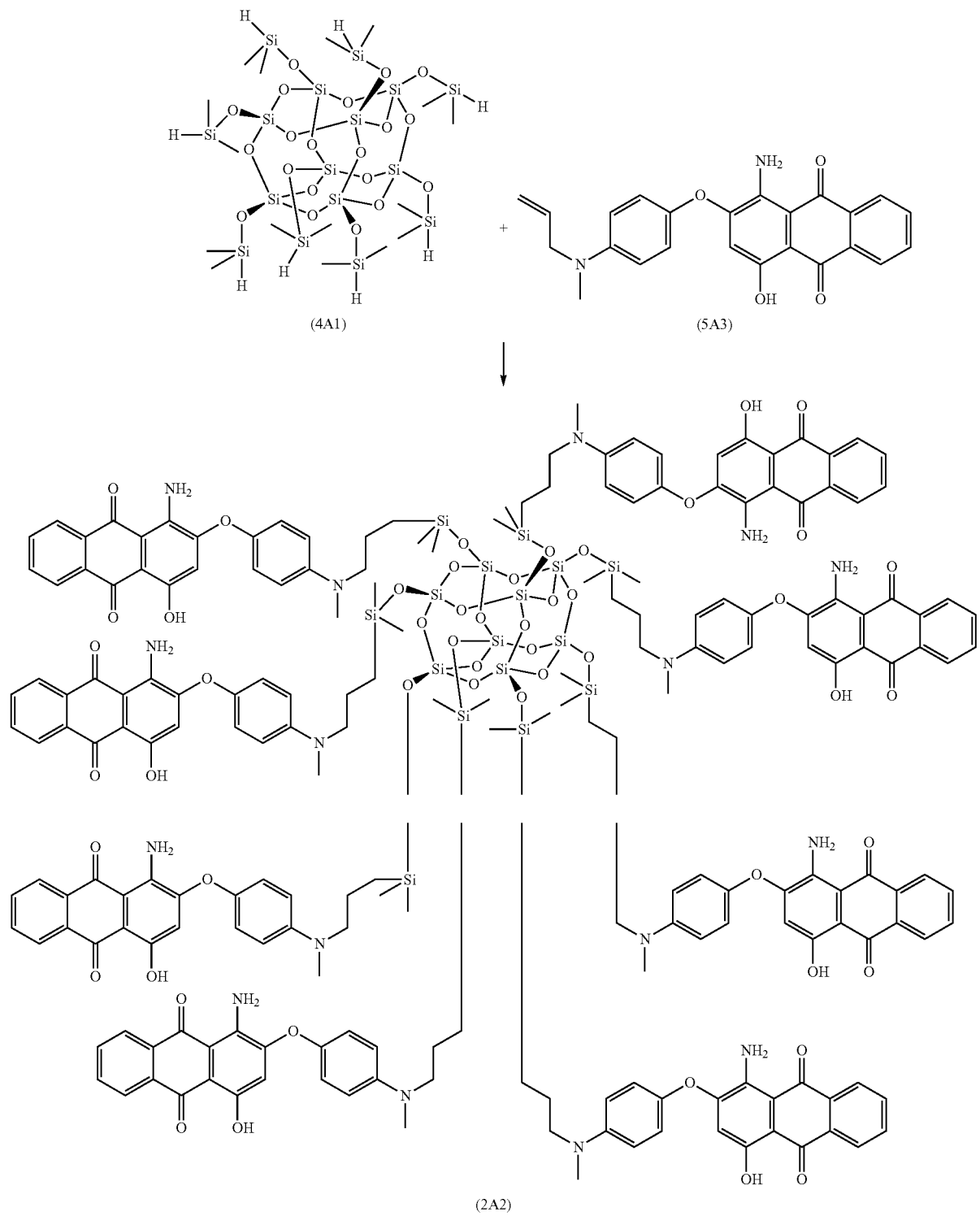
Magenta compound 2A2 is prepared in analogy to compound 2A1 in example 10. 1.0 g of compound 5A3, prepared as described in example 7, and 289 mg of compound 4A1 are reacted to yield 975 mg of compound 2A2. $^1$H-NMR (CDCl$_3$, 300 MHz): δ 0.20 (s, 6H); 0.66 (dd, 2H); 1.67 (quint. 2H); 2.93 (s, 3H); 3.30 (t, 2H); 6.31 (s, 1H); 6.67 (d, 2H); 6.95 (d, 2H); 7.66 (m, 2H); 8.22 (dd, 2H). $^{29}$Si-NMR (CDCl$_3$, 80 MHz): δ 110; +14.

Example 12
Preparation of Magenta Compound 2A3
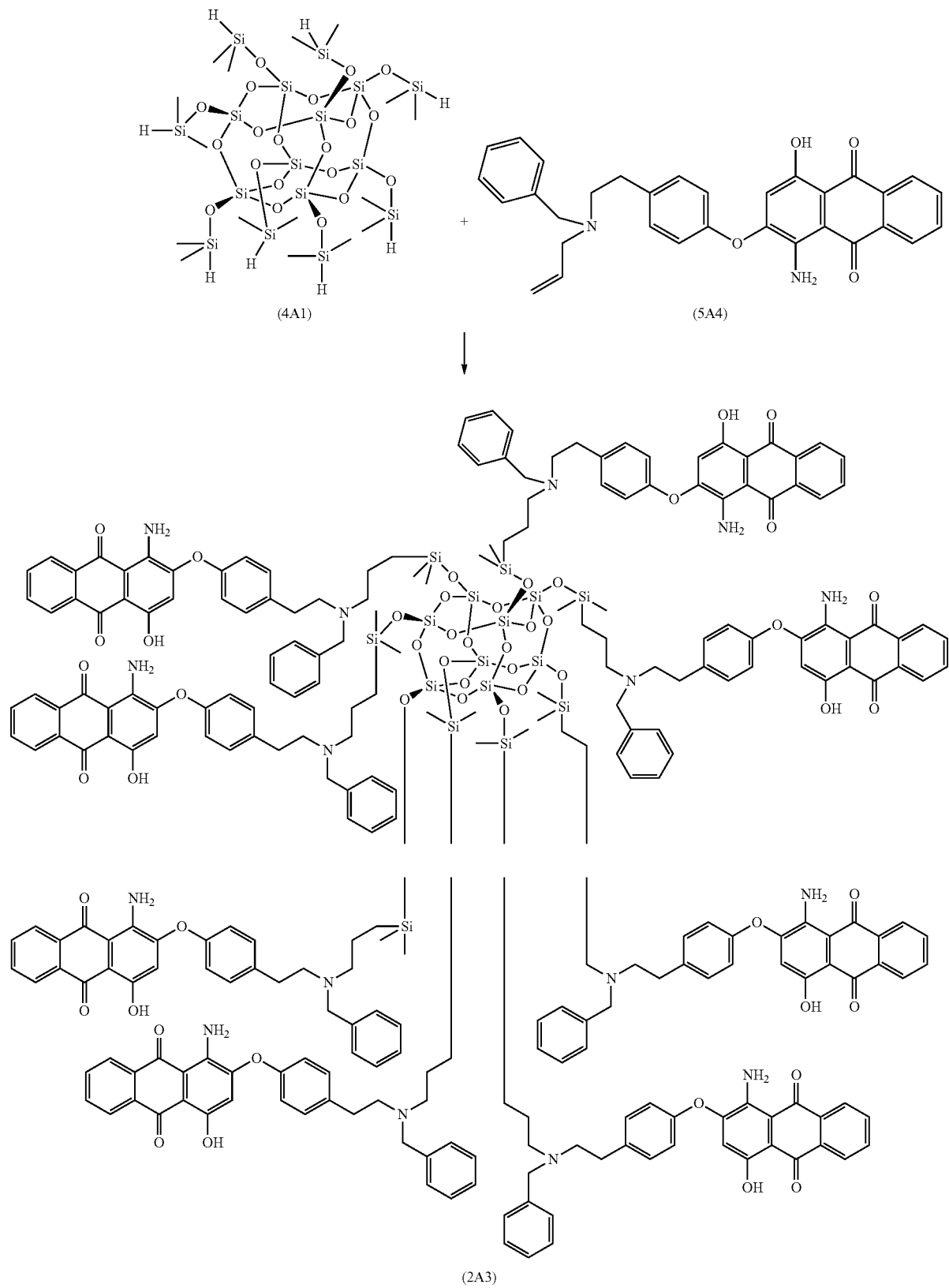

Magenta compound 2A3 is prepared in analogy to compound 2A1 in example 10. 5.2 g of compound 5A4, prepared as described in example 8, and 1.2 g of compound 4A1 are reacted to yield 4.4 g of magenta compound 2A3. $^1$H-NMR (CDCl$_3$, 300 MHz): all signals broad δ 0.21 (48H); 0.65 (16H); 1.61 (16H); 2.59 (16H); 2.88 (32H); 3.69 (16H); 6.23 (8H); 7.03 (16H); 7.19 (16H); 7.34 (40H); 7.68 (16H); 8.22 (16H). $^{13}$C-NMR (CDCl$_3$, 75 MHz): δ 0.31; 15.20; 20.52; 33.00; 55.53; 57.26; 58.55; 108.32; 108.42; 109.18; 120.87; 126.13; 126.67; 126.96; 128.26; 128.85; 129.31; 129.76; 130.61; 132.70; 133.19; 133.47; 134.778; 133.97; 151.59; 155.35; 159.34; 182.78; 185.09. $^{29}$Si-NMR (CDCl$_3$, 80 MHz): δ −110; +14.
Example 13
Preparation of Magenta Compound 2A4
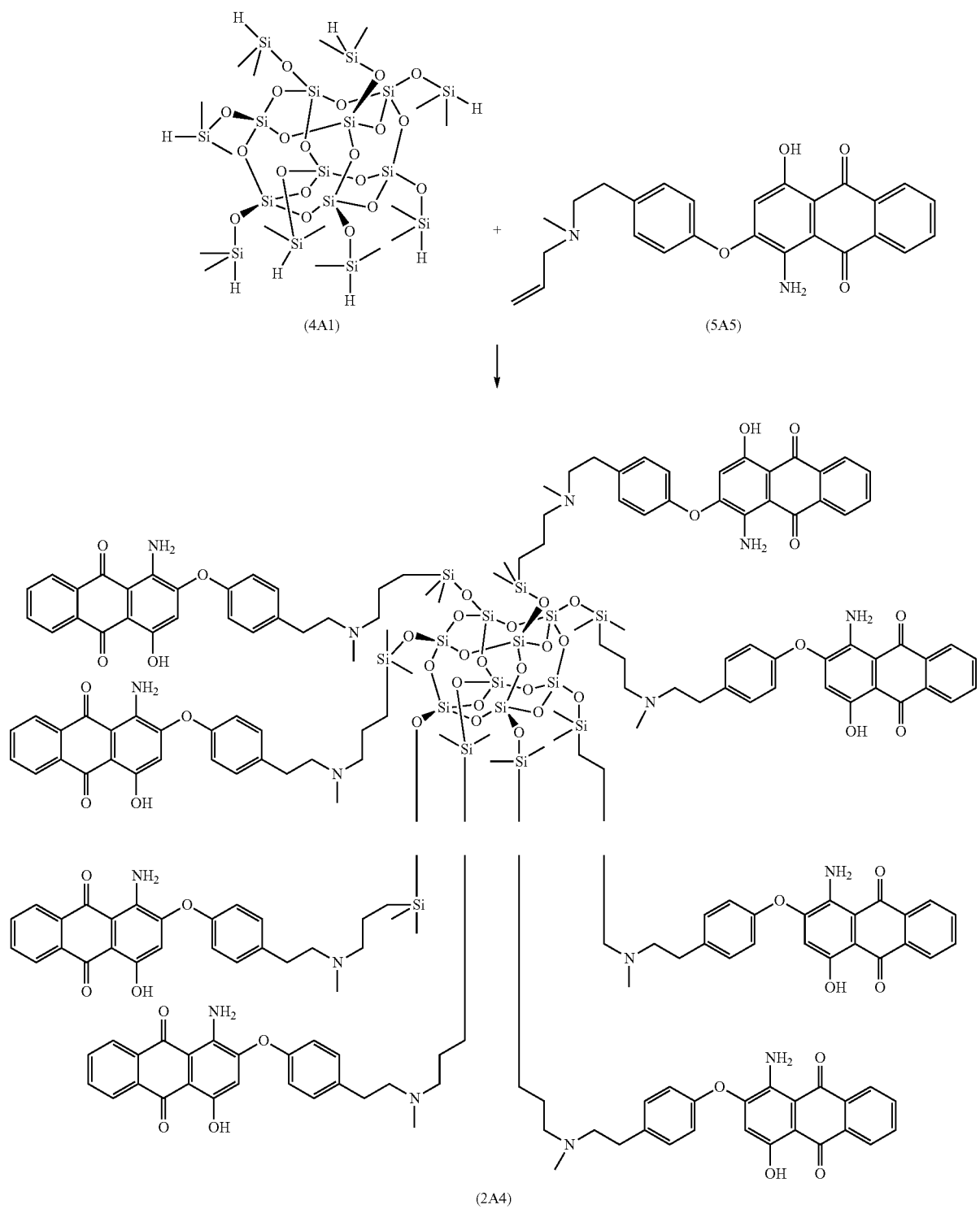
(4A1)
(5A5)
(2A4)

Magenta compound 2A4 is prepared in analogy to compound 2A1 in example 10. 5.0 g of compound 5A5, prepared as described in example 9, and 1.5 g of compound 4A1 are reacted to yield 4.4 g of magenta compound 2A4. $^1$H-NMR (CDCl$_3$, 300 MHz): all signals broad δ 0.22 (48H); 0.65 (16); 1.60 (16H); 2.36 (24H); 2.37 (16H); 2.55 (16H); 2.85 (16H); 6.30 (8H); 7.06 (16H); 7.27 (46H); 7.70 (16H); 8.36 (16). $^{29}$Si-NMR (CDCl$_3$, 80 MHz): δ 110; +14.

Example 14

Preparation of Yellow Compound 1A1

A solution of 60 mg of compound 2A1, prepared as described in example 10, and 29 mg of compound 3AX1, prepared as described in example 1, are dissolved in 0.5 ml dioxane and heated to 90° C. until a $^1$H-NMR shows disappearance of the methoxide signal to give yellow compound 1A1 quantitatively which carries two charges per cage structure. $^1$H-NMR (dioxane, 300 MHz): δ 0.17 (s, ca. 144); 0.20 (s, 48H); 0.66 (m, 24H); 0.91 (t, 6H); 1.34 (m, 8H); 1.53 (m, 20H); 1.88 (broad m, 4H); 2.43 (broad, 36H); 2.96 (m, 16H); 3.49 (m, 16H); 3.62 (m, 38); 6.74 (broad, 8NH); 7.22 (d, 8H); 7.30 (d, 16H); 7.47 (m, 16H); 7.73 (d, 8H); 8.59 (broad 8H); 9.74 (broad 8 NH).

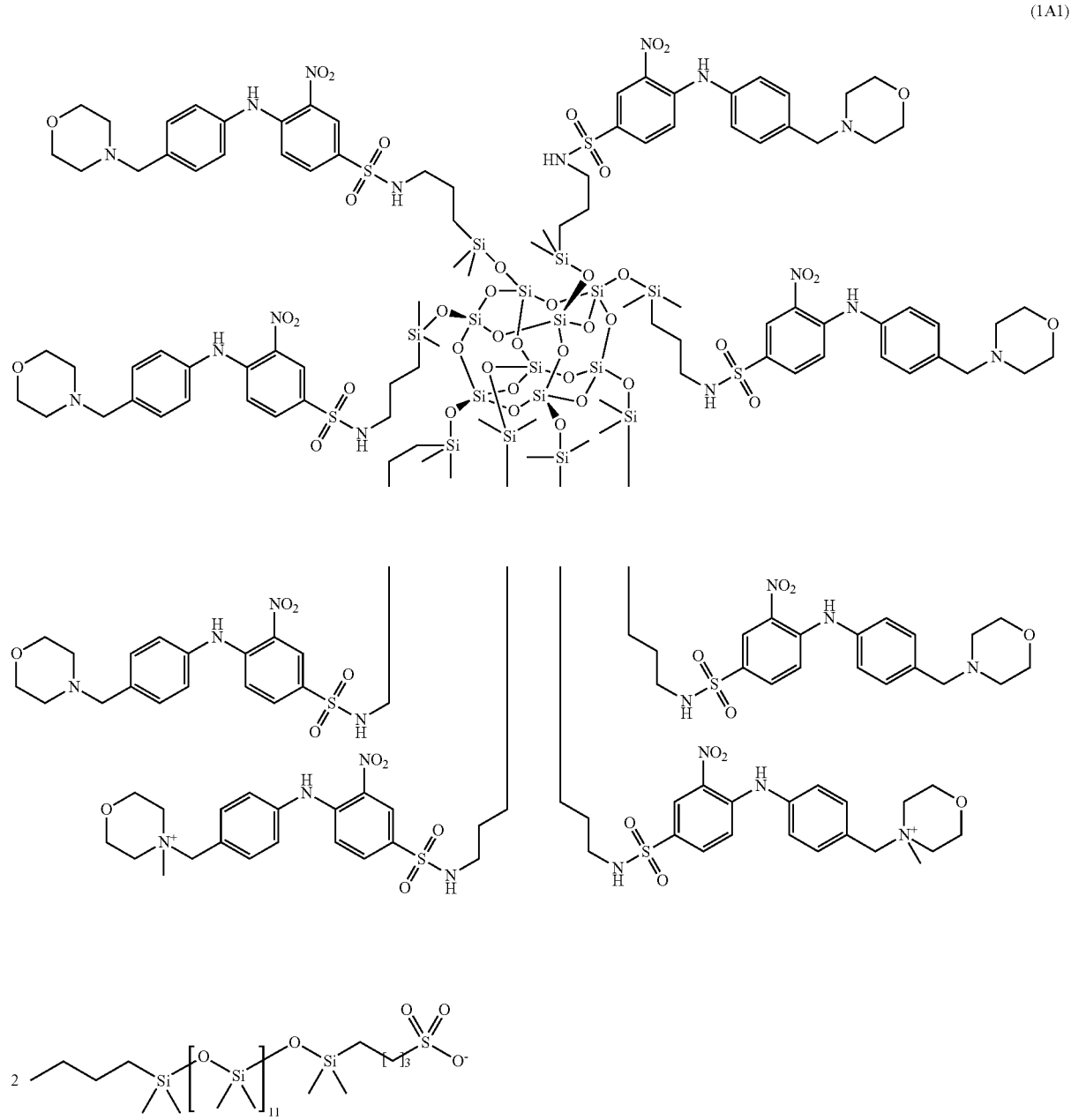

(1A1)

Example 15

Preparation of Yellow Compound 1A2

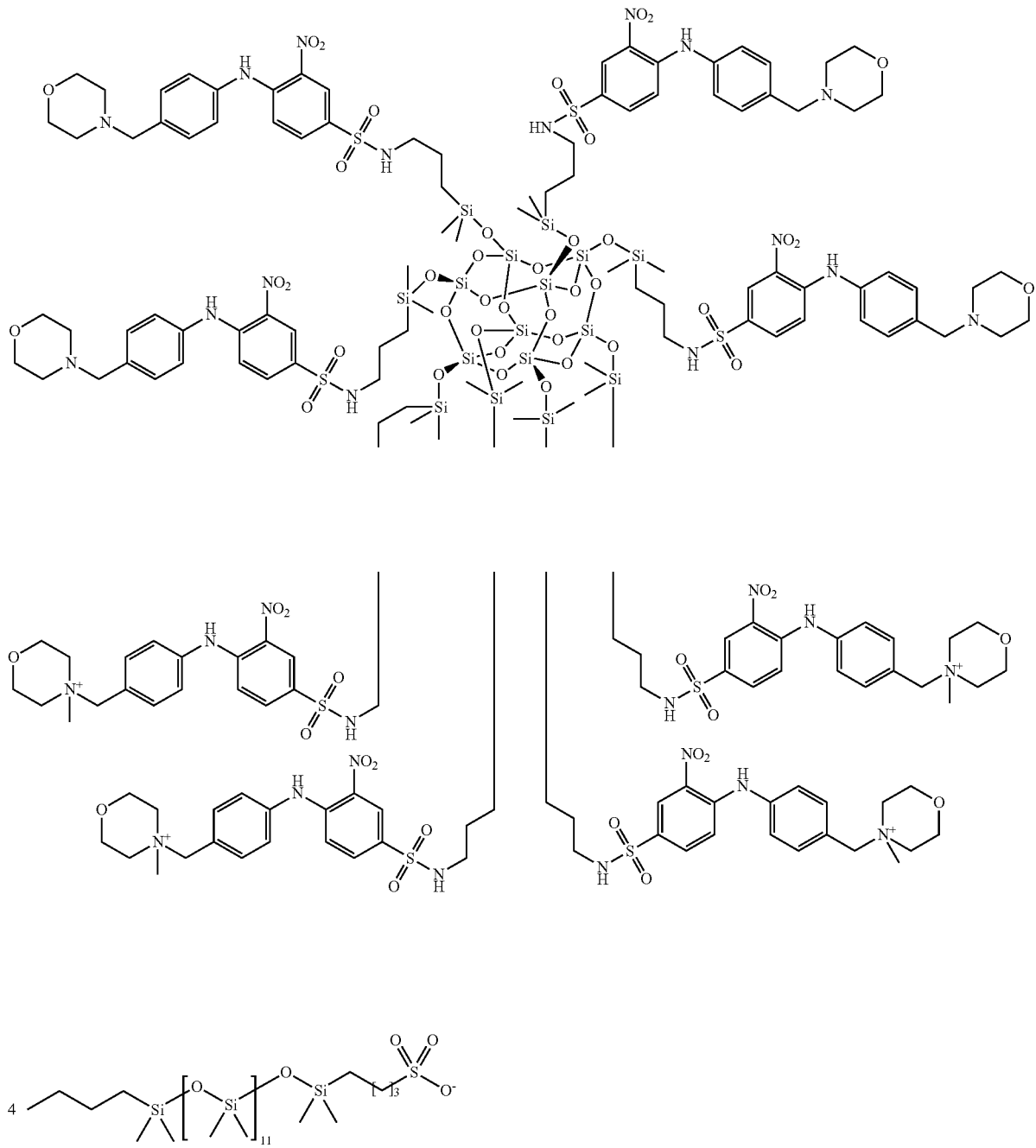

(1A2)

Heating 60 mg of compound 2A1, prepared as described in example 10, with 8 mol equivalents of compound 3AX1, prepared as described in example 1, in dioxane results in yellow compound 1A2 with 4 charges per cage as indicated by 1H-NMR analysis. $^1$H-NMR (CDCl$_3$, 300 MHz): 0.20 (m, Si—CH3); 0.6 (m, Si—CH$_2$); 0.90 (t, CH$_3$); 1.2-1.7 (broad, C—CH$_2$—C); 1.8-2.0 (broad CH$_2$); 2.7-3.0 (CH$_2$—N, —CH$_2$—S); 3.5 (broad, NCH$_3$); 3.6-3.7 (braod —CH$_2$—O); 3.8-4.1 (broad, CH$_2$N); 7.1-7.2 (phenyl-H); 7.5-7.6 (phenyl-H); 7.8-8.0 (phenyl.H); 8.5-8.7 (phenyl-H); 9.7-9.8 (NH).

Example 16

Preparation of Magenta Compound 1A3

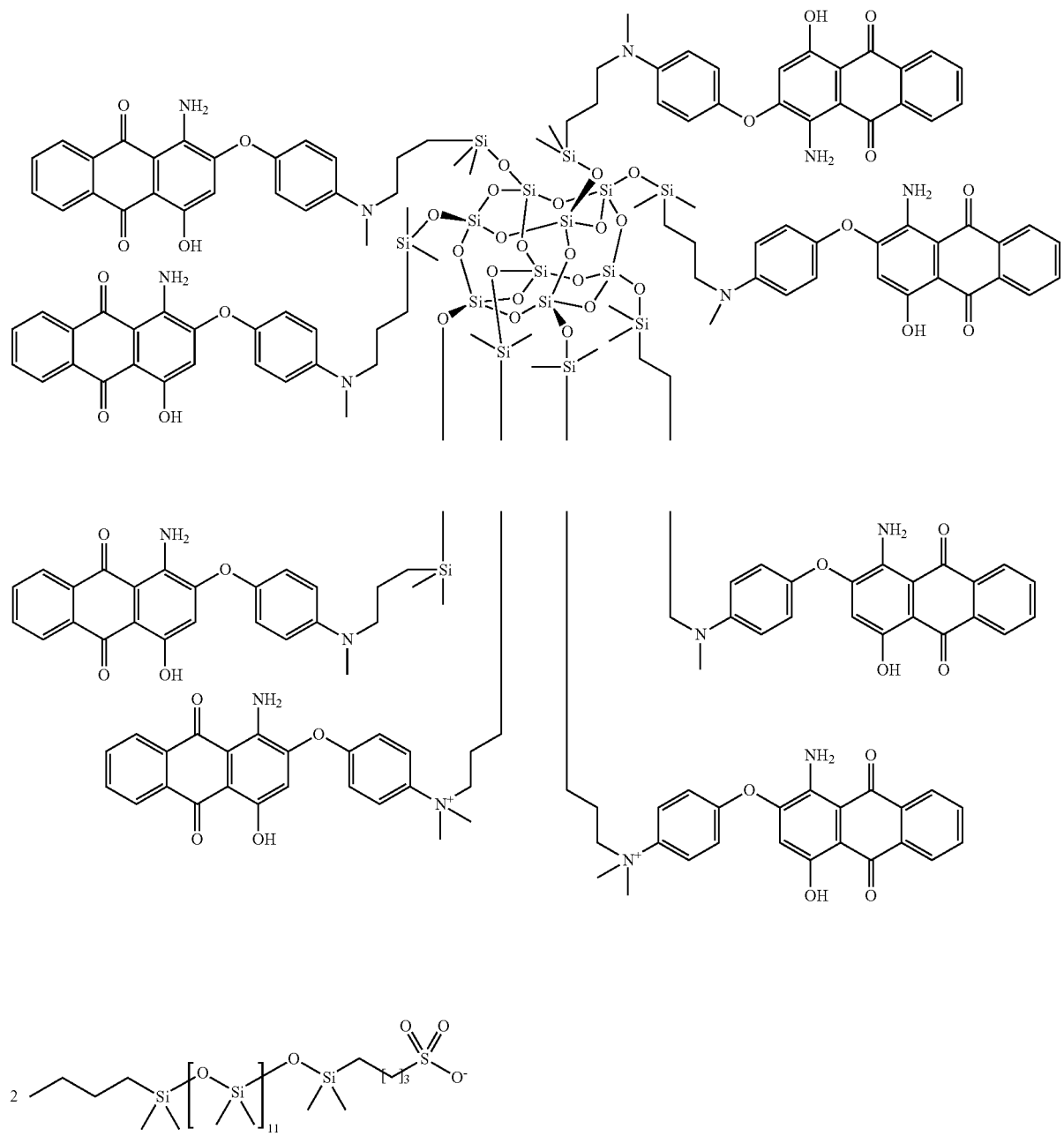

(1A3)

A solution of 50 mg of magenta compound 2A2, prepared as described in example 11, and 26 mg of 3AX1, prepared as described in example 1, are dissolved in 0.5 ml dioxane and heated to 90° C. until a $^1$H-NMR shows disappearance of the methoxide signal to give magenta compound 1A3 quantitatively which carries two charges per cage structure. $^1$H-NMR (dioxane, 300 MHz): all signals broad δ 0.17 (s, ca. 78); 0.20 (s, 48H); 0.66 (m, 32H); 0.91 (t, 12H); 1.35 (m, 16H); 1.53 (quint. 8H); 1.69 (quint. 16H); 1.92 (quint. 8H); 2.96 (broad, 36H); 3.11 (d, 8H); 3.30 (m, 16H); 6.29 (s, 8H); 6.66 (d, 16H); 6.95 (d, 16H); 7.66 (m, 16H); 8.20 (dd, 16H).

Example 17

Preparation of Magenta Compound 1A4

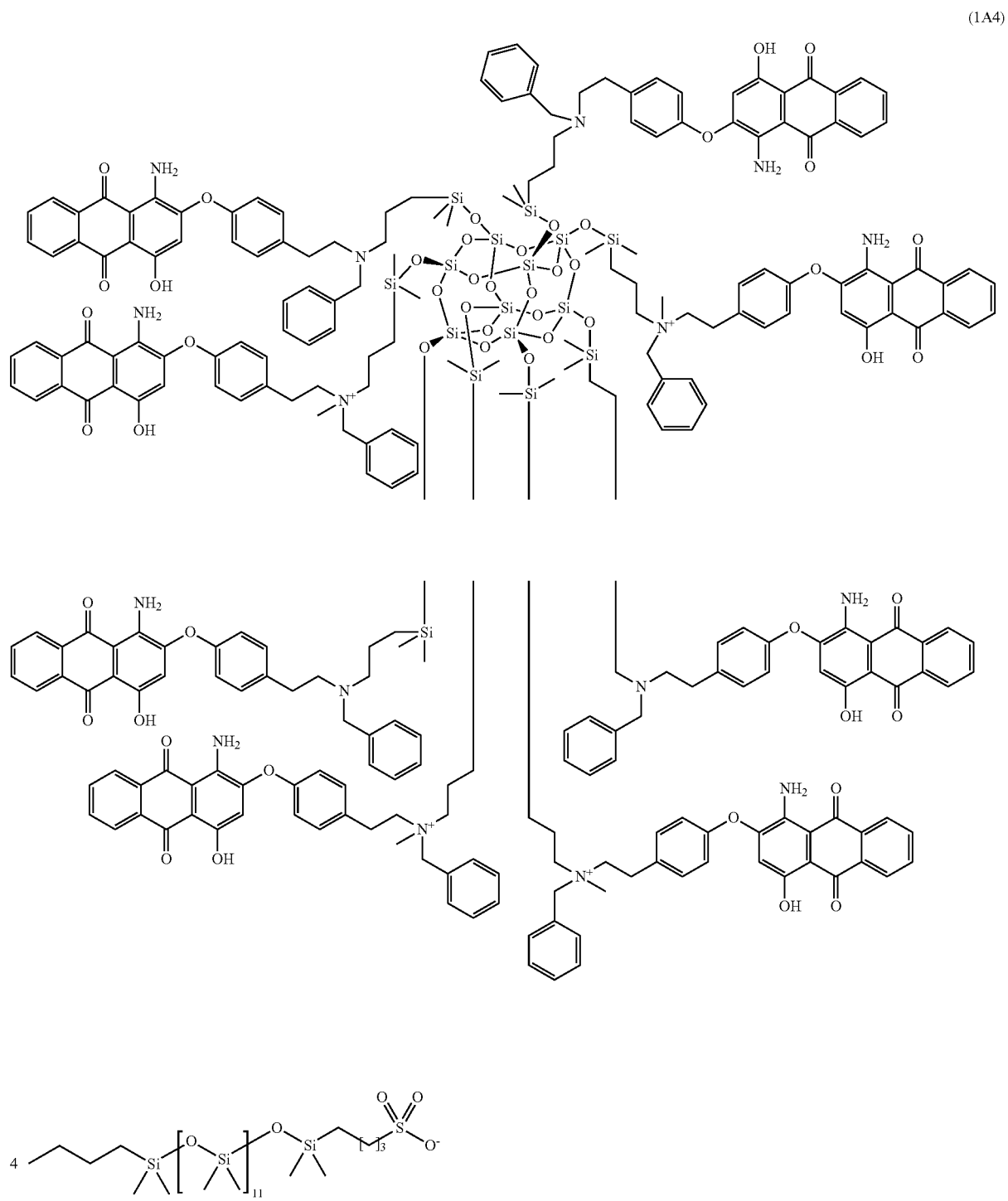

(1A4)

A solution of 50 mg of magenta compound 2A3, prepared as described in example 12, and 84 mg of 3AX1, prepared as described in example 1, are dissolved in 0.5 ml dioxane and heated to 90° C. until a $^1$H-NMR shows disappearance of the methoxide signal to give magenta compound 1A4 quantitatively which carries four charges per cage structure. $^1$H-NMR (dioxane, 300 MHz): all signals broad δ 0.24 (ca. 360H); 0.62 (32H); 0.92 (12H); 1.29 (16H); 1.54 (24H); 1.92 (8H); 2.55 (16H); 2.73 (44H); 3.14 (8H); 3.62 (16H); 6.29 (8H); 7.28 (56H); 7.58 (16H); 8.23 (16H).

Example 18

Preparation of Magenta Compound 1A5

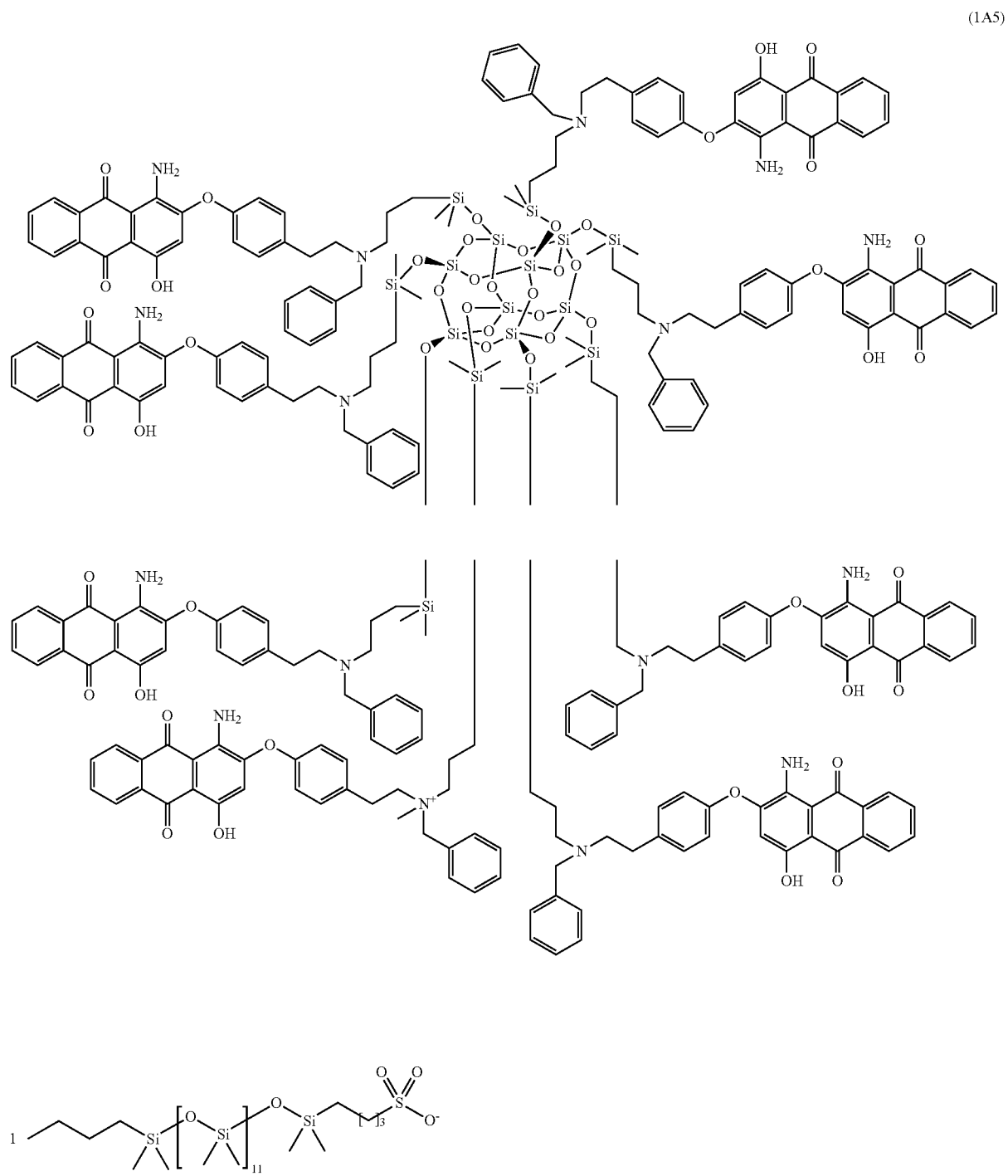

(1A5)

A solution of 60 mg of magenta compound 2A3, prepared as described in example 12, and 12 mg of 3AX1, prepared as described in example 1, are dissolved in 0.5 ml dioxane and heated to 90° C. until a $^1$H-NMR shows disappearance of the methoxide signal to give magenta compound 1A5 quantitatively which carries one charge per cage structure. $^1$H-NMR (dioxane, 300 MHz): all signal broad δ 0.24 (ca. 130H); 0.62 (20H); 0.94 (3H); 1.30 (4H); 1.57 (18H); 1.85 (2H); 2.62 (16H); 2.76 (35H); 3.14 (2H); 3.62 (16H); 6.32 (8H); 7.28 (56H); 7.61 (16H); 8.28 (16H).

Example 19

Preparation of Magenta Compound 1A6

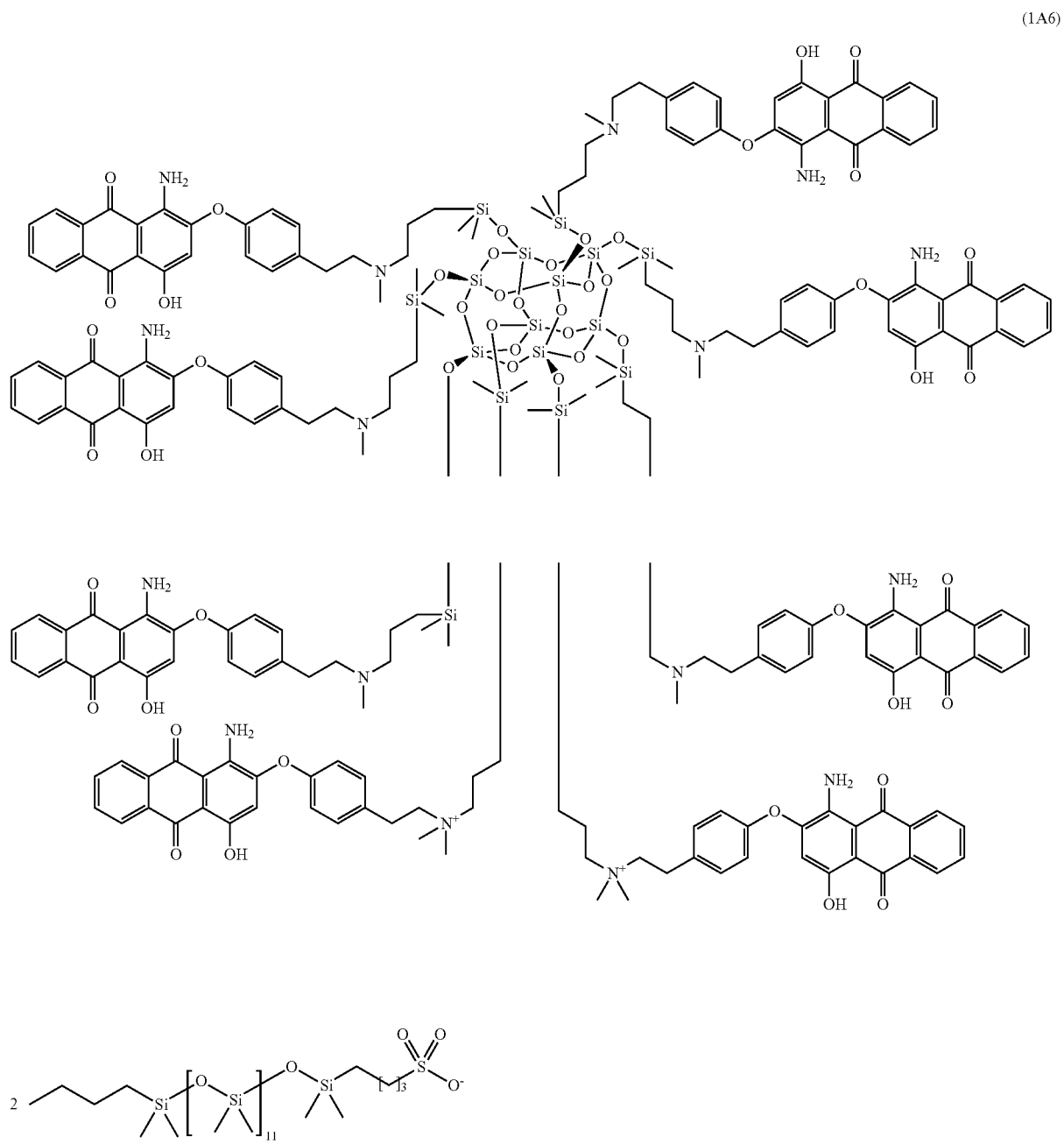

(1A6)

A solution of 50 mg of magenta compound 2A4, prepared as described in example 12, and 25 mg of 3AX1, prepared as described example 1, are dissolved in 0.5 ml dioxane and heated to 90° C. until a $^1$H-NMR shows disappearance of the methoxide signal to give magenta compound 1A6 quantitatively which carries two charges per cage structure. $^1$H-NMR (CDCl$_3$, 300 MHz): all signal broad δ 0.17 (ca. 204H); 0.69 (24H); 0.89 (6H); 1.32 (12H); 1.59 (8H); 1.82 (8H); 2.25 (30H); 2.76 (12H); 2.83 (16H); 3.50 (24H); 6.29 (8H); 7.06 (16H); 7.29 (16H); 7.68 (16H); 8.31 (16H).

Example 20

Preparation of Magenta Compound 1A7

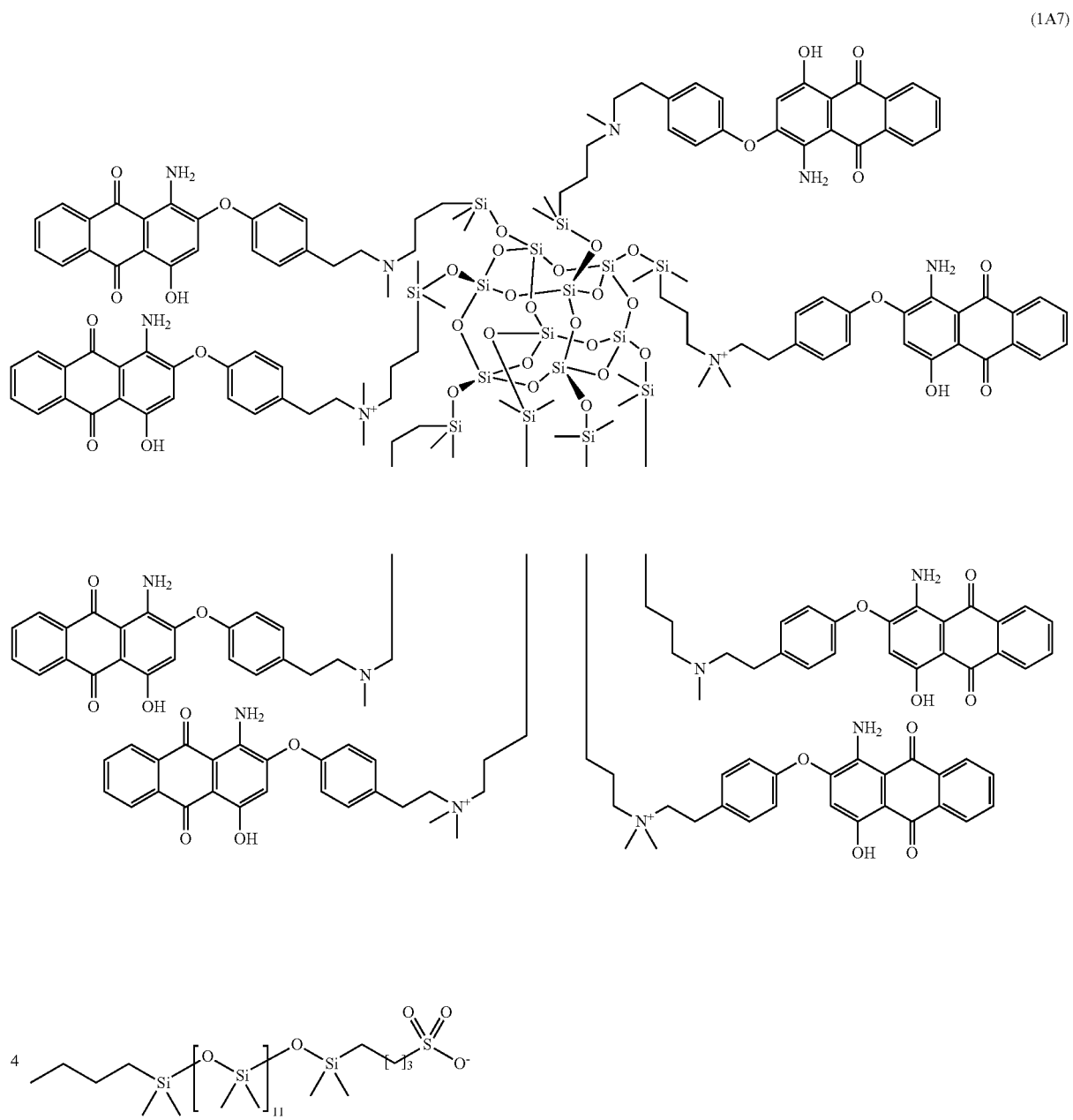

(1A7)

A solution of 50 mg of magenta compound 2A4, prepared as described in example 13, and 97 mg of compound 3AX1, prepared as described in example 1, are dissolved in 0.5 ml dioxane and heated to 90° C. until a $^1$H-NMR shows disappearance of the methoxide signal to give magenta compound 1A7 quantitatively which carries four charges per cage structure. $^1$H-NMR (CDCl$_3$, 300 MHz): all signal broad δ 0.17 (ca. 360H); 0.69 (32H); 0.89 (12H); 1.32 (12H); 1.59 (8H); 1.82 (8H); 2.25 (36H); 2.76 (12H); 2.83 (16H); 3.50 (32); 6.29 (8H); 7.06 (16H); 7.29 (16H); 7.68 (16H); 8.31 (16H).

Example 21

Preparation of Magenta Compound 1A8

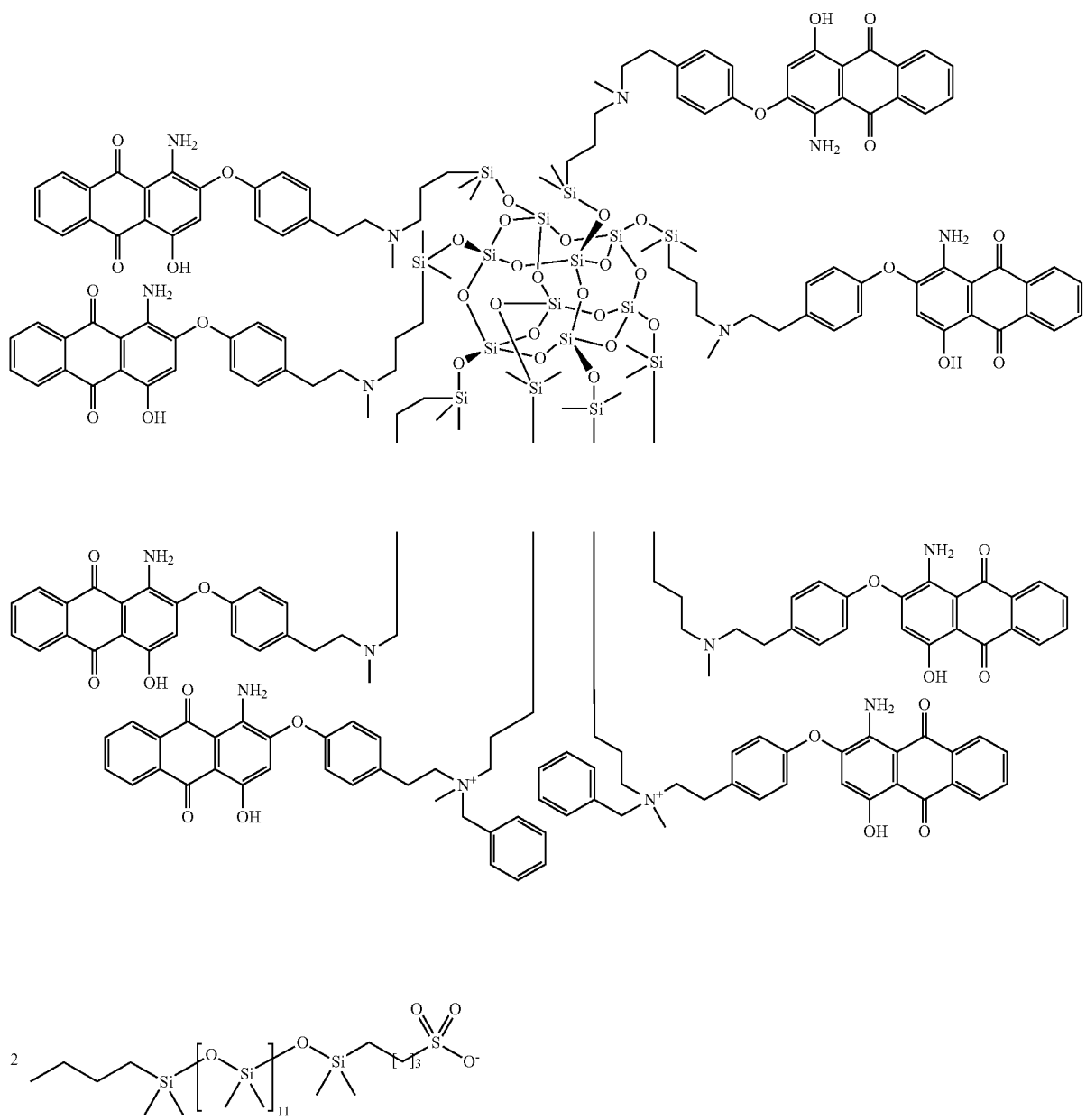

(1A8)

A solution of 60 mg of magenta compound 2A4, prepared as described in example 13, and 97 mg of 3AX3, prepared as described in example 3, are dissolved in 0.5 ml dioxane and heated to 90° C. until a $^1$H-NMR shows disappearance of the methoxide signal to give magenta compound 1A8 quantitatively which carries two charges per cage structure. $^1$H-NMR (CDCl$_3$, 300 MHz): all signal broad δ 0.19 (ca. 204H); 0.65 (24H); 0.88 (6H); 1.36 (12H); 1.50 (8H); 1.82 (8H); 2.35 (28H); 2.70 (12H); 2.83 (28H); 3.30 (12H); 6.29 (8H); 7.08 (16H); 7.23 (16H); 7.45 (10); 7.71 (16H); 8.24 (16H).

Example 22

Preparation of Magenta Compound 1A9

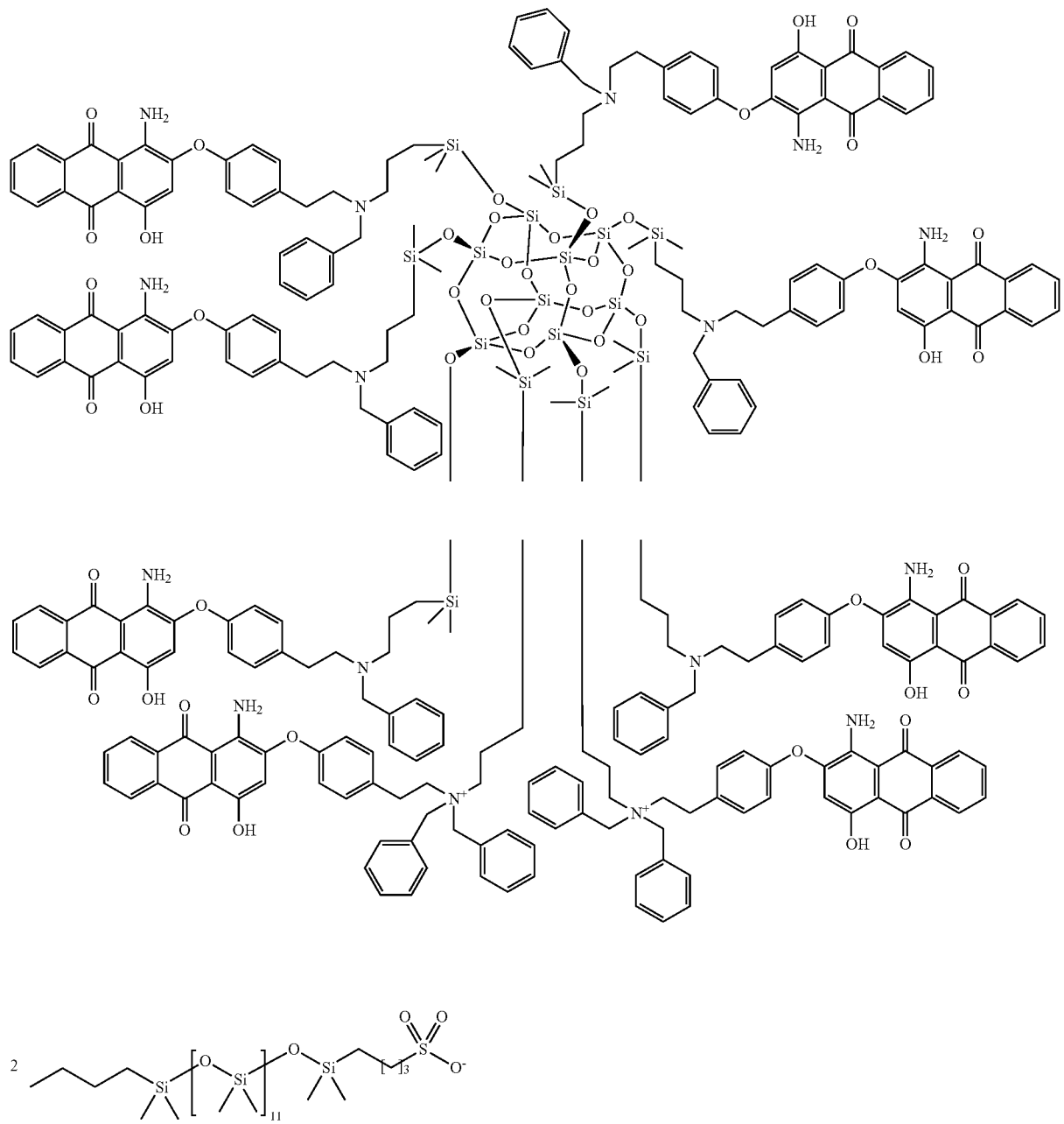

(1A9)

A solution of 60 mg of compound 2A3, prepared as described in example 12, and 27 mg of compound 3AX3, prepared as described in example 3, are dissolved in 0.5 ml dioxane and heated to 90° C. until a $^1$H-NMR shows disappearance of the methoxide signal to give magenta compound 1A9 quantitatively which carries two charges per cage structure. $^1$H-NMR (CDCl$_3$, 300 MHz): all signal broad δ 0.19 (ca. 204H); 0.65 (24H); 0.88 (6H); 1.36 (12H); 1.60 (16H); 1.92 (4H); 2.75 (52H); 3.65 (20H); 6.29 (8H); 7.08 (16H); 7.30 (66H); 7.72 (16H); 8.24 (16H).

Example 22a

Preparation of Magenta Compound 1A10

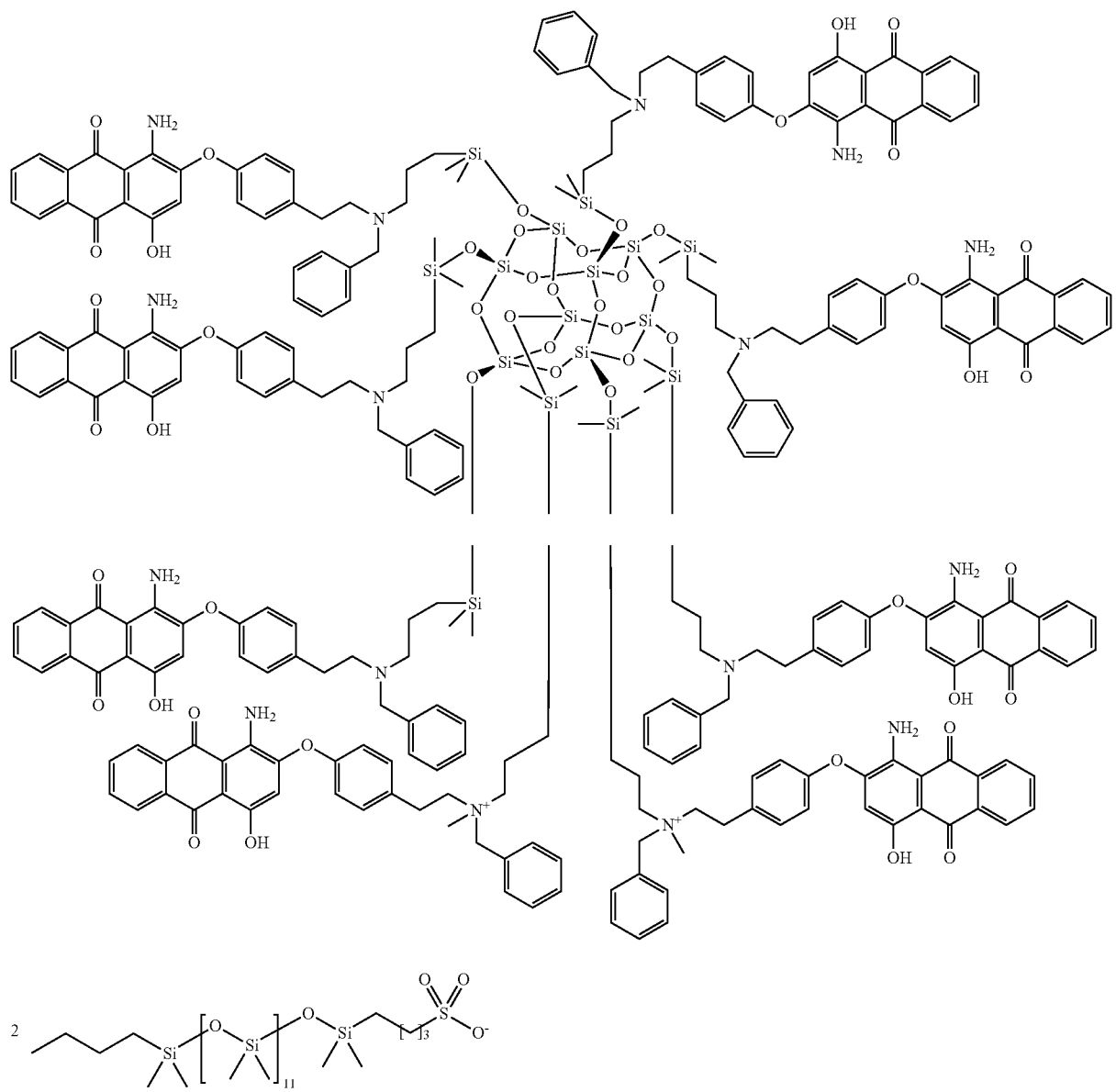

(1A10)

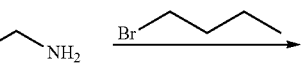

A solution of 156 mg of magenta compound 2A3, prepared as described in example 12, and 64 mg of 3AX1, prepared as described in example 1, are dissolved in 0.5 ml chloroform and are heated to 65° C. for 48 h until a $^1$H-NMR shows disappearance of the methoxide signal to give magenta compound 1A10 quantitatively which carries two charges per cage structure. $^1$H-NMR (CDCl$_3$, 300 MHz): all signal broad δ 0.24 (ca. 68H); 0.61 (24H); 0.94 (6H); 1.35 (8H); 1.67 (20H); 1.92 (4H); 2.58 (12H); 2.78 (38H); 3.34 (4H); 3.69 (20H); 6.32 (8H); 7.02 (16H); 7.31 (56H); 7.61 (16H); 8.28 (16H).

Example 23

Preparation of Compound 3BX1

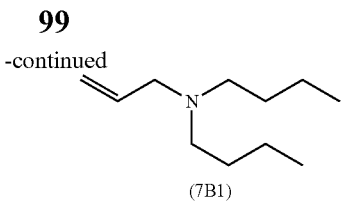

(7B1)

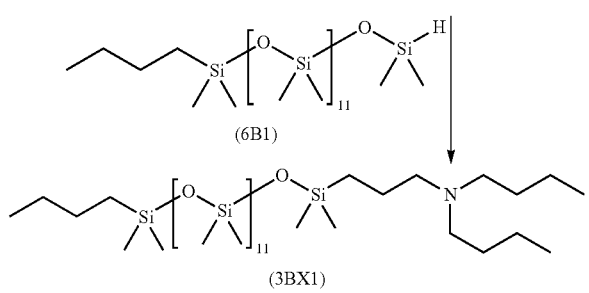

(6B1)

(3BX1)

Preparation of compound 7B1

A suspension of 106.0 g sodium carbonate in 28.5 g of allylamine and 270 ml of butyl bromide are stirred at 90° C. for 5 h. The mixture is cooled to room temperature, diluted with dichloromethane, filtered and successively extracted with 0.5 N hydrochloric acid, saturated hydrogen sodiumcarbonate solution and brine. Evaporation of the organic solvent leaves an oil which is distilled at 45° C. and 0.5 mbar to give 44.2 g of compound 7B1. $^1$H-NMR (CDCl$_3$, 300 MHz): δ 0.93 (t, 6H); 1.28 (quint. 4H); 1.42 (quint. 4H); 2.43 (t, 4H); 3.09 (t, 2H); 5.10 (d, 1H); 5.19 (d, 1H); 5.87 (ddt, 1H). $^{13}$C-NMR (CDCl$_3$, 75 MHz): δ 14.02; 20.68; 29.13; 53.48; 57.29; 116.75; 136.17.

Preparation of Compound 3BX1

Compound 3BX1 is prepared in analogy to compound 3AX1 in example 1. 39.6 g of compound 3BX1 are obtained from 50.0 g of polydimethylsiloxane 6B1 (supplier ABCR) and 10.8 g of compound 7B1. $^1$H-NMR (CDCl$_3$, 300 MHz): δ 0.94 (t, 6H); 1.39 (m, 22H); 1.95 (dt, 2H); 2.33 (dt, 6H); 4.89 (dd, 2H); 7.73 (ddt, 1H). $^{13}$C-NMR (CDCl$_3$, 75 MHz): δ 13.09; 19.78; 25.95; 26.63; 27.93; 28.13; 28.45; 28.59; 32.81; 52.90; 53.21; 113.07; 138.2.

Example 23a

Preparation of Compound 7B2

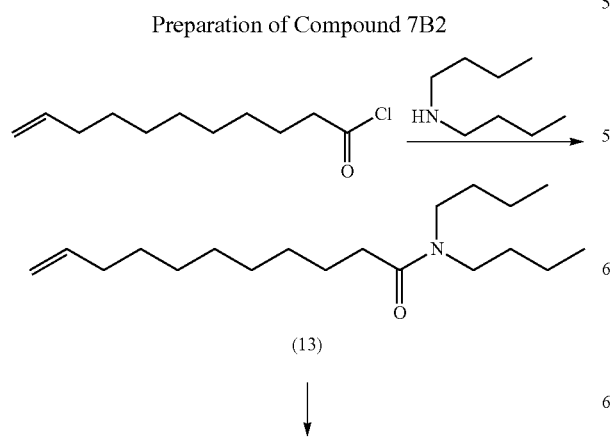

(13)

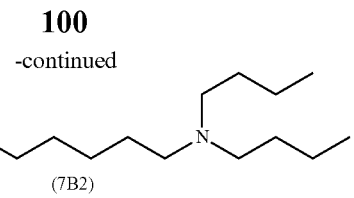

(7B2)

Preparation of Compound 13

A mixture of 26.5 ml of 10-undecenoyl chloride and 31.4 ml dibutyl amine are cautiously dissolved in 100 ml toluene and then heated to 80° C. for 24 h. Usual work-up gives an oily residue which is purified by column chromatography over silica gel (eluent: hexane-ethyl acetate (10-3)) to yield 30.8 g of compound 13.

Preparation of Compound 7B2

5.0 g of compound 13 is added to a mixture of 0.7 g of lithium aluminiumhydride in 30 ml of tetrahydrofurane in an argon atmosphere and refluxed until consumption of the starting material. After cooling down to room temperature, excess hydride is cautiously destroyed with 15% sodium hydroxide and compound 7B2 extracted with hexane. Evaporation of the solvent gives 4.5 g of compound 7B2. $^1$H-NMR (CDCl$_3$, 300 MHz): δ 0.94 (t, 6H); 1.39 (m, 22H); 1.95 (dt, 2H); 2.33 (dt, 6H); 4.89 (dd, 2H); 7.73 (ddt, 1H). $^{13}$C-NMR (CDCl$_3$, 75 MHz): δ 13.09; 19.78; 25.95; 26.63; 27.93; 28.13; 28.45; 28.59; 32.81; 52.90; 53.21; 113.07; 138.2.

Example 23b

Preparation of 7B3

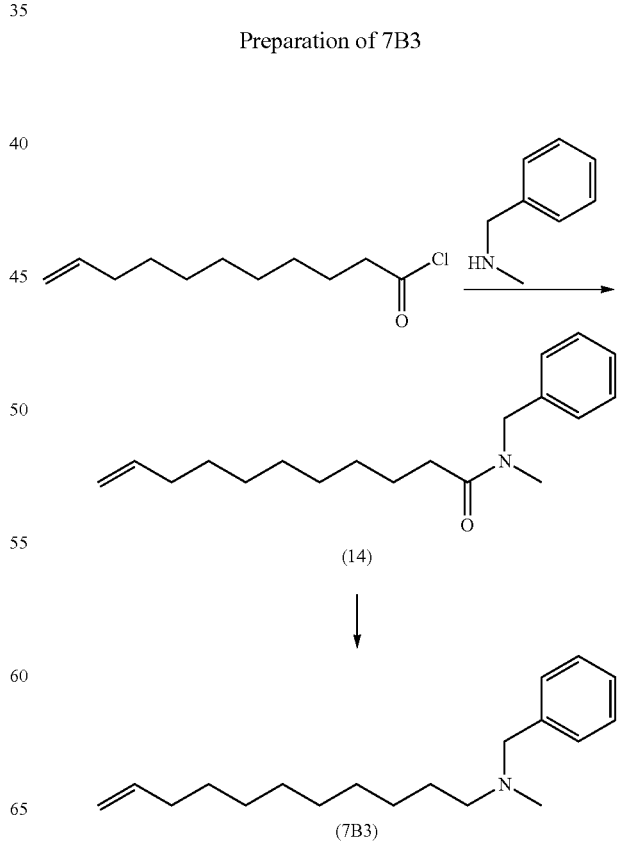

(14)

(7B3)

Preparation of Compound 14

Compound 14 is prepared in analogy to compound 13 in example 8. 26.3 g of compound 14 are obtained from 33.4 ml of 10-undecenoyl chloride and 30.0 ml N-benzyl-N-methyl amine.

Preparation of Compound 7B3

Compound 7B3 is prepared in analogy to compound 7B2 in example 8. Reduction of 13.2 g of compound 14 yields 11.2 g of compound 7B3. $^1$H-NMR (CDCl$_3$, 300 MHz): δ 1.32 (m, 10H); 1.40 (quint, 2H); 1.55 (quint. 2H); 2.07 (dt, 2H); 2.22 (s, 3H); 2.39 (t, 2H); 3.51 (s, 2H); 4.99 (dd, 2H); 5.85 (ddt, 1H); 7.34 (s, 5H). $^{13}$C-NMR (CDCl$_3$, 75 MHz): δ 27.47; 28.97; 29.16; 29.49; 29.60; 33.84; 42.29; 57.65; 62.38; 114.12; 126.82; 128.15; 129.05; 139.23.

Example 24

Preparation of Compound 3BY1

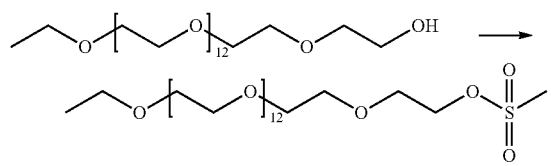

(12a)

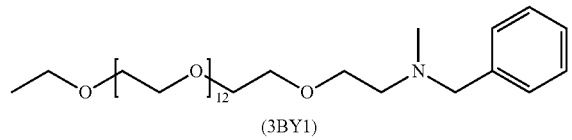

(3BY1)

Preparation of Compound 12a

Compound 12a is prepared as described in example 4.

Preparation of Compound 3BY1

A mixture of 0.2 g of compound 12a and 4.1 ml N-benzyl, N-methylamine is stirred together in 0.5 ml of dioxane to give 0.2 g compound 3BY1 after neutralization with the appropriate amount of sodium hydroxide and filtration and evaporation of solvent. $^1$H-NMR (dioxane, 300 MHz): δ 2.48 (s, 3H); 3.38 (s, 3H); 3.61 (m, ca. 45H); 3.95 (s, 2H); 7.35 (m, 5H).

Example 25

Preparation of Yellow Compound 5B1

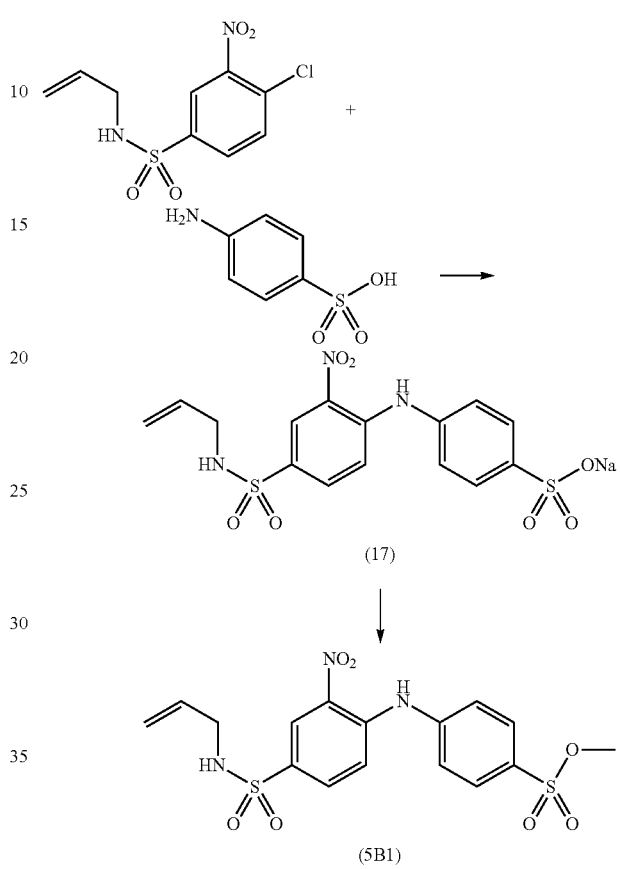

Preparation of Compound 17

A solution of 30 ml of water containing 7.3 g of sodium carbonate, 10.0 g 4-chloro-3-nitrobenzene-allylsulfonamide and 5.9 g of sulfanilic acid is stirred at 100° C. for 48 h. Evaporation of water leaves a solid which is further pruified by column chromatography (eluent: dichloromethane-methanol (10-2)) to give 3.4 g of compound 17. $^1$H-NMR (CD$_3$OD, 300 MHz): δ 3.49 (d, 2H); 5.05 (dd, 2H); 5.62 (ddt, 1H); 7.37 (d, 1H); 7.40 (d, 2H); 7.55 (d, 1H); 7.80 (d, 2H); 8.55 (d, 1H). $^{13}$C-NMR (CD$_3$OD, 75 MHz): δ 45.18; 115.99; 116.90; 124.02; 126.13; 127.38; 129.46; 132.40; 132.91; 133.57; 139.90; 142.67; 144.53.

Preparation of Yellow Compound 5B1

A mixture of 50 mg of compound 17 and 400 µl dimethylsulfate are heated to 120° C. for 2 h. The mixture is directly applied to a silica gel column and eluted with dichloromethane-methanol (10-1) to give 40 mg of compound 5B1. $^1$H-NMR (CDCl$_3$, 300 MHz): δ 3.66 (t, 2H); 3.80 (s, 3H); 5.19 (ddd, 2H); 5.76 (ddt, 1H); 7.49 (d, 3H); 7.90 (d, 1H); 7.97 (d 2H); 8.73 (d, 1H); 9.85 (NH).

Example 26

Preparation of Magenta Compound 5B2

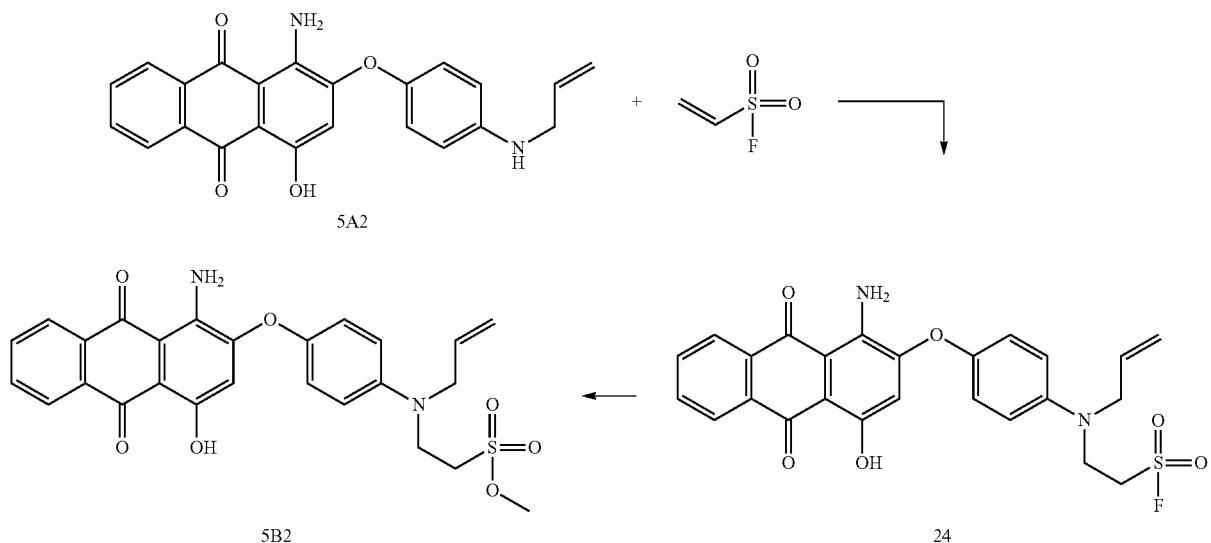

5.10 g of allylic compound 5A2, prepared as described in example 6, and vinylsulfonyl flouride are dissolved in 6 ml of dry dimethyl formamide and heated to 60° C. until TLC shows complete consumption of the starting materials (ca. 16 h). After cooling to room temperature the mixture is diluted with ethyl acetate and extracted with water. Evaporation of the solvent leaves a residue which is purified over silica gel (eluent: dichloremethane-hexane (10-2)) to give 5.05 g of the intermediate compound 24. 4.00 g of the intermediate compound 24 are dissolved in 70 ml dichloromethane and 7 ml methanol containing 1 equivalent of sodium methanolate and are stirred at room temparature for 4 h. The mixture is extracted with ice-water and the organic solvent evaporated. The residue is purified over silica gel (eluent: dichloremethane-methanol (10-1)) to give 3.35 g of magenta compound 5B2. $^1$H-NMR (CDCl$_3$, 300 MHz): δ 3.43 (t, 2H); 3.93 (t, 2H); 3.96 (s, 3H); 4.02 (d, 2H); 5.26 (ddd, 2H); 5.90 (dt, 1H); 6.42 (s, 1H); 6.80 (d, 2H); 7.06 (d, 2H); 7.79 (quint. 2H); 8.37 (dd, 2H). $^{13}$C-NMR (CDCl$_3$, 75 MHz): δ 45.39; 46.63; 53.95; 55.23; 107.96; 108.36; 109.21; 113.75; 117.29; 122.33; 126.29; 126.80; 132.84; 133.03; 133.40; 133.59; 134.98; 139.07; 144.51; 145.12; 156.24; 159.68; 183.18; 185.30.

Example 26a

Preparation of Compound 33

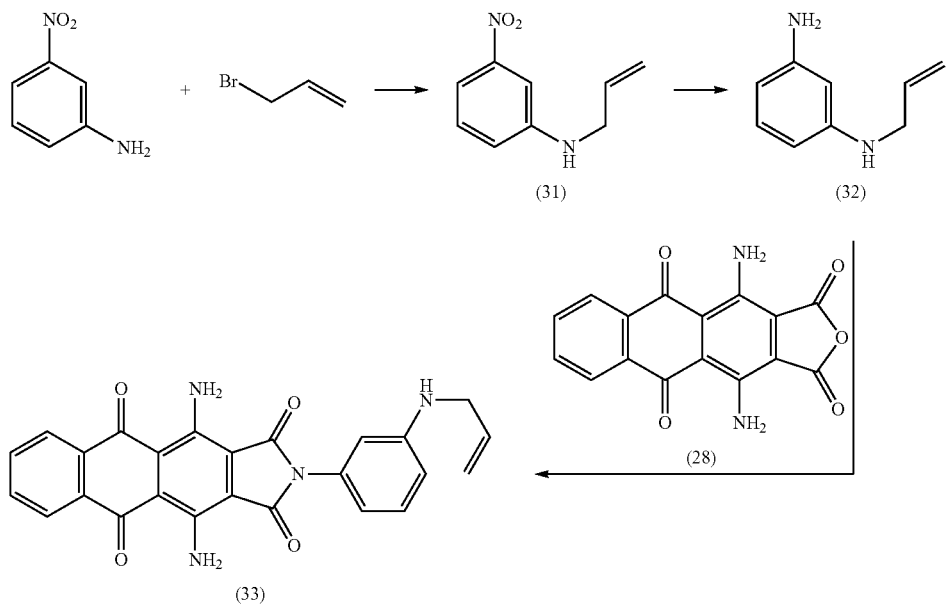

Preparation of Compound 31

A mixture of 19.0 g of 3-nitroaniline, 18.0 g of potassium carbonate and 10.3 ml of allylbromide are heated to 90° C. for 30 h in 170 ml of toluene. After cooling down the mixture is filtered and the toluene evaporated. The residue is filtered over silicagel (eluent: hexane-ethyl acetate: 10-1) to give 7.9 g of compound 31. $^1$H-NMR (CDCl$_3$, 300 MHz): 3.85 (s, 2H); 4.25 (NH); 5.31 (ddd, 2H); 5.94 (ddd, 1H); 6.39 (dd, 1H); 7.30 (dd, 1H); 7.41 (dd, 1H); 7.54 (dd, 1H); $^{13}$C-NMR (CDCl$_3$, 75 MHz): 46.1; 106.5; 112.0; 116.3; 118.9; 129.7; 134.1; 148.7; 149.4.

Preparation of Compound 32

In analogy to the preparation of compound 26 in example 9a, 7.8 g of nitrocompound 31 are dissolved in 80 ml of dioxane containing 23 ml of conc. hydrogenchloride and 8.3 g of tin granules. Pure compound 32, 5.2 g, is obtained after distillation at 175° C./0.12 mbar at a Kugelrohr. $^1$H-NMR (CDCl$_3$, 300 MHz): 3.62 (2×NH); 3.84 (s, 2H); 5.34 (ddd, 2H); 5.98 (s, 1H); 6.04 (ddd, 1H); 6.15 (dd, 2H); 7.07 (dd, 1H); $^{13}$C-NMR (CDCl$_3$, 75 MHz): 46.6; 99.9; 104.1; 105.1; 116.1; 130.1; 135.8; 147.7; 149.4.

Preparation of Compound 33

A mixture of 0.50 g of compound 28, obtained according to FR1410259, and 0.27 g of compound 32 are heated to reflux in 10 ml of n-propanol for 24 h. After colloing down in an ice-bath the mixture is filtered and the residue washed successively with propanol and methanol to yield 0.41 g of the cyan compound 33. $^1$H-NMR (DMSO-D$_6$, 300 MHz): 3.72 (d, 2H); 5.13 (d, 1H); 5.33 (dd, 1H); 5.94 (ddd, 1H); 6.58 (dd, 1H); 6.64 (s, 1H); 6.68 (d, 1H); 7.22 (t, 1H); 7.80 (dd, 2H); 8.19 (dd, 2H).

Example 27

Preparation of Magenta Compound 2B1

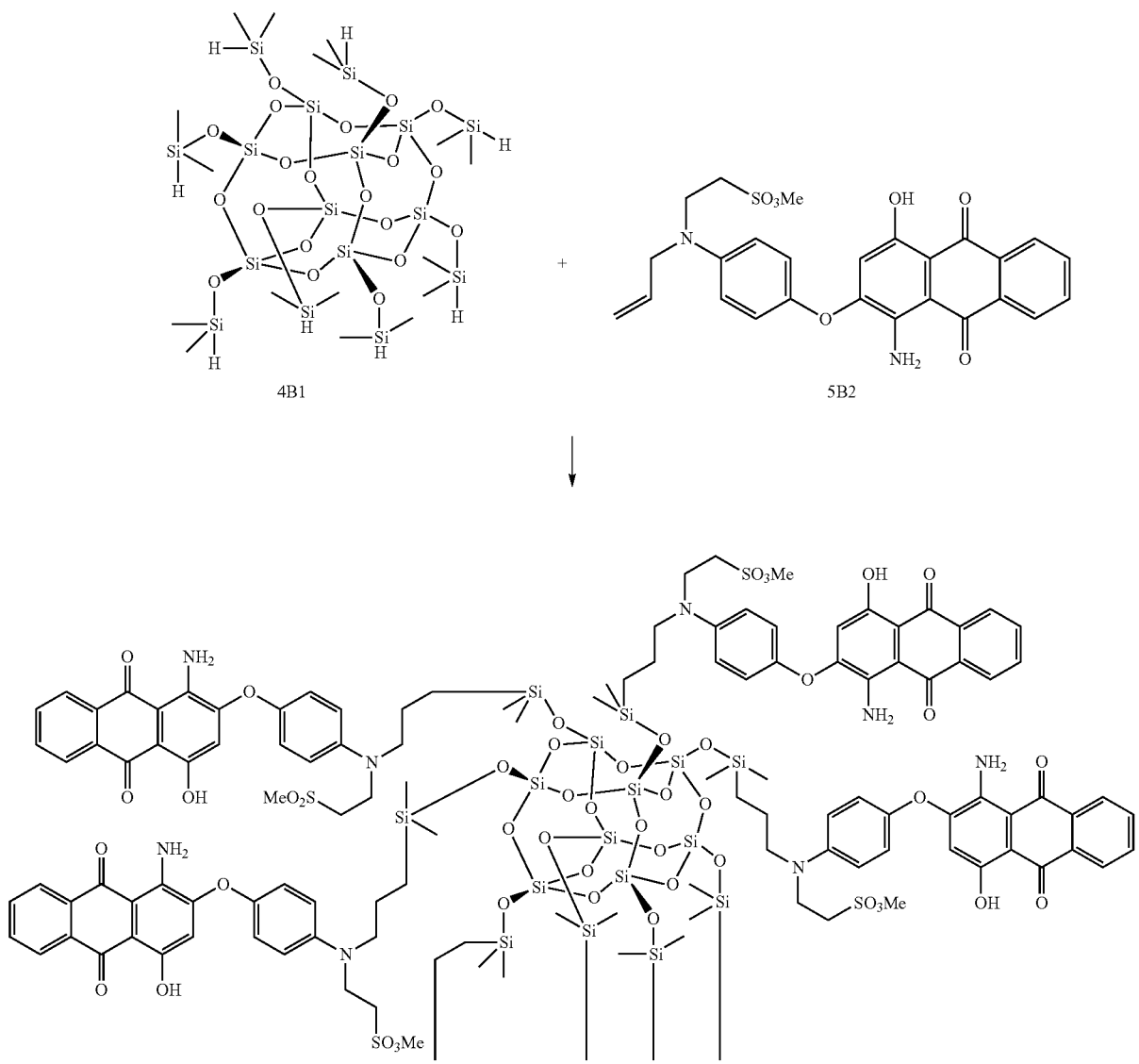

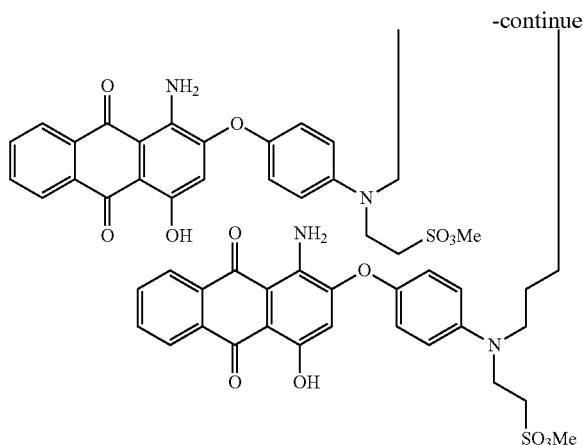
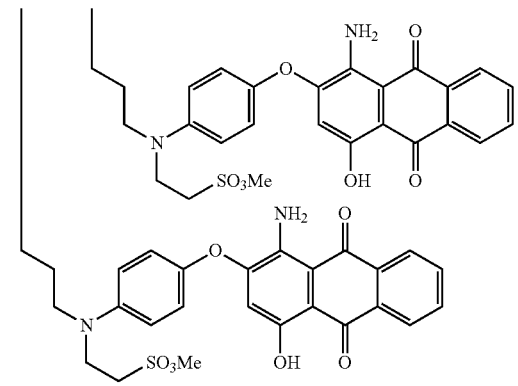
2B1
Magenta compound 2B1 is prepared in analogy to compound 2A1 in example 10. 3.0 g of compound 5B2, prepared as described in example 26, and 0.67 g of compound 4B1 are reacted to yield 1.60 g of magenta compound 2B1. $^1$H-NMR (CDCl$_3$, 300 MHz): all signal broad δ 0.21 (48H); 0.65 (16H); 1.66 (16H); 3.31 (16H); 3.37 (16H); 3.86 (16H); 3.92 (24H); 6.28 (8H); 6.68 (16H); 7.00 (16H); 7.70 (16H); 8.23 (16H). $^{13}$C-NMR (CDCl$_3$, 75 MHz): δ −0.26; 14.77; 20.83; 45.41; 46.26; 54.63; 55.44; 107.70; 108.23; 109.06; 113.30; 122.41; 126.15; 126.60; 132.72; 133.25; 133.48; 134.84; 138.99; 144.10; 144.83; 156.20; 159.55; 182.90; 185.07. $^{29}$Si-NMR (CDCl$_3$, 80 MHz): δ −110, +14.
Example 27a
Preparation of Yellow Compound 2B2
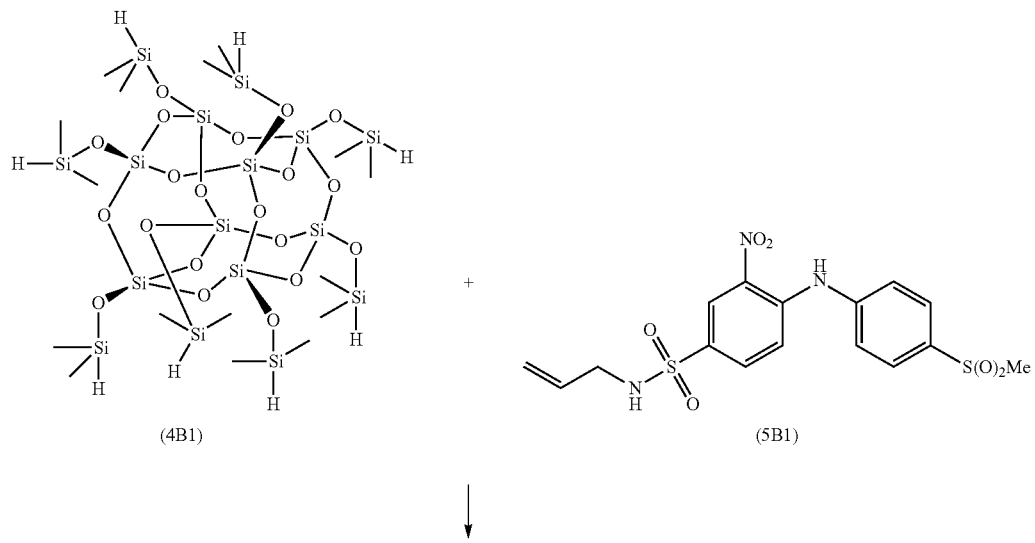
(4B1)                (5B1)

-continued

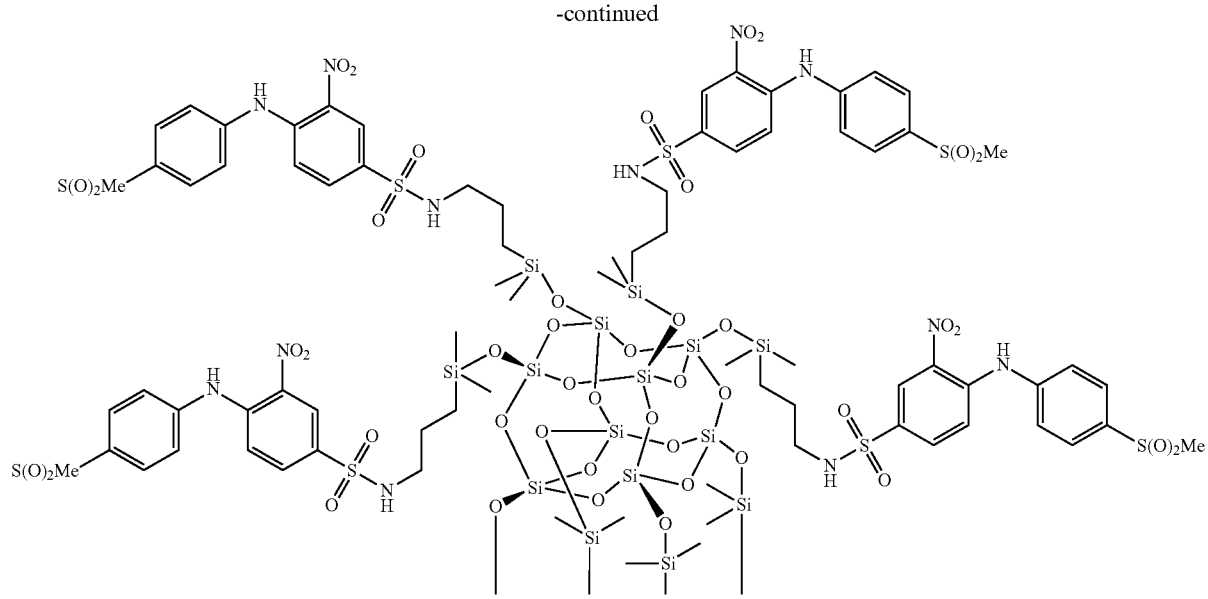

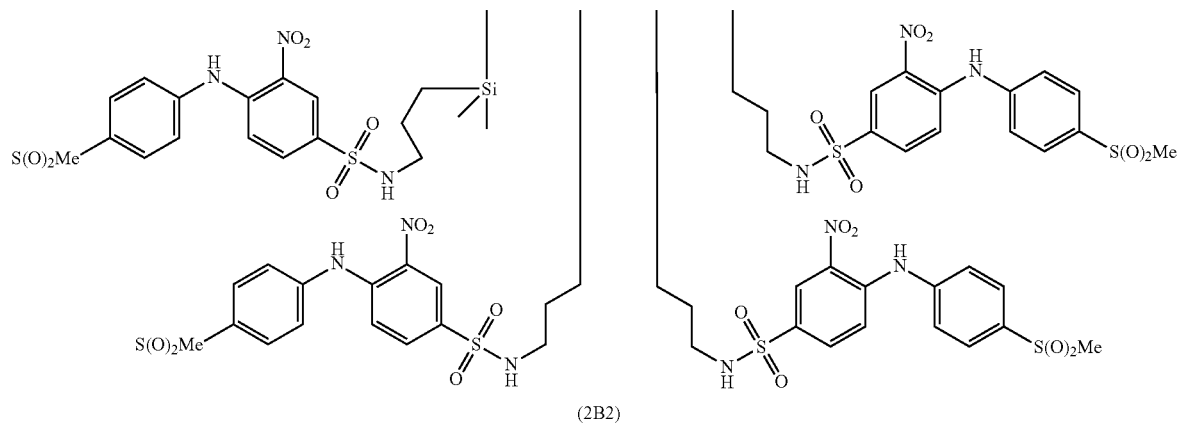

(2B2)

In an argon atmosphere 0.100 ml of a xylene solution (2% in platinum, Fluka) and 0.035 ml of diethylsulfide are stirred in 3 ml dichloromethane at room temperature for 30 min. A solution of 0.370 g of compound 5B1, prepared as described in example 25, in 10 ml dichloromethane and 0.100 g of compound 4B1 are added successively and stirring is continued at 40° C. for 3 d. The mixture is evaporated and the residue extracted with diethyl ether until the supernatant is colorless. Compound 2B2, 0.188 g, is obtained as a yellow solid. $^1$H-NMR (CDCl$_3$, 300 MHz): all signal broad δ 0.24 (ca. 48H); 0.60 (16H); 1.59 (16H); 2.90 (16H); 3.83 (24H); 7.50 (dd, 24H); 8.01 (24H); 8.82 (8H).

Example 28

Preparation of Compound Magenta 1B1

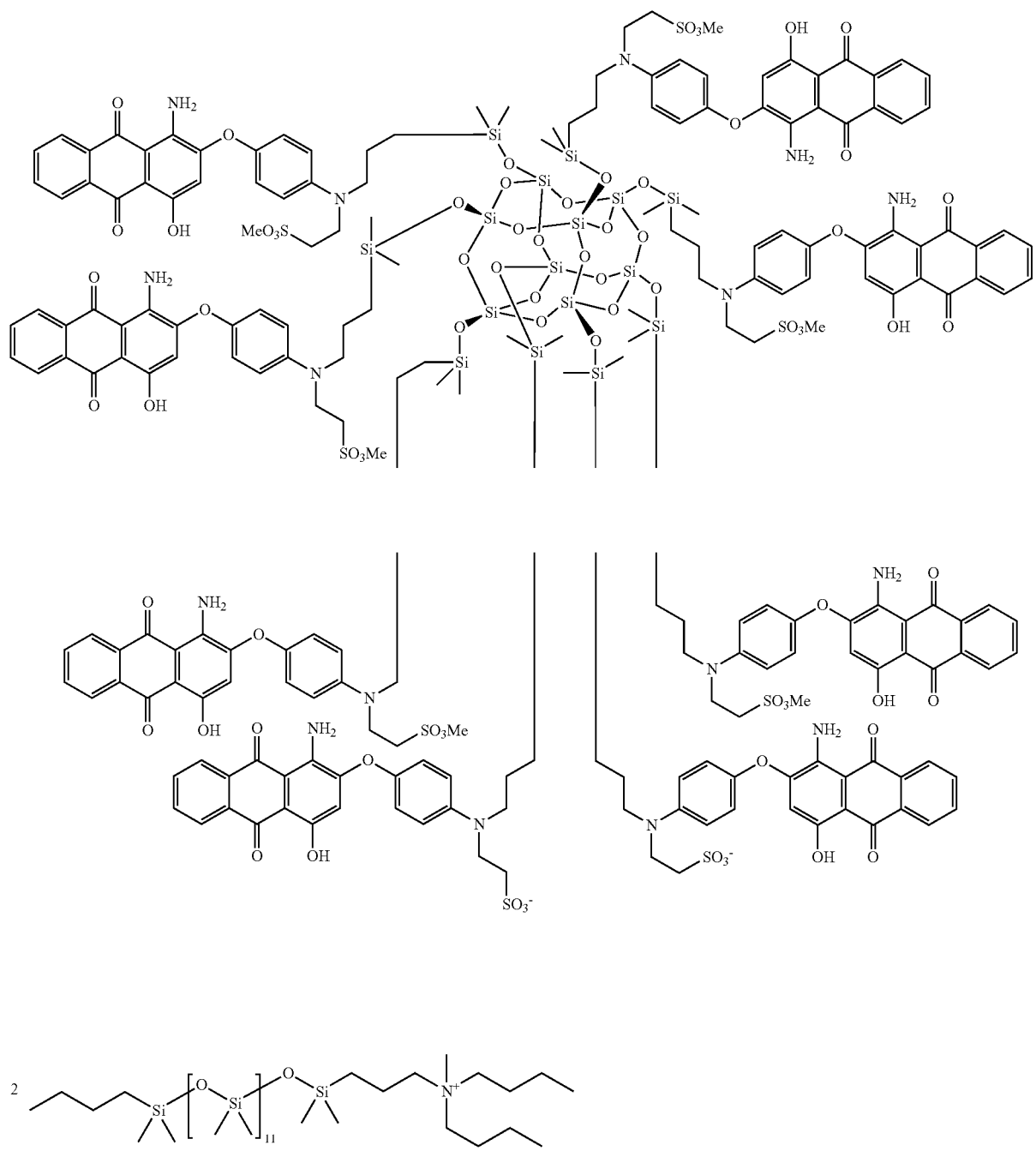

A solution of 50.0 mg of compound 2B1, prepared as described in example 27, and 26.0 mg of compound 3BX1, prepared as described in example 23, are heated to 65° C. in 0.5 ml chloroform to form 76 mg of magenta compound 1B1 after 24 h. According $^1$H-NMR data compound 3BX1 has been completely alkylated resulting in magenta compound 1B1 with two negative charges. $^1$H-NMR (CDCl$_3$, 300 MHz): all signal broad δ 0.21 (44H); 0.64 (24H); 0.90 (t, 6H); 0.98 (t, 12H); 1.41 (20H); 1.64 (24H); 3.01 (18H); 3.46 (32H); 3.85 (32H); 6.38 (8H); 6.69 (16H); 6.97 (16H); 7.67 (16H); 8.21 (16H).

Example 29

Preparation of Magenta Compound 1B2

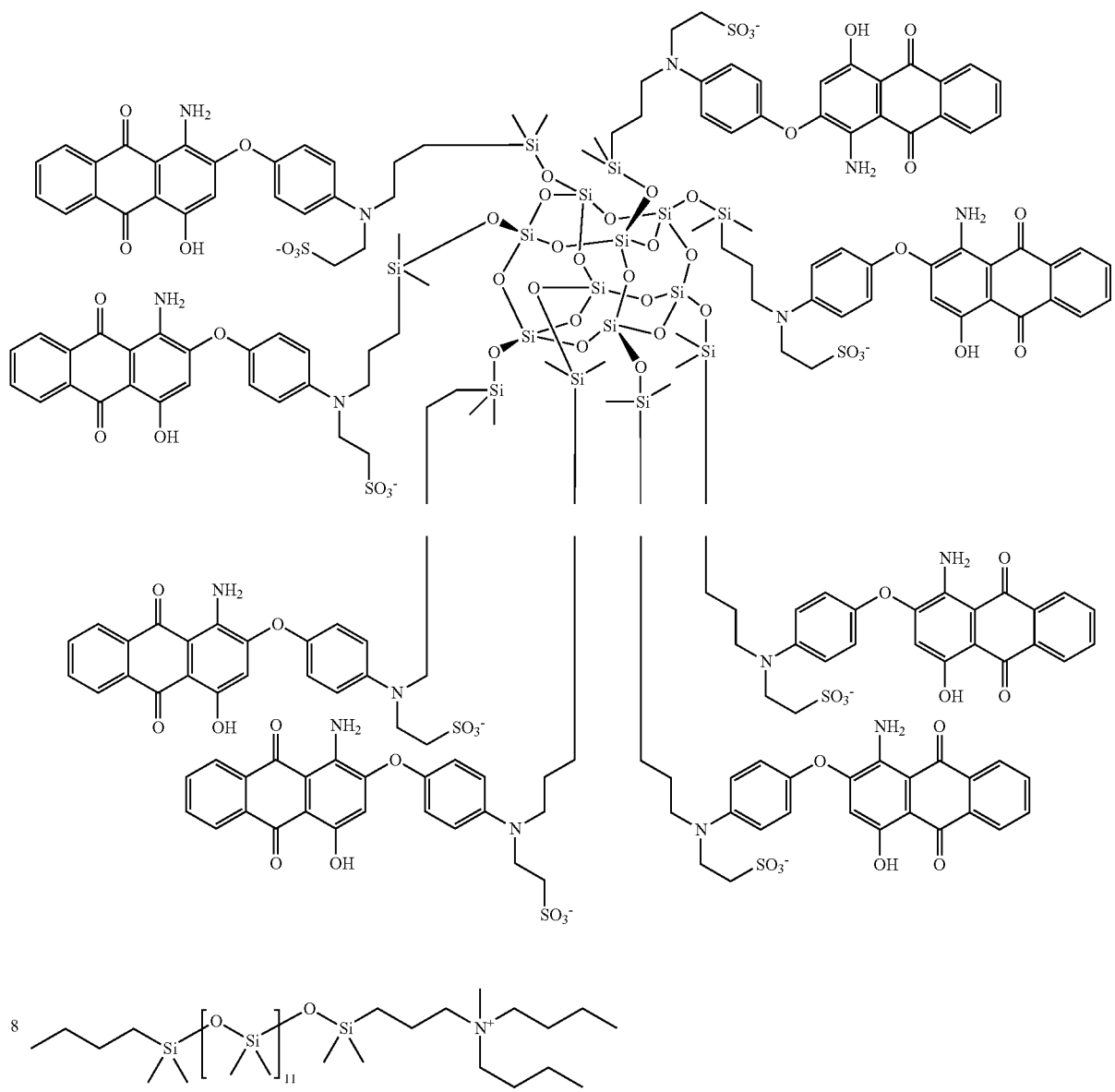

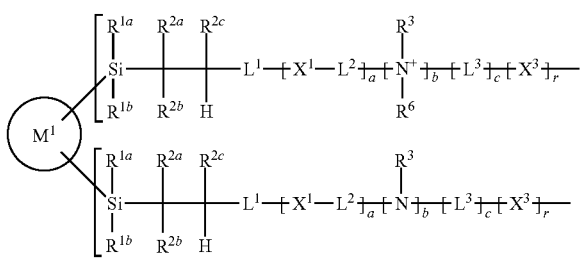

A solution of 50.0 mg of compound 2B1, prepared as described in example 27, and 105.0 mg of compound 3BX1, prepared as described in example 23, are heated to 65° C. in 0.5 ml chloroform to form 155 mg of compound 1B2 after 24 h. According $^1$H-NMR data compound 3BX1 has been completely alkylated resulting in compound 1B2 with eight negative charges. $^1$H-NMR (CDCl$_3$, 300 MHz): all signal broad δ 0.21 (252H); 0.63 (48H); 0.96 (72H); 1.36 (80H); 1.64 (48H); 2.76 (32H); 3.07 (27H); 3.28 (16H); 3.36 (16H); 3.82 (16H); 6.38 (8H); 6.69 (16H); 6.97 (16H); 7.67 (16H); 8.21 (16H).

The invention claimed is:
1. A compound of formula

$$\begin{array}{c} \text{(1A)} \end{array}$$

$$\begin{matrix} M^1 \end{matrix} \begin{bmatrix} R^{1a} & R^{2a} & R^{2c} \\ Si & & \\ R^{1b} & R^{2b} & H \end{bmatrix} L^1 \!-\! \{X^1 \!-\! L^2\}_a \!-\! \{N^+\}_b \!-\! \{L^3\}_c \!-\! \{X^3\}_r \\ \begin{bmatrix} R^{1a} & R^{2a} & R^{2c} \\ Si & & \\ R^{1b} & R^{2b} & H \end{bmatrix} L^1 \!-\! \{X^1 \!-\! L^2\}_a \!-\! \{N\}_b \!-\! \{L^3\}_c \!-\! \{X^3\}_r $$

-continued

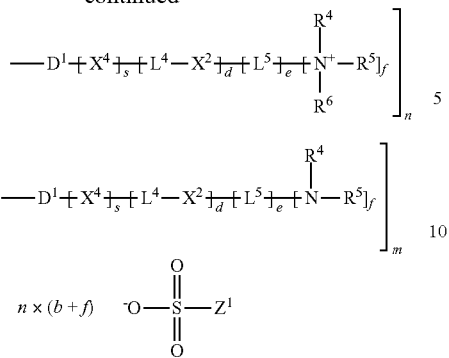

$n \times (b+f)$    $\text{-O}-\underset{\underset{O}{\|}}{\overset{\overset{O}{\|}}{S}}-Z^1$ wherein

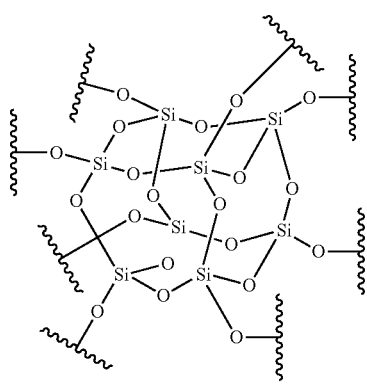 is n is 1, 2, 3, 4, 5, 6, 7 or 8,
m is 8-n,
a is 0 or 1,
b is 0 or 1,
c is 0 or 1,
r is 0 or 1,
s is 0 or 1,
d is 0 or 1,
e is 0 or 1,
f is 0 or 1,
with the proviso that at least b or f is 1, and with the proviso f is 0, then s, d and e are also 0,
$R^{1a}$ and $R^{1b}$ are independently from each other $C_{1-4}$-alkyl,
$R^{2a}$, $R^{2b}$ and $R^{2c}$ are independently from each other hydrogen or $C_{1-4}$-alkyl,
$L^1$ is $C_{1-20}$-alkylene, $C_{1-20}$-alkylene-phenylene, $C_{1-20}$-alkylene-$C_{5-8}$-cycloalkylene, phenylene or $C_{5-8}$-cycloalkylene, wherein $L^1$ may be substituted with one or more substituents selected from the group consisting of halogen, $OC_{1-6}$-alkyl, $NO_2$ and OH,
$X^1$, $X^2$, $X^3$ and $X^4$ are independently of each other O, S, C(O) or C(O)O,
$L^2$, $L^3$, $L^4$ and $L^5$ are independently of each other $C_{1-20}$-alkylene, $C_{1-20}$-alkylene-phenylene, $C_{1-20}$-alkylene-$C_{5-8}$-cycloalkylene, phenylene or $C_{5-8}$-cycloalkylene, wherein $L^2$, $L^3$, $L^4$ and $L^5$ may be substituted with one or more substituents selected from the group consisting of halogen, $OC_{1-6}$-alkyl, $NO_2$ and OH, or $L^2$ and $R^3$ or $L^3$ and $R^3$ together with the N linked to both of them form a 5, 6 or 7 membered ring, or $L^5$ and $R^4$ together with the N linked to both of them form a 5, 6 or 7 membered ring, $R^3$, $R^4$ and $R^5$ are independently of each other $C_{1-20}$-alkyl, which may be substituted with a substituent selected from the group consisting of $C_{6-14}$-aryl, $OC_{1-6}$-alkyl, and $NO_2$, or $R^4$ and $R^5$ together with the N linked to both of them form a 5, 6 or 7 membered ring, which may also include O or S, $R^6$ is $C_{1-20}$-alkyl, which may be substituted with a substituent selected from the group consisting of $C_{6-14}$-aryl, $OC_{1-6}$-alkyl, and $NO_2$, $D^1$ is a chromophoric moiety, which may be substituted with one or more $R^{50}$, wherein $R^{50}$ are independently from each other selected from the group consisting of $C_{1-20}$-alkyl, $C_{6-14}$-aryl, halogen, $OC_{1-6}$-alkyl, OH, $NH_2$ and $NO_2$, and $Z^1$ is $C_{1-100}$-alkyl, wherein one or more methylene groups are replaced by $-SiR^{100}R^{101}-$, $-SiR^{100}R^{101}O-$, $-O-$ or $-S-$, with the proviso that $-SiR^{100}R^{101}-$, $-SiR^{100}R^{101}O-$, $-O-$ or $-S-$ are not directly linked to the S of

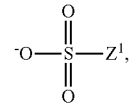

wherein $R^{100}$ and $R^{101}$ are independently from each other $C_{1-6}$-alkyl, or of formula

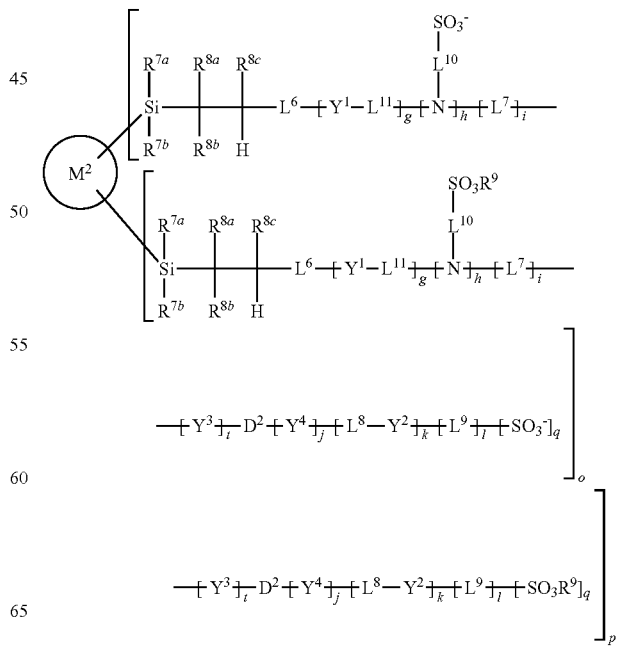

-continued

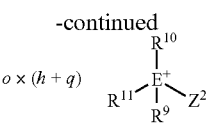

wherein

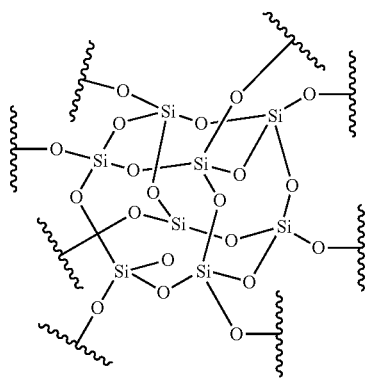

is o is 1, 2, 3, 4, 5, 6, 7 or 8,
p is 8-o,
g is 0 or 1,
h is 0 or 1,
i is 0 or 1,
t is 0 or 1,
j is 0 or 1,
k is 0 or 1,
l is 0 or 1,
q is 0 or 1
with the proviso that at least h or q is 1, and with the proviso that if q is 0, then j, k and l are also 0,
$R^{1a}$ and $R^{1b}$ are independently of each other $C_{1-4}$-alkyl,
$R^{8a}$, $R^{8b}$ and $R^{8c}$ are independently from each other hydrogen or $C_{1-4}$-alkyl,
$L^6$ is $C_{1-20}$-alkylene, $C_{1-20}$-alkylene-phenylene, $C_{1-20}$-alkylene-$C_{5-8}$-cycloalkylene, phenylene or $C_{5-8}$-cycloalkylene, wherein $L^6$ may be substituted with one or more substituents selected from the group consisting of halogen, $OC_{1-6}$-alkyl, $NO_2$ and OH,
$Y^1$, $Y^2$, $Y^3$ and $Y^4$ are independently of each other $NR^{51}$, O, S, C(O) or C(O)O, wherein $R^{51}$ is $C_{1-20}$-alkyl,
$L^7$, $L^8$, $L^9$, $L^{10}$ and $L^{11}$ are independently of each other $C_{1-20}$-alkylene, $C_{1-20}$-alkylene-phenylene or $C_{1-20}$-alkylene-$C_{5-8}$-cycloalkylene, phenylene or $C_{5-8}$-cycloalkylene, wherein $L^7$, $L^8$, $L^9$, $L^{10}$ and $L^{11}$ may be substituted with one or more substituents selected from the group consisting of halogen, $OC_{1-6}$-alkyl, $NO_2$ and OH,
$D^2$ is a chromophoric moiety, which may be substituted with one or more $R^{52}$, wherein $R^{52}$ are independently from each other selected from the group consisting of $C_{1-20}$-alkyl, $C_{6-14}$-aryl, halogen, $OC_{1-6}$-alkyl, OH, $NH_2$ and $NO_2$, $R^9$ is $C_{1-10}$-alkyl,
$R^{10}$ and $R^{11}$ are independently from each other $C_{1-20}$-alkyl, which may be substituted with one or more substituents selected from the group consisting of $C_{6-14}$-aryl, $OC_{1-6}$-alkyl, and $NO_2$,
E is N or P, and
$Z^2$ is $C_{1-100}$-alkyl, wherein one or more methylene groups are replaced by —$SiR^{102}R^{103}$—, —$SiR^{102}R^{103}$O—, —O— or —S—, with the proviso that —$SiR^{102}R^{103}$—, —$SiR^{102}R^{103}$O—, —O— or —S— are not directly linked to E, wherein $R^{102}$ and $R^{103}$ are independently from each other $C_{1-6}$-alkyl.

2. The compound of claim 1, wherein:
$R^6$ in formula (1A) is $C_{1-10}$-alkyl, which may be substituted with phenyl; and
$R^9$ in formula (1B) is $C_{1-6}$-alkyl.

3. The compound of claim 1, wherein:
in formula (1A)
$R^{1a}$ and $R^{1b}$ are methyl, and
$R^{2a}$, $R^{2b}$ and $R^{2c}$ are hydrogen
in formula (1B)
$R^{7a}$ and $R^{7b}$ are methyl, and
$R^{8a}$, $R^{8b}$ and $R^{8c}$ are hydrogen.

4. The compound of claim 1, wherein:
in formula (1A)
$L^1$ is $C_{1-10}$-alkylene or phenylene,
$X^1$, $X^2$, $X^3$ and $X^4$ are independently of each other O or S,
$L^2$, $L^3$, $L^4$ and $L^5$ are independently of each other $C_{1-20}$-alkylene or $C_{1-20}$-alkylene-phenylene or phenylene, or
$L^2$ and $R^3$ or $L^3$ and $R^3$ together with the N linked to both of them form a 6 membered ring, or
$L^5$ and $R^4$ together with the N linked to both of them form a 6 membered ring, and
$R^3$, $R^4$ and $R^5$ are independently of each other $C_{1-10}$-alkyl, which may be substituted with phenyl, or
$R^4$ and $R^5$ together with the N linked to both of them form a 6 membered ring, which may also include O or S; and
in formula (1B)
$L^6$ is $C_{1-10}$-alkylene or phenylene,
$Y^1$, $Y^2$, $Y^3$ and $Y^4$ are independently of each other O or $NR^{51}$, wherein $R^{51}$ is $C_{1-6}$-alkyl, and
$L^7$, $L^8$, $L^9$, $L^{19}$ and $L^{11}$ are independently of each other $C_{1-20}$-alkylene or $C_{1-20}$-alkylene-phenylene or phenylene.

5. The compound of claim 1, wherein:
in formula (1A)
$L^1$ is $C_{1-10}$-alkylene, and
$X^1$, $X^2$, $X^3$ and $X^4$ are O,
$L^2$, $L^3$, $L^4$ and $L^5$ are independently of each $C_{1-10}$-alkylene or $C_{1-10}$-alkylene-phenylene, or
$L^2$ and $R^3$ or $L^3$ and $R^3$ together with the N linked to both of them form

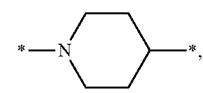

and
$R^3$, $R^4$ and $R^5$ are independently of each $C_{1-6}$-alkyl or benzyl, or R⁴ and R⁵ together with the N linked to both of them form
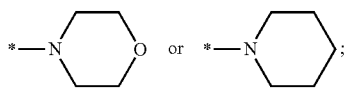
and
in formula (1B)
L⁶ is $C_{1-10}$-alkylene or phenylene,
Y¹, Y², Y³ and Y⁴ are independently of each other O or NR⁵¹, wherein R⁵¹ is methyl, and
L⁷, L⁸, L⁹, L¹⁰ and L¹¹ are independently of each $C_{1-10}$-alkylene or $C_{1-10}$-alkylene-phenylene.
6. The compound of claim 1, wherein:
in formula (1A)
D1 is of formula
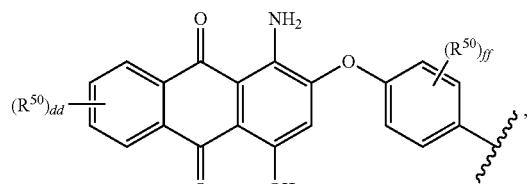
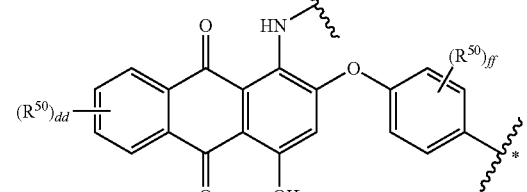
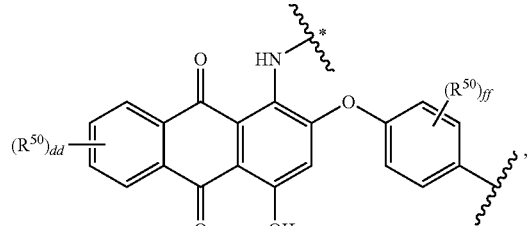
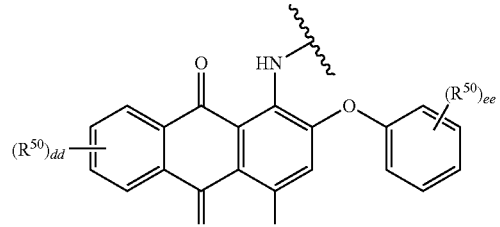
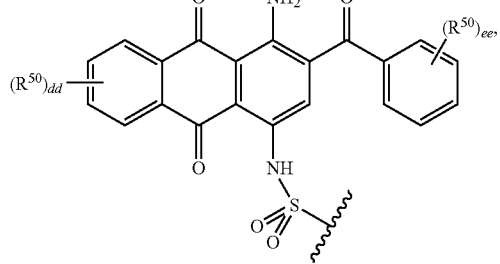
-continued
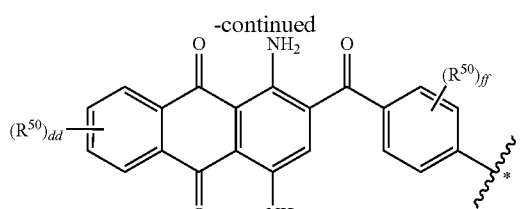
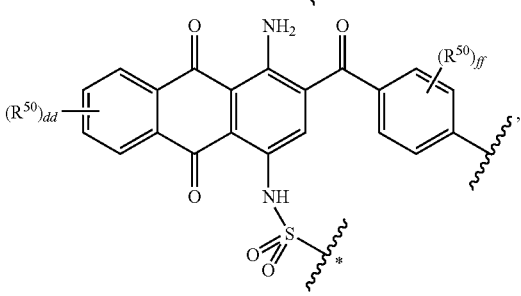
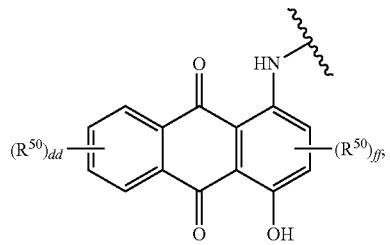
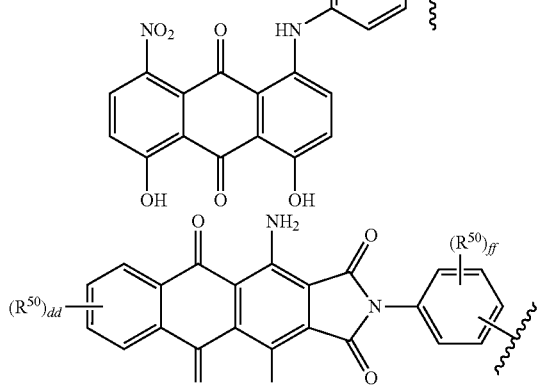
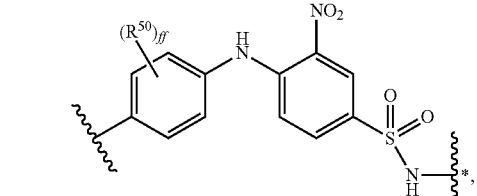
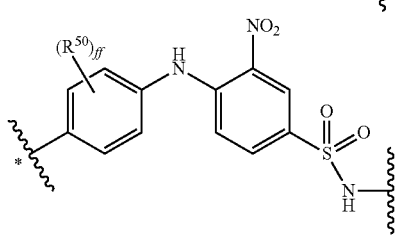

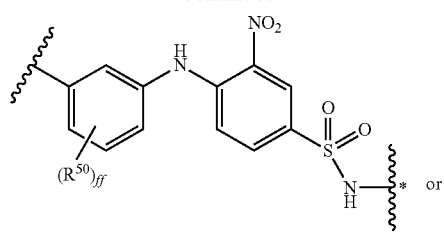
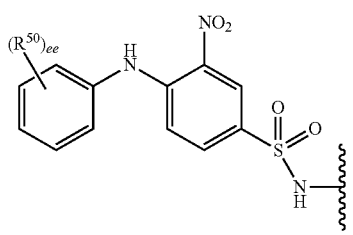
the bond marked with * is linked to
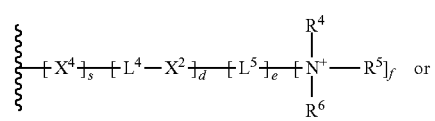
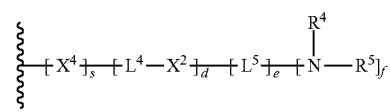
dd is an integer from 0 to 3,
ee is an integer from 0 to 2,
ff is an integer from 0 to 1, and
R$^{50}$ are independently from each other selected from the group consisting of C$_{1-20}$-alkyl, C$_{6-14}$-aryl, halogen, OC$_{1-6}$-alkyl, OH, NH$_2$ and NO$_2$; and
in formula (1B)
D2 is of formula
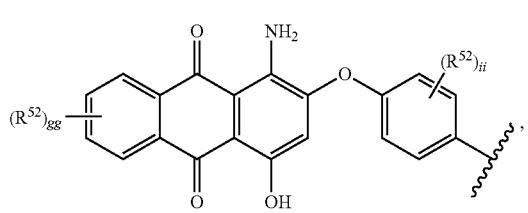
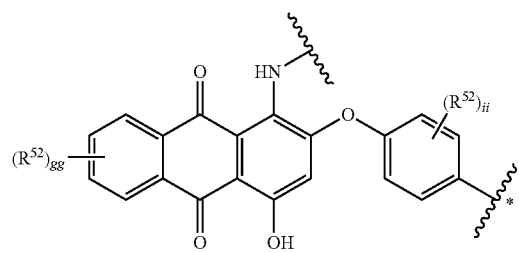
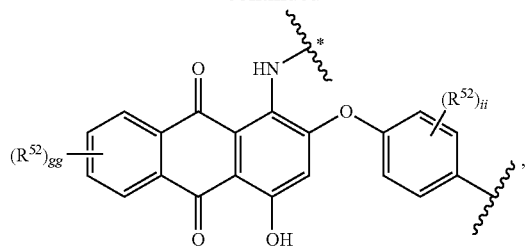
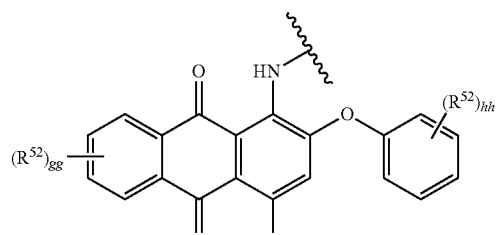
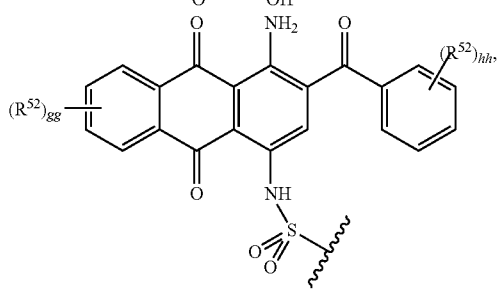
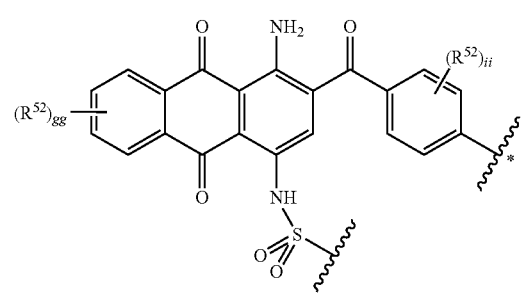
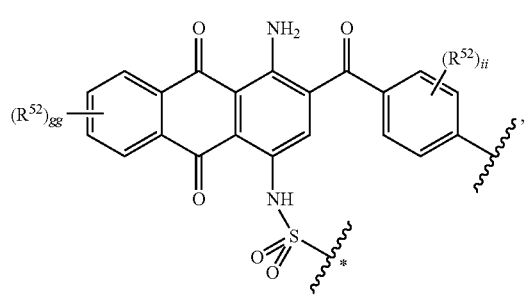
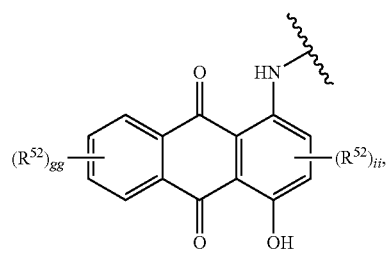

-continued
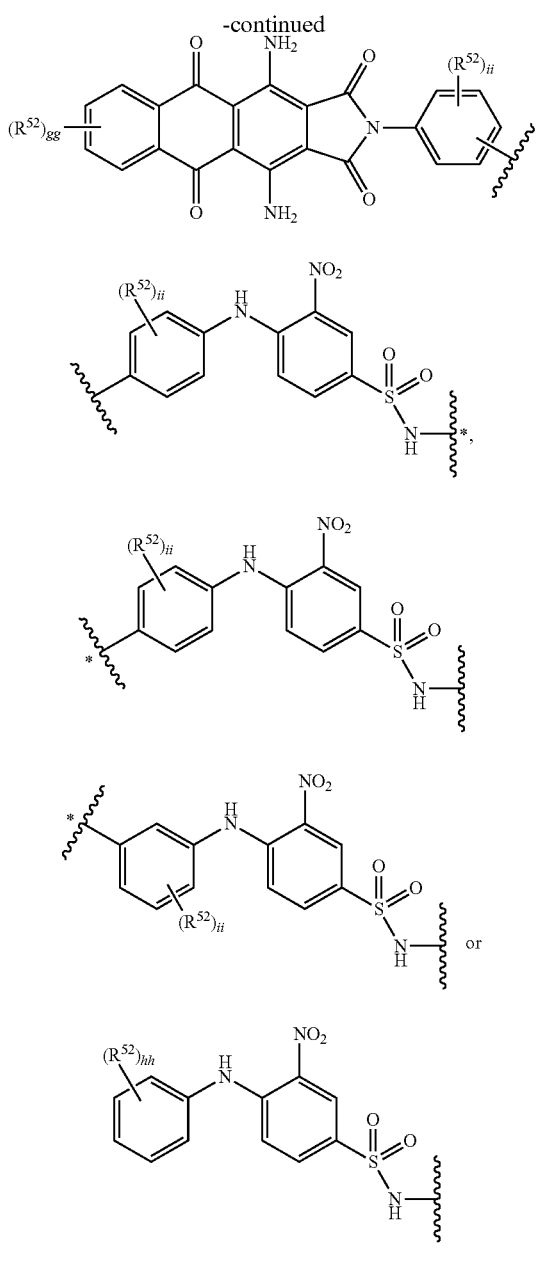
the bond marked with * is linked to
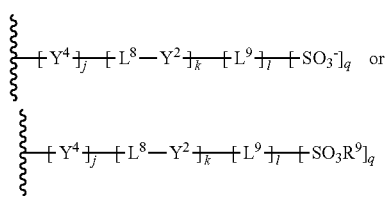
gg is an integer from 0 to 3,
hh is an integer from 0 to 2,
ii is an integer from 0 to 1, and
$R^{52}$ are independently from each other selected from the group consisting of $C_{1\text{-}20}$-alkyl, $C_{6\text{-}14}$-aryl, halogen, $OC_{1\text{-}6}$-alkyl, OH, $NH_2$ and $NO_2$.
7. The compound of claim 1, wherein:
in formula (1A)
D1 is of formula
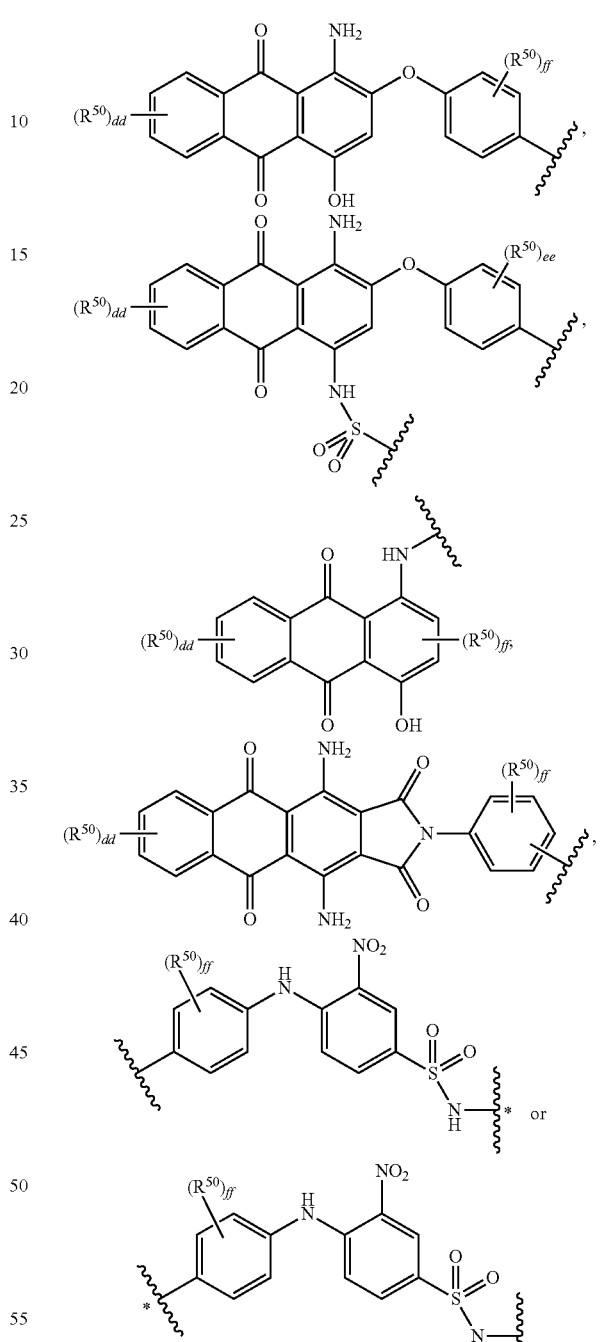
the bond marked with ** is linked to
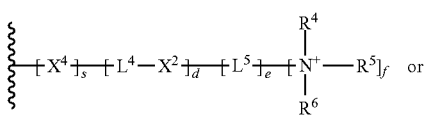

-continued

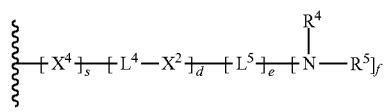

dd is an integer from 0 to 3,
ee is an integer from 0 to 2,
ff is an integer from 0 to 1, and
$R^{50}$ are independently from each other selected from the group consisting of $C_{1-20}$-alkyl, $C_{6-14}$-aryl, halogen, $OC_{1-6}$-alkyl, OH, $NH_2$ and $NO_2$; and in formula (1B)

D2 is of formula

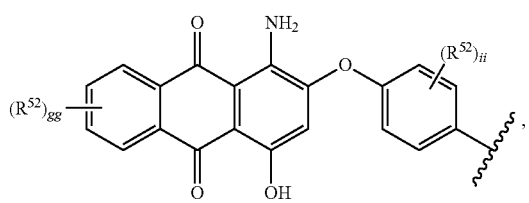

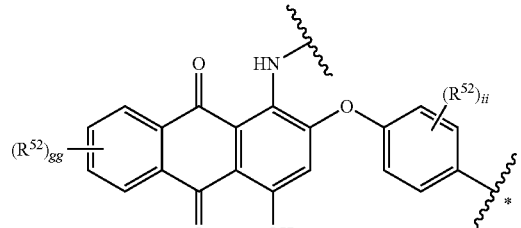

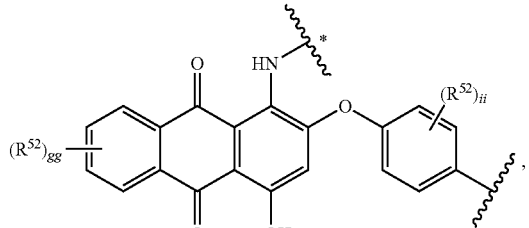

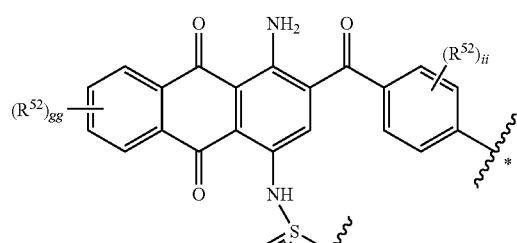

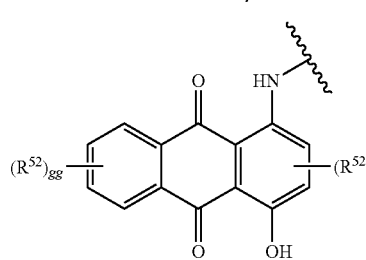

-continued

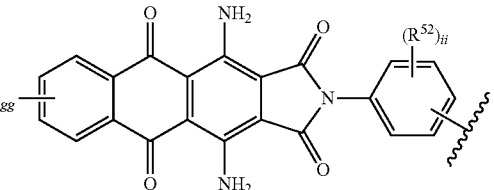

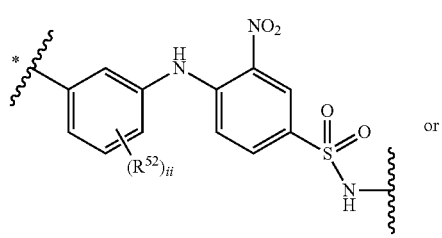

or

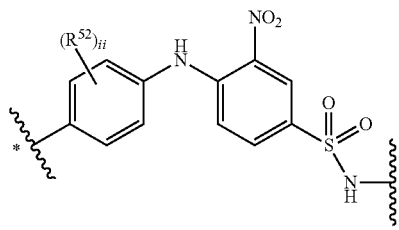

the bond marked with * is linked to

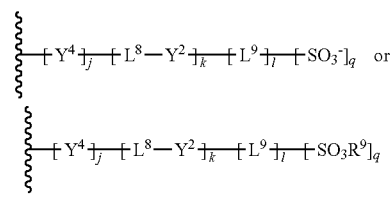

hh is an integer from 0 to 2,
ii is an integer from 0 to 1, and
$R^{52}$ are independently from each other selected from the group consisting of $C_{1-20}$alkyl, $C_{6-14}$-aryl, halogen, $OC_{1-6}$-alkyl, OH, $NH_2$ and $NO_2$.

8. The compound of claim 1, wherein:

in formula (1A)

D1 is of formula

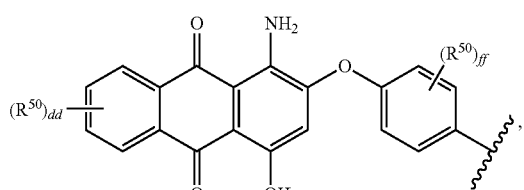

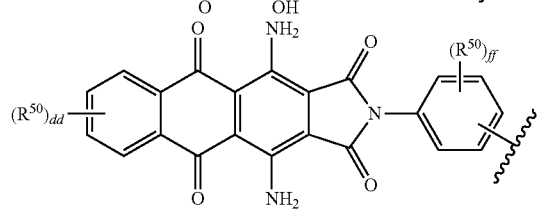

-continued

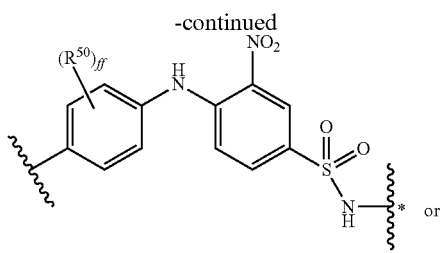

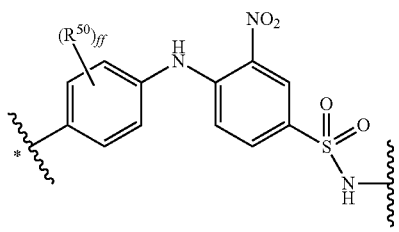

the bond marked with * is linked to

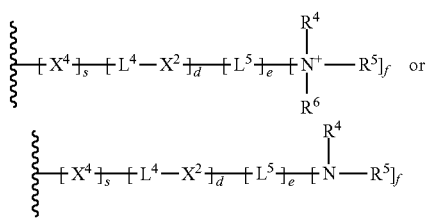

dd is an integer from 0 to 3,
ee is an integer from 0 to 2,
ff is an integer from 0 to 1, and
$R^{50}$ are independently from each other selected from the group consisting of $C_{1-6}$-alkyl, OH, $NH_2$ and $NO_2$; and in formula (1B)
D2 is of formula

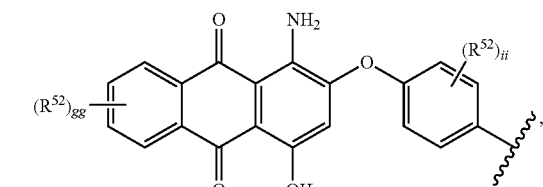

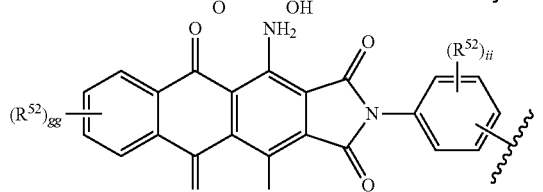

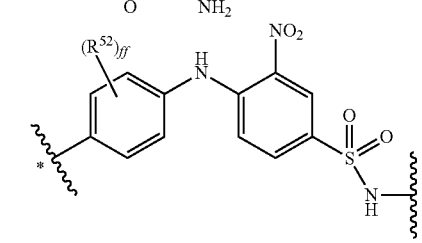

the bond marked with * is linked to

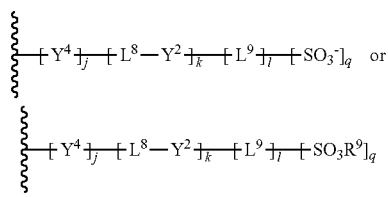

gg is an integer from 0 to 3,
hh is an integer from 0 to 2,
ii is an integer from 0 to 1, and
$R^{52}$ are independently from each other selected from the group consisting of $C_{1-6}$-alkyl, OH, $NH_2$ and $NO_2$.

9. The compound of claim 1, wherein:
in formula (1A)
$Z^1$ is $C_{1-50}$-alkyl, wherein one or more methylene groups are replaced by $-SiR^{100}R^{101}-$, $-SiR^{100}R^{101}O-$, $-O-$ or $-S-$, with the proviso that $-SiR^{100}R^{101}-$, $SiR^{100}R^{101}O-$, $-O-$ or $-S-$ are not directly linked to the S of

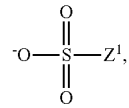

$R^{100}$ and $R^{101}$ are independently from each other $C_{1-6}$-alkyl; and in formula (1B)
$R^{10}$ and $R^{11}$ are independently from each other $C_{1-6}$-alkyl, which may be substituted with phenyl,
E is N, and
$Z^2$ is $C_{1-50}$-alkyl, wherein one or more methylene groups are replaced by $-SiR^{102}R^{103}-$, $-SiR^{102}R^{103}O-$, $-O-$ or $-S-$, with the proviso that $-SiR^{102}R^{103}-$, $-SiR^{102}R^{103}O-$, $-O-$ or $-S-$ are not directly linked to E, wherein $R^{102}$ and $R^{103}$ are independently from each other $C_{1-6}$-alkyl.

10. The compound of claim 1, wherein:
in formula (1A)
$Z^1$ is

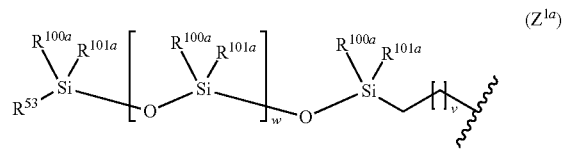

$R^{53}$ is $C_{1-10}$-alkyl,
$R^{100}a$ and $R^{101}a$ are independently from each other $C_{1-6}$-alkyl,
v is an integer from 1 to 12,
w is an integer from 2 to 25; and in formula (1B)
$R^{10}$ and $R^{11}$ are independently from each other $C_{1-6}$-alkyl, which may be substituted with phenyl, E is N, and
Z² is

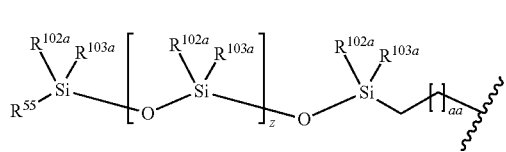
(Z²ᵃ)

$R^{55}$ is $C_{1-10}$-alkyl,
$R^{102}a$ and $R^{103}a$ are independently from each other $C_{1-6}$-alkyl,
aa is an integer from 1 to 12,
z is an integer from 2 to 25.

11. The compound of claim 1, wherein:
in formula (1A)
Z¹ is

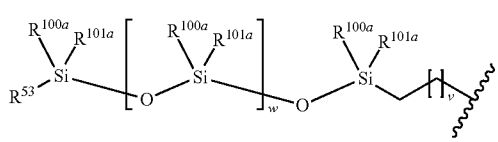
(Z¹ᵃ)

$R^{53}$ is $C_{1-6}$-alkyl,
$R^{100}a$ and $R^{101}a$ are methyl,
v is an integer from 2 to 6,
w is an integer from 5 to 20; and
in formula (1B)
$R^{10}$ and $R^{11}$ are independently from each other $C_{1-6}$-alkyl or benzyl,
E is N, and
Z² is

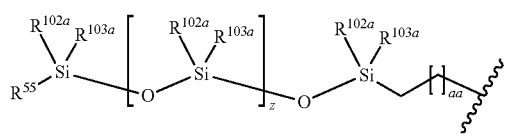
(Z²ᵃ)

$R^{55}$ is $C_{1-6}$-alkyl,
$R^{102}a$ and $R^{103}a$ are methyl,
aa is an integer from 2 to 10,
z is an integer from 5 to 20.

12. The compound of claim 1, wherein:
in formula (1A)
Z¹ is

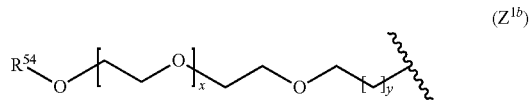
(Z¹ᵇ)

$R^{54}$ is $C_{1-10}$-alkyl,
x is an integer from 5 to 25, and
y is an integer from 1 to 5; and
in formula (1B)
$R^{10}$ and $R^{11}$ are independently from each other $C_{1-6}$-alkyl, which may be substituted with phenyl,
E is N, and
Z² is

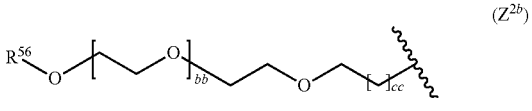
(Z²ᵇ)

$R^{56}$ is $C_{1-10}$-alkyl,
bb is preferably an integer from 5 to 25, and
cc is an integer from 1 to 5.

13. The compound of claim 1, wherein:
in formula (1B)
s is 0,
d is 0; and
in formula (1A)
g is 0, and
k is 0.

14. The compound of claim 1, wherein in formula (1A)
a is 0, and
r is 0.

15. The compound of claim 1, wherein
in formula (1A)
if b is 1, then f is 0, or if f is 1, then b is 0; and
the compounds of formula (1B) of claim 1,
in formula (1B)
if h is 1, then q is 0, and if q is 1, then h is 0.

16. The compound of claim 1, wherein in formula (1A)
n is 1, 2, 3, 4, 5, 6 or 7,
m is 8-n.

17. A process for preparing the compound of formula (1A) of claim 1, the process comprising reacting a compound of formula

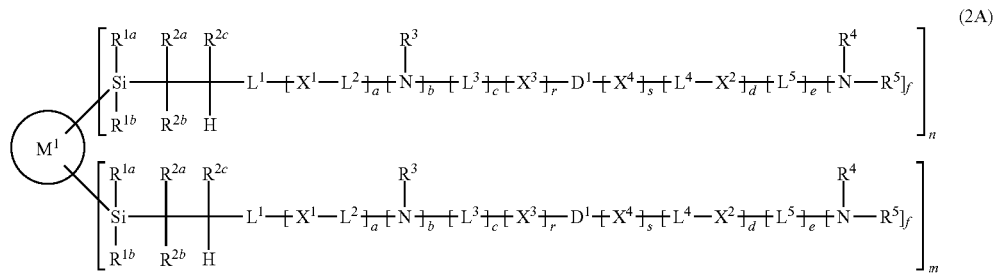
(2A)

wherein

is

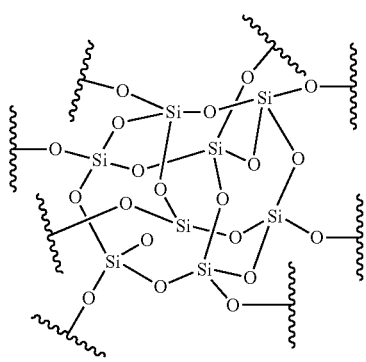

n is 1, 2, 3, 4, 5, 6, 7 or 8,
m is 8-n,
a is 0 or 1,
b is 0 or 1,
c is 0 or 1,
r is 0 or 1,
s is 0 or 1,
d is 0 or 1,
e is 0 or 1,
f is 0 or 1,
with the proviso that at least b or f is 1, and with the proviso f is 0, then s, d and e are also 0,
$R^{1a}$ and $R^{1b}$ are independently from each other $C_{1-4}$-alkyl,
$R^{2a}$, $R^{2b}$ and $R^{2c}$ are independently from each other hydrogen or $C_{1-4}$-alkyl,
$L^1$ is $C_{1-20}$-alkylene, $C_{1-20}$-alkylene-phenylene, $C_{1-20}$-alkylene-$C_{5-8}$-cycloalkylene, phenylene or $C_{5-8}$-cycloalkylene, wherein $L^1$ may be substituted with one or more substituents selected from the group consisting of halogen, $OC_{1-6}$-alkyl, $NO_2$ and OH,
$X^1$, $X^2$, $X^3$ and $X^4$ are independently of each other O, S, C(O) or C(O)O,
$L^2$, $L^3$, $L^4$ and $L^5$ are independently of each other $C_{1-20}$-alkylene, $C_{1-20}$-alkylene-phenylene, $C_{1-20}$-alkylene-$C_{5-8}$-cycloalkylene, phenylene or $C_{5-8}$-cycloalkylene, wherein $L^2$, $L^3$, $L^4$ and $L^5$ may be substituted with one or more substituents selected from the group consisting of halogen, $OC_{1-6}$-alkyl, $NO_2$ and OH, or
$L^2$ and $R^3$ or $L^3$ and $R^3$ together with the N linked to both of them form a 5, 6 or 7 membered ring, or
$L^5$ and $R^4$ together with the N linked to both of them form a 5, 6 or 7 membered ring,
$R^3$, $R^4$ and $R^5$ are independently of each other $C_{1-20}$-alkyl, which may be substituted with a substituent selected from the group consisting of $C_{6-14}$-aryl, $OC_{1-6}$-alkyl, and $NO_2$, or
$R^4$ and $R^5$ together with the N linked to both of them form a 5, 6 or 7 membered ring, which may also include O or S,
and
$D^1$ is a chromophoric moiety, which may be substituted with one or more $R^{50}$, wherein $R^{50}$ are independently from each other selected from the group consisting of $C_{1-20}$-alkyl, $C_{6-14}$-aryl, halogen, $OC_{1-6}$-alkyl, OH, $NH_2$ and $NO_2$,
with a compound of formula

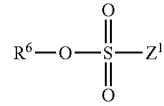

(3A)

wherein
$R^6$ is $C_{1-20}$-alkyl, which may be substituted with a substituent selected from the group consisting of $C_{6-14}$-aryl, $OC_{1-6}$-alkyl, and $NO_2$,
$Z^1$ is $C_{1-100}$-alkyl, wherein one or more methylene groups are replaced by —$SiR^{100}R^{101}$—, —$SiR^{100}R^{101}O$—, —O— or —S—, with the proviso that —$SiR^{100}R^{101}$—, $SiR^{100}R^{101}O$—, —O— or —S— are not directly linked to the S of

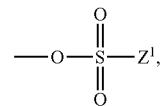

wherein
$R^{100}$ and $R^{101}$ are independently from each other $C_{1-6}$-alkyl.

18. A process for preparing the compound of formula (1B) of claim 1, the process comprising reacting a compound of formula

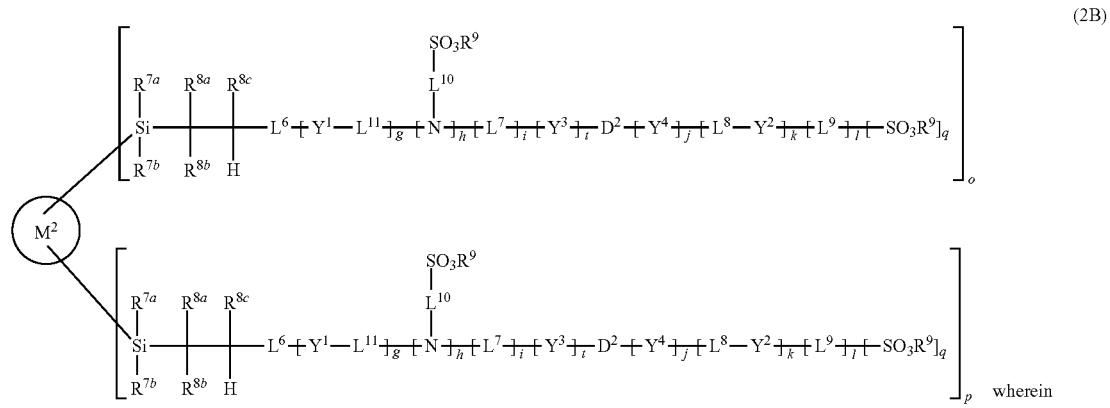

(2B)

wherein

-continued $M^2$ is

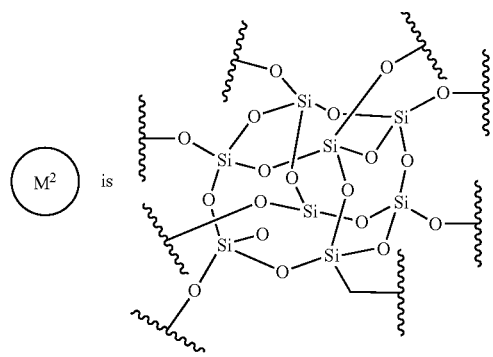

o is 1, 2, 3, 4, 5, 6, 7 or 8,
p is 8-o,
g is 0 or 1,
h is 0 or 1,
i is 0 or 1,
t is 0 or 1,
j is 0 or 1,
k is 0 or 1,
l is 0 or 1,
q is 0 or 1 with the proviso that at least h or q is 1, and with the proviso that if q is 0, then j, k and l are also 0, $R^{1a}$ and $R^{1b}$ are independently of each other $C_{1-4}$-alkyl, $R^{8a}$, $R^{8b}$ and $R^{8c}$ are independently from each other hydrogen or $C_{1-4}$-alkyl, $L^6$ is $C_{1-20}$-alkylene, $C_{1-20}$-alkylene-phenylene, $C_{1-20}$-alkylene-$C_{5-8}$-cycloalkylene, phenylene or $C_{5-8}$-cycloalkylene, wherein $L^6$ may be substituted with one or more substituents selected from the group consisting of halogen, $OC_{1-6}$-alkyl, $NO_2$ and OH, $Y^1$, $Y^2$, $Y^3$ and $Y^4$ are independently of each other $NR^{51}$, O, S, C(O) or C(O)O, wherein $R^{51}$ is $C_{1-20}$-alkyl, $L^7$, $L^8$, $L^9$, $L^{11}$ and L are independently of each other $C_{1-20}$-alkylene, $C_{1-20}$-alkylene-phenylene or $C_{1-20}$-alkylene-$C_{5-8}$-cycloalkylene, phenylene or $C_{5-8}$-cycloalkylene, wherein $L^7$, $L^8$, $L^9$, $L^{10}$ and $L^{11}$ may be substituted with one or more substituents selected from the group consisting of halogen, $OC_{1-6}$-alkyl, $NO_2$ and OH, and $R^9$ is $C_{1-10}$-alkyl, and $D^2$ is a chromophoric moiety, which may be substituted with one or more $R^{52}$, wherein $R^{52}$ are independently from each other selected from the group consisting of $C_{1-20}$-alkyl, $C_{6-14}$-aryl, halogen, $OC_{1-6}$-alkyl, OH, $NH_2$ and $NO_2$, with a compound of formula

(3B)

wherein
$R^{10}$ and $R^{11}$ are independently from each other $C_{1-20}$-alkyl, which may be substituted with one or more substituents selected from the group consisting of $C_{6-14}$-aryl, $OC_{1-6}$-alkyl, and $NO_2$, E is N or P, $Z^2$ is $C_{1-100}$-alkyl, wherein one or more methylene groups are replaced by —$SiR^{102}R^{103}$—, —$SiR^{102}R^{103}$O—, —O— or —S—, with the proviso that —$SiR^{102}R^{103}$—, —$SiR^{102}R^{103}$O—, —O— or —S— are not directly linked to E, wherein $R^{102}$ and $R^{103}$ are independently from each other $C_{1-6}$-alkyl.

19. An electrophoretic device, comprising the compound of formula (1A) of claim 1.

20. An electrophoretic device, comprising the compound of formula (1B) of claim 1.

* * * * *